United States Patent
Wold et al.

(10) Patent No.: US 10,805,071 B2
(45) Date of Patent: Oct. 13, 2020

(54) METHOD AND SYSTEM FOR PROTECTING AND SHARING DIGITAL DATA BETWEEN USERS IN A NETWORK

(71) Applicant: INVENIA AS, Tromsø (NO)

(72) Inventors: Terje Wold, Tromsø (NO); Trygve Sanne Hardersen, Tromsø (NO)

(73) Assignee: INVENIA AS, Tromso (NO)

( * ) Notice: Subject to any disclaimer, the term of this patent is extended or adjusted under 35 U.S.C. 154(b) by 0 days.

(21) Appl. No.: 15/518,731

(22) PCT Filed: Oct. 13, 2015

(86) PCT No.: PCT/NO2015/050188
§ 371 (c)(1),
(2) Date: Apr. 12, 2017

(87) PCT Pub. No.: WO2016/060568
PCT Pub. Date: Apr. 21, 2016

(65) Prior Publication Data
US 2017/0244556 A1  Aug. 24, 2017

(30) Foreign Application Priority Data

Oct. 13, 2014 (NO) .................................. 20141225

(51) Int. Cl.
*G06F 21/00* (2013.01)
*H04L 9/08* (2006.01)
(Continued)

(52) U.S. Cl.
CPC ............ *H04L 9/0825* (2013.01); *G06F 21/31* (2013.01); *G06F 21/606* (2013.01); *G06F 21/6245* (2013.01); *H04L 9/14* (2013.01); *H04L 9/30* (2013.01); *H04L 9/3226* (2013.01); *H04L 9/3236* (2013.01); *H04L 63/045* (2013.01); *H04W 12/0013* (2019.01); *H04W 12/02* (2013.01); *H04W 12/04* (2013.01); *G06F 21/84* (2013.01); *G06F 2221/2107* (2013.01);
(Continued)

(58) Field of Classification Search
None
See application file for complete search history.

(56) References Cited

U.S. PATENT DOCUMENTS

| 2002/0120842 | A1* | 8/2002 | Bragstad | ................ | G06F 21/602 713/156 |
| 2013/0254536 | A1* | 9/2013 | Glover | ................. | G06F 21/6209 713/165 |

(Continued)

FOREIGN PATENT DOCUMENTS

| WO | WO 01/52473 A1 | 7/2001 |
| WO | WO-2012144909 A1 * | 10/2012 ......... H04L 63/0457 |

(Continued)

OTHER PUBLICATIONS

International Search Report issued in International application No. PCT/NO2015/050188.

*Primary Examiner* — Alexander Lagor
(74) *Attorney, Agent, or Firm* — Arent Fox LLP

(57) ABSTRACT

Scalable method and system for secure sharing of encrypted information in a cloud system, the encrypted information being encrypted only once, and each user joining and accessing a shared folder by individual encrypted key material transferred.

11 Claims, 50 Drawing Sheets

(51) Int. Cl.
    *H04L 29/06*        (2006.01)
    *H04W 12/04*       (2009.01)
    *G06F 21/60*        (2013.01)
    *H04W 12/00*       (2009.01)
    *H04W 12/02*       (2009.01)
    *G06F 21/31*        (2013.01)
    *G06F 21/62*        (2013.01)
    *H04L 9/14*          (2006.01)
    *H04L 9/30*          (2006.01)
    *H04L 9/32*          (2006.01)
    *H04W 4/60*        (2018.01)
    *G06F 21/84*        (2013.01)
    *H04L 29/08*        (2006.01)

(52) U.S. Cl.
    CPC ........ *H04L 63/061* (2013.01); *H04L 67/1097* (2013.01); *H04W 4/60* (2018.02)

(56) References Cited

U.S. PATENT DOCUMENTS

| | | | |
|---|---|---|---|
| 2013/0254537 A1 | 9/2013 | Bogorad | |
| 2014/0068279 A1* | 3/2014 | Kurspahic | H04L 9/0894 713/193 |
| 2016/0078245 A1* | 3/2016 | Amarendran | G06F 16/164 713/193 |
| 2016/0360403 A1* | 12/2016 | Jordi | H04L 63/0823 |

FOREIGN PATENT DOCUMENTS

| | | |
|---|---|---|
| WO | WO 2013/157957 A1 | 10/2013 |
| WO | WO 2014/152025 A2 | 9/2014 |

\* cited by examiner

When waking up from local notification, check for network availability and act accordingly.

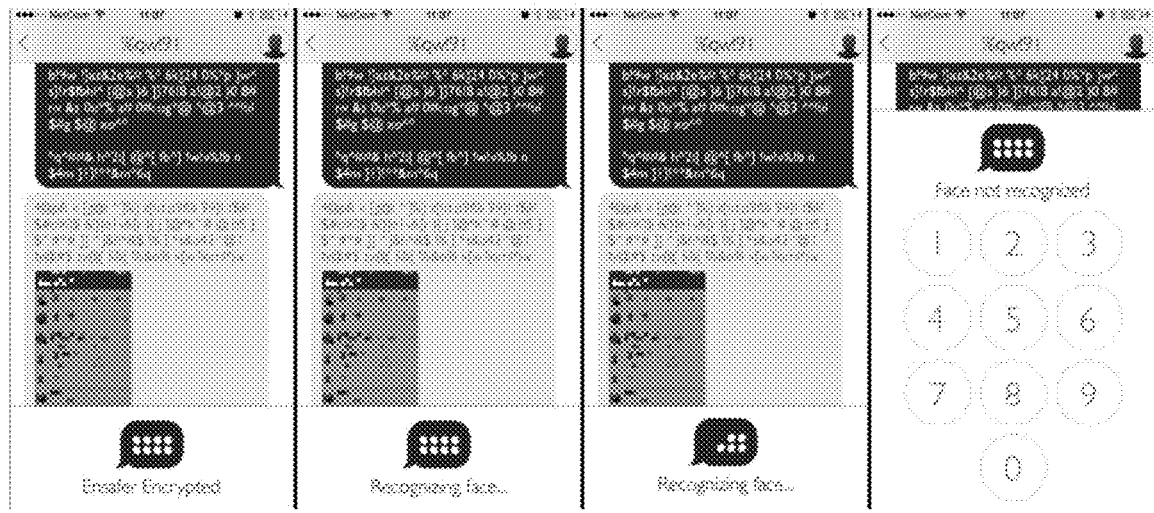
Fig. 21D
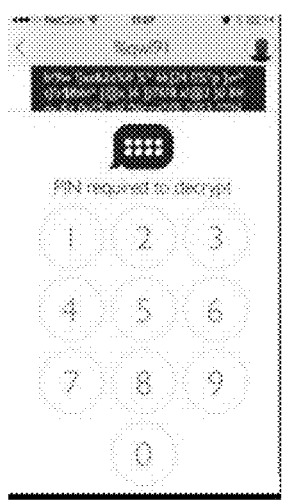 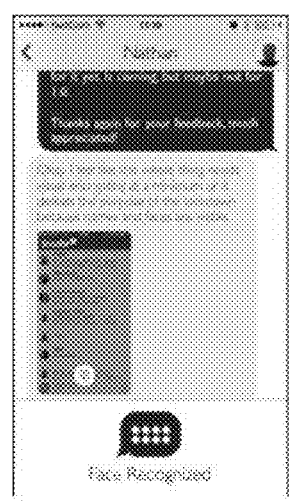
Fig. 21E          Fig. 21F

METHOD AND SYSTEM FOR PROTECTING AND SHARING DIGITAL DATA BETWEEN USERS IN A NETWORK

CROSS REFERENCE TO RELATED APPLICATION

This application is a 35 U.S.C. 371 National Phase of PCT Application No. PCT/NO2015/050188, filed Oct. 13, 2015, which claims priority to Norwegian Patent Application No. NO 20141225, filed Oct. 13, 2014. The disclosure of these prior applications are hereby incorporated by reference in their entirety.

The present invention is related to security challenges in the cloud storage industry, specifically sharing large amount of data between different devices or sharing data with many users or both.

Identified cloud storage problems can be summed up to be:
- Applications offered today are not secure enough for many users or user groups.
- Information confidentiality is maintained in the cloud only by complicated and/or time consuming processes?
- Sharing scalability and confidentiality is not achieved.
- Security Issues in Cloud Storage:

The privacy of user data may be compromised at the cloud storage services, and mechanisms such as SSL transport is put more and more under increasing pressure, and simply relying on passwords for authentication is insufficient for many users and applications.

Taking into consideration the amount of data that are exchanged between users, and often a large number of users accessing the same confidential information (data), secure sharing requires a lot of extra processing, and data maintenance is complicated when security requirements are high. Specifically this is evident when data needs to be encrypted in order to fulfill security requirements.

Further challenges are encountered by the magnitude of devices accessing sensitive information, either stored in the cloud or on a device (portable and stationary). Accessing secure information on a device such as a mobile phone, PDA, computer without restricted viewing access and other may put at risk the sensitive information that are intended for the user(s)' eyes only.

The present invention comprise a scalable method and system for secure sharing of encrypted information in a cloud system, the encrypted information being encrypted only once, and each user joining and accessing a shared folder by individual encrypted key material transferred. It is also part of the invention to provide a device for secure communication between two or more users, their devices and the cloud and cloud service provider. The device is provided with the feature of making any visual content unreadable by blurring once the user no longer actively looking at the screen or holds the device, and optionally the same feature is activated if an unknown face is present in front of a camera monitoring the spectators on the device screen side. The invention is further described in the independent claims. Further advantageous embodiments are described in the associated dependent claims.

Figure 11A:
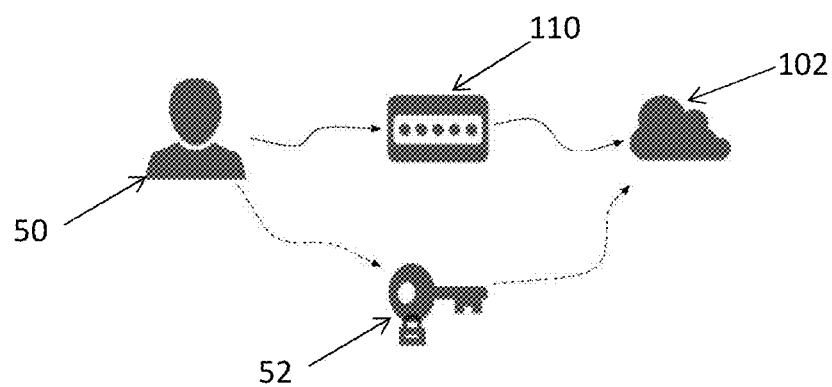
Figure 11B:
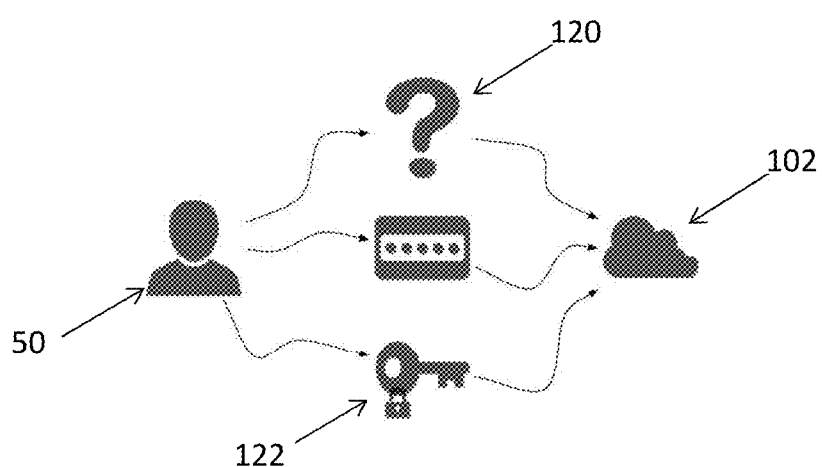
Figure 11C:
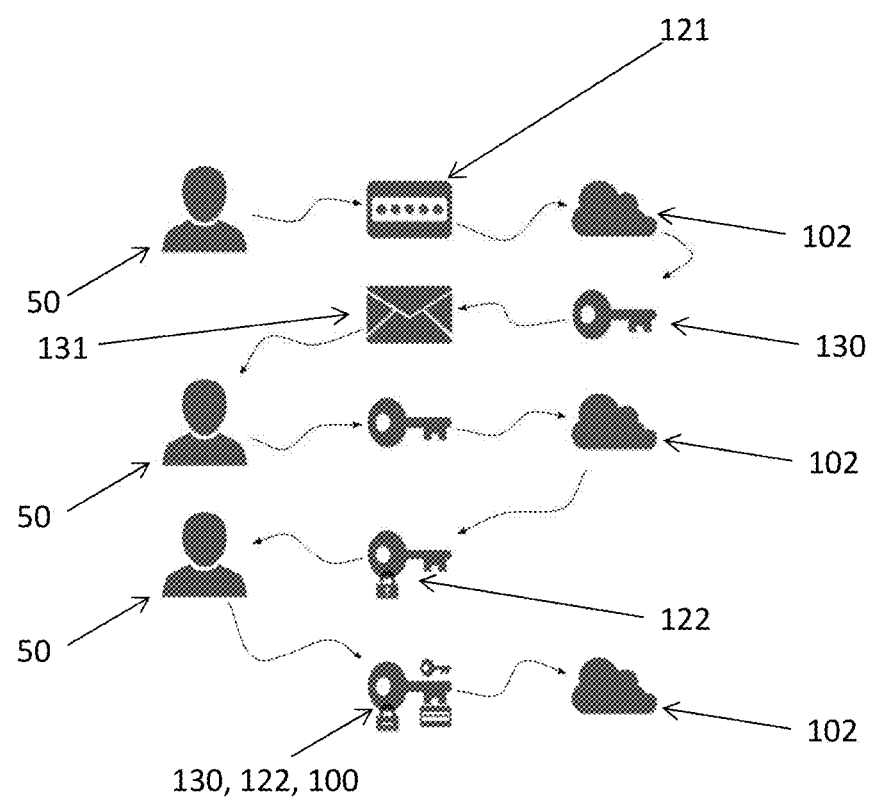

FIG. 11A-C shows a key concept for password change, key recovery setup and key recovery.

Figure 12:
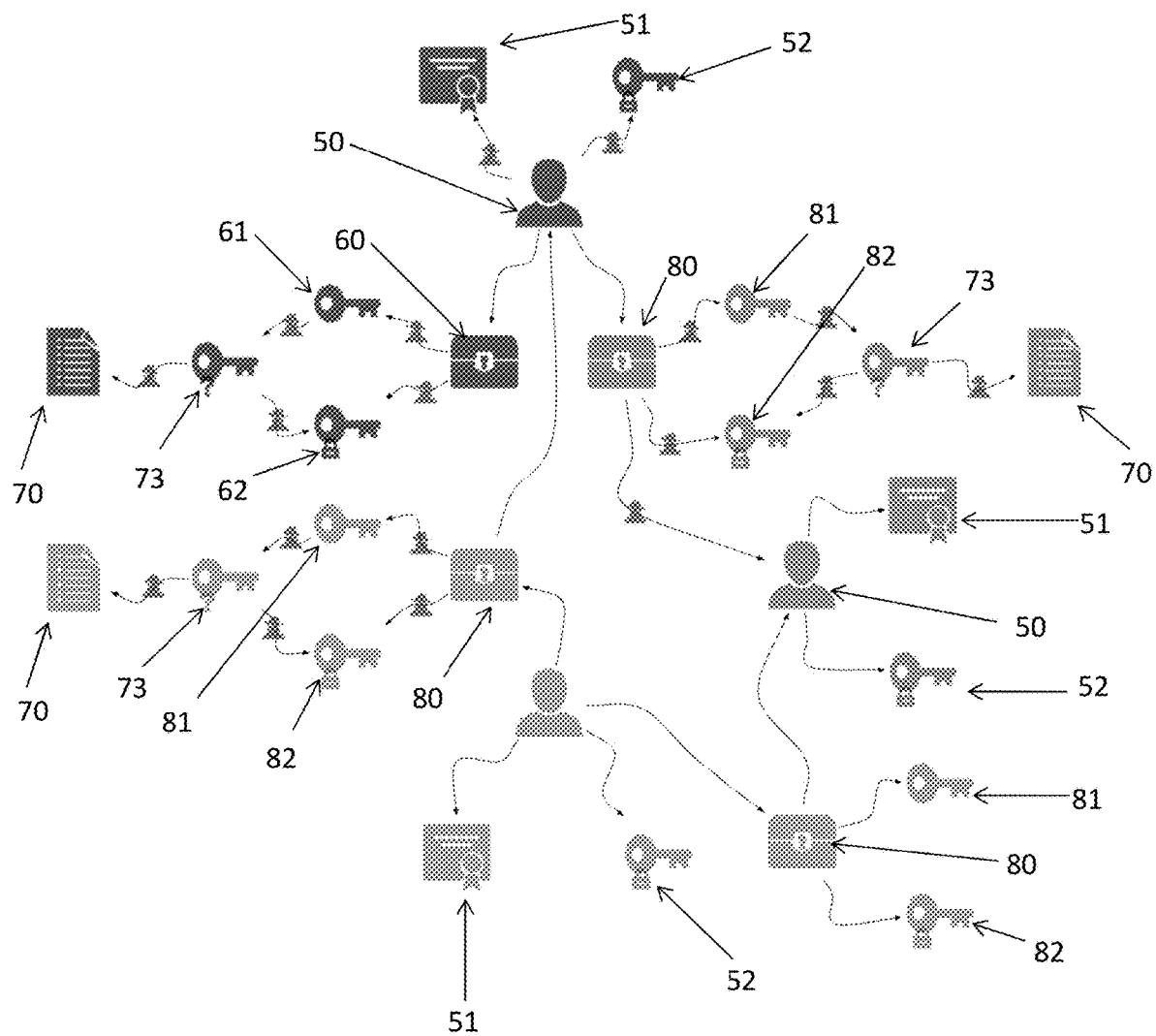

FIG. 12 shows a key concept for compromised PersonalKeyPair.

Figure 13:
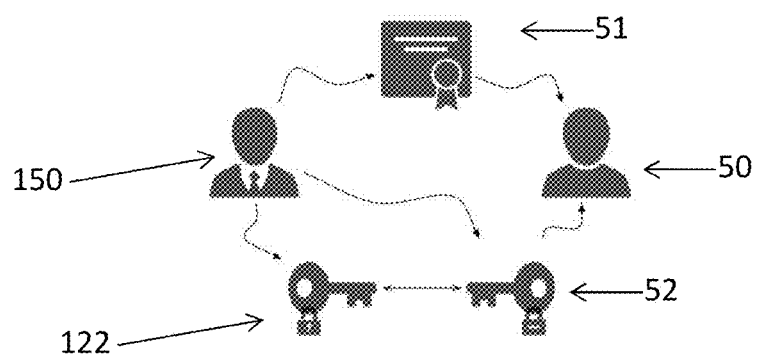

FIG. 13 shows a key concept for administration by Admin.

Figure 14A:
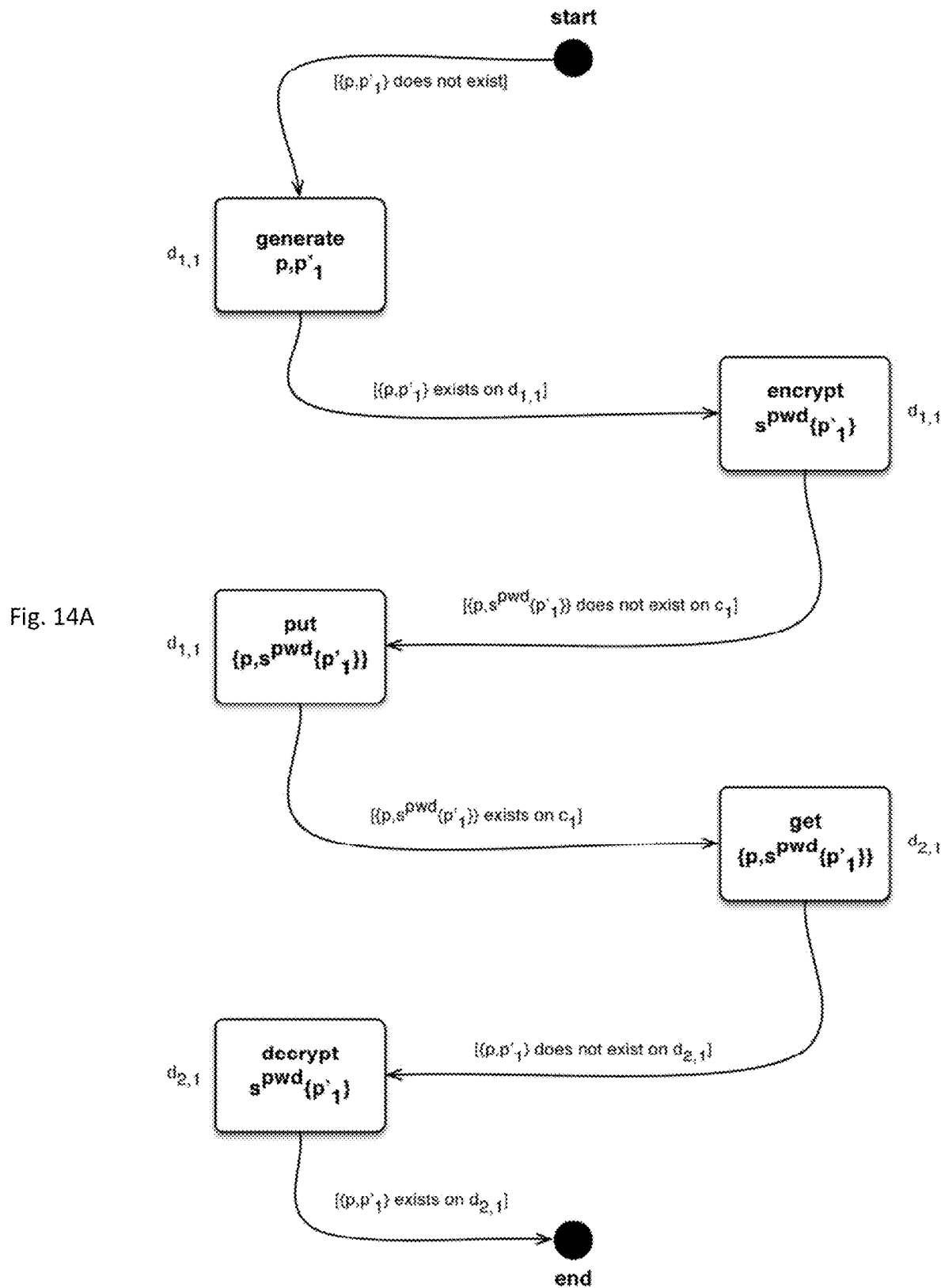

FIG. 14A is a flow diagram for generation, storage and retrieval of a personal key pair.

Figure 14B:
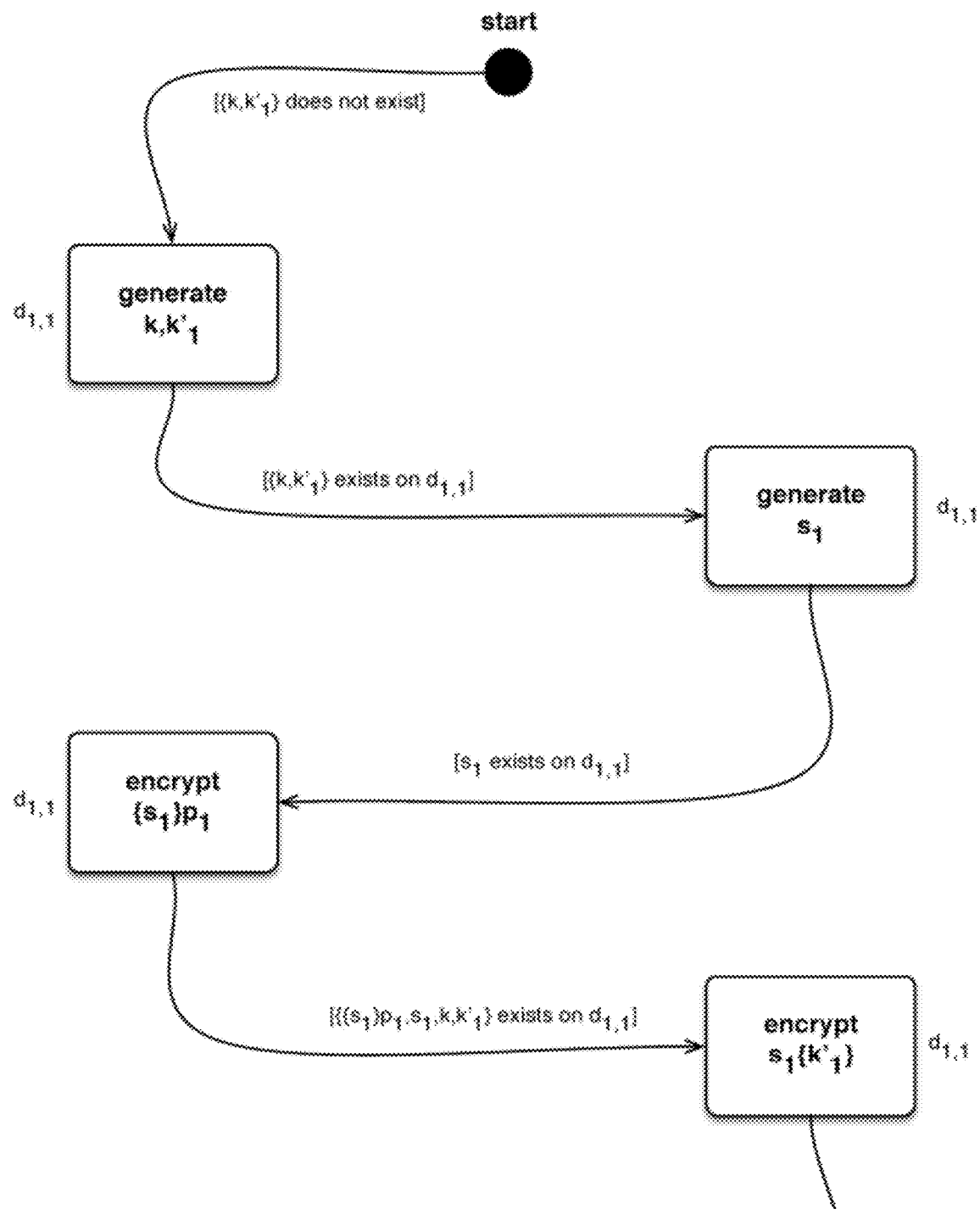
Figure 14B:
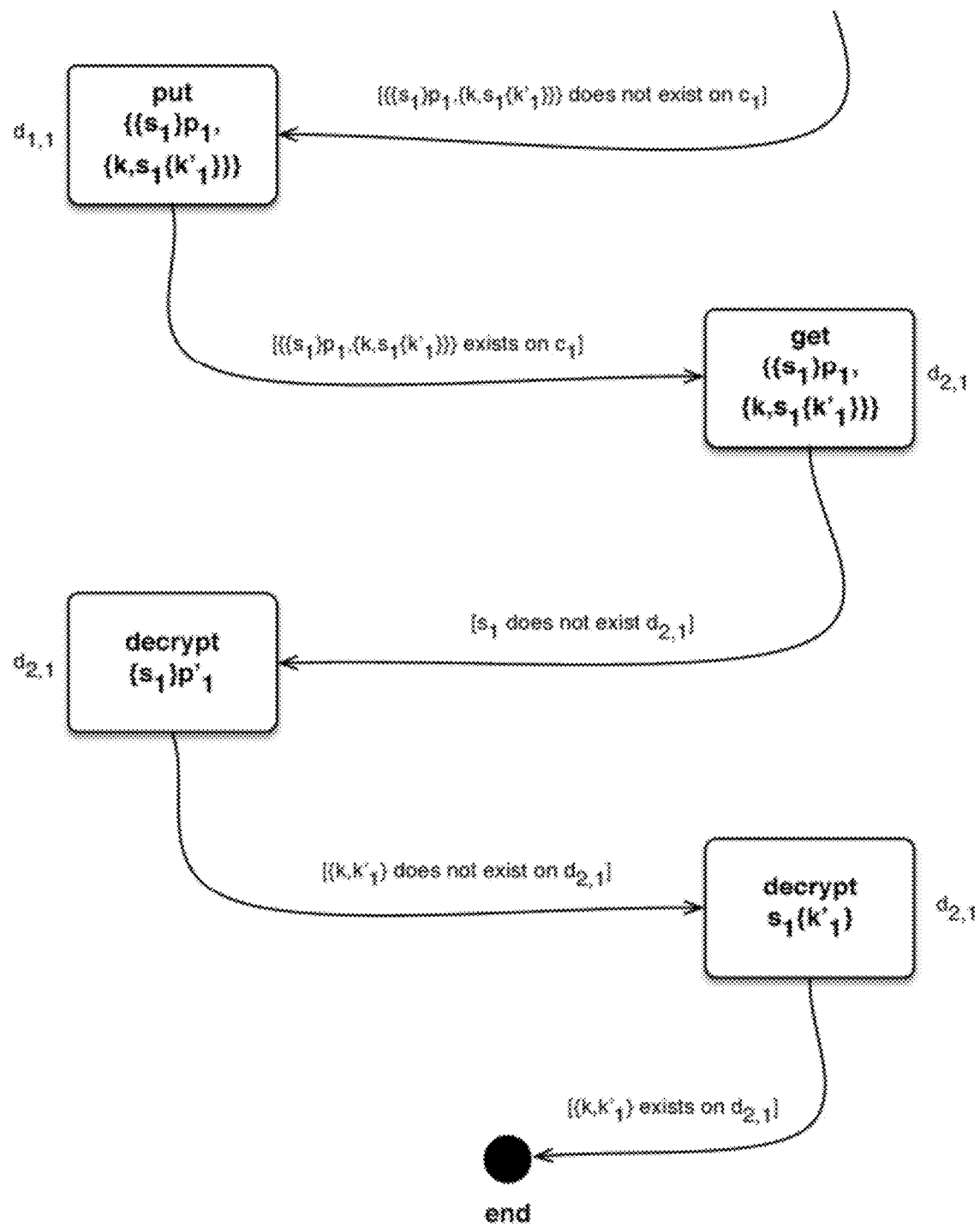

FIG. 14B is a flow diagram for generation, storage and retrieval of a store key pair.

Figure 14C:
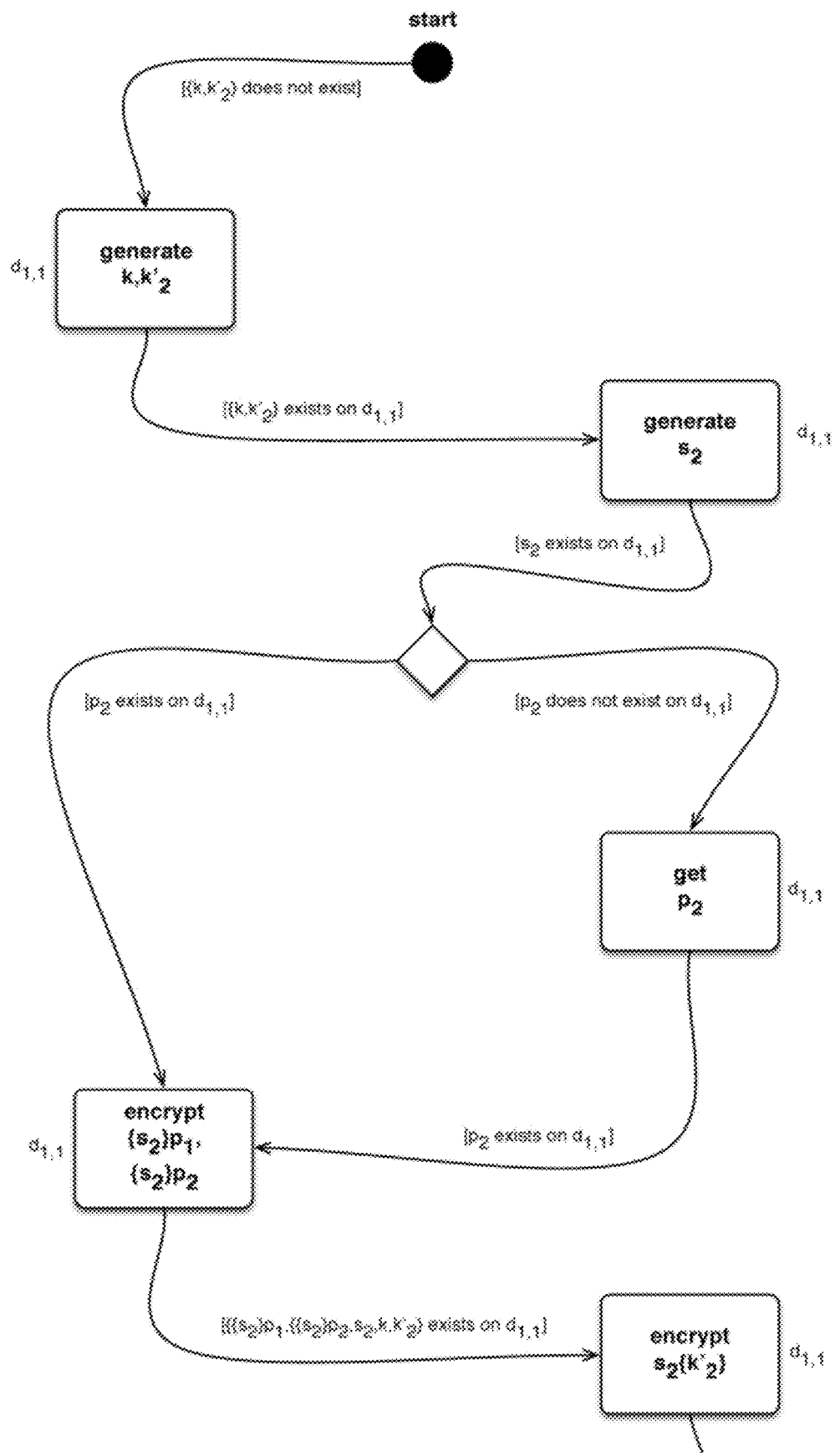
Figure 14C:
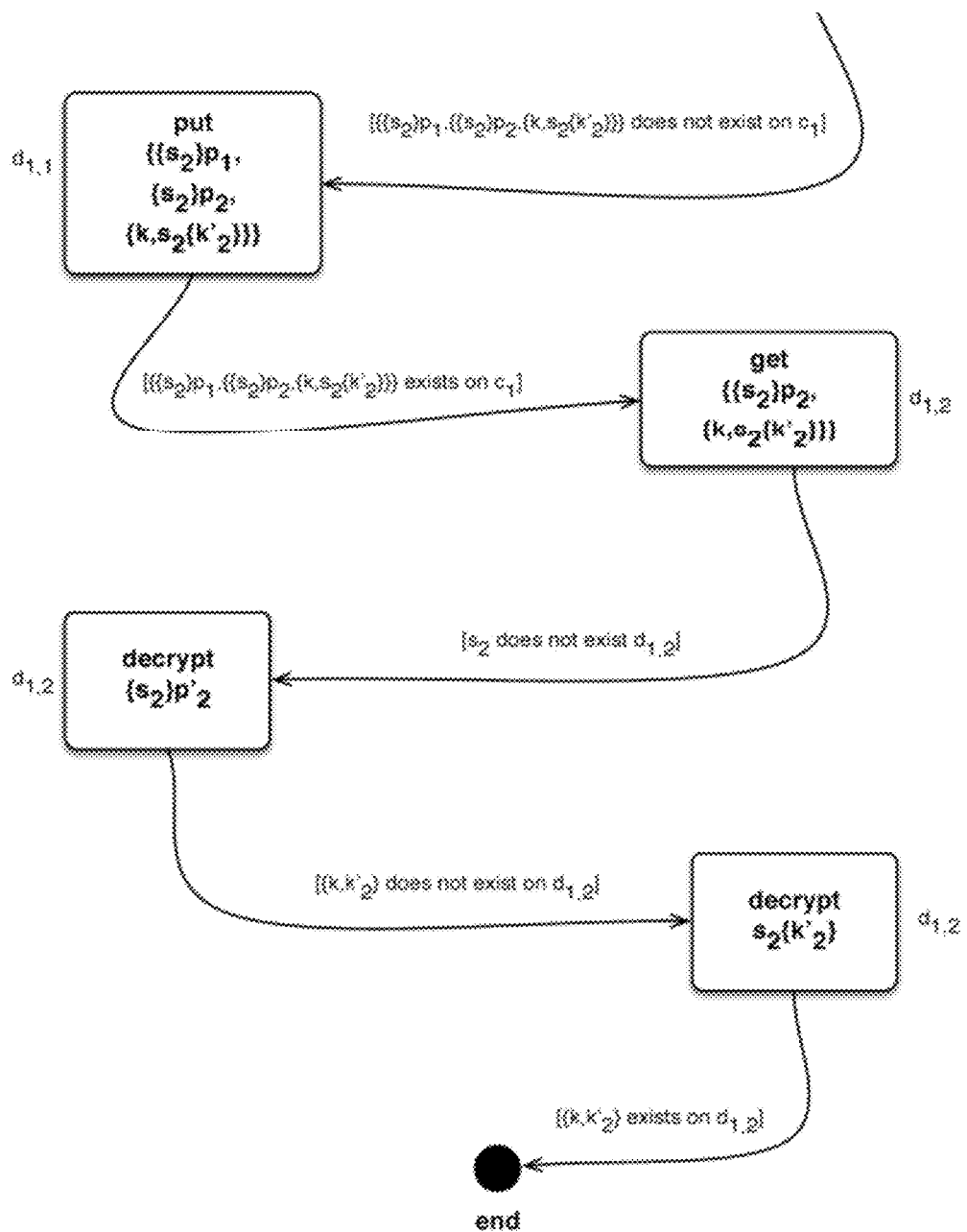

FIG. 14C is a flow diagram for generation, storage and retrieval of a share key pair.

Figure 14D:
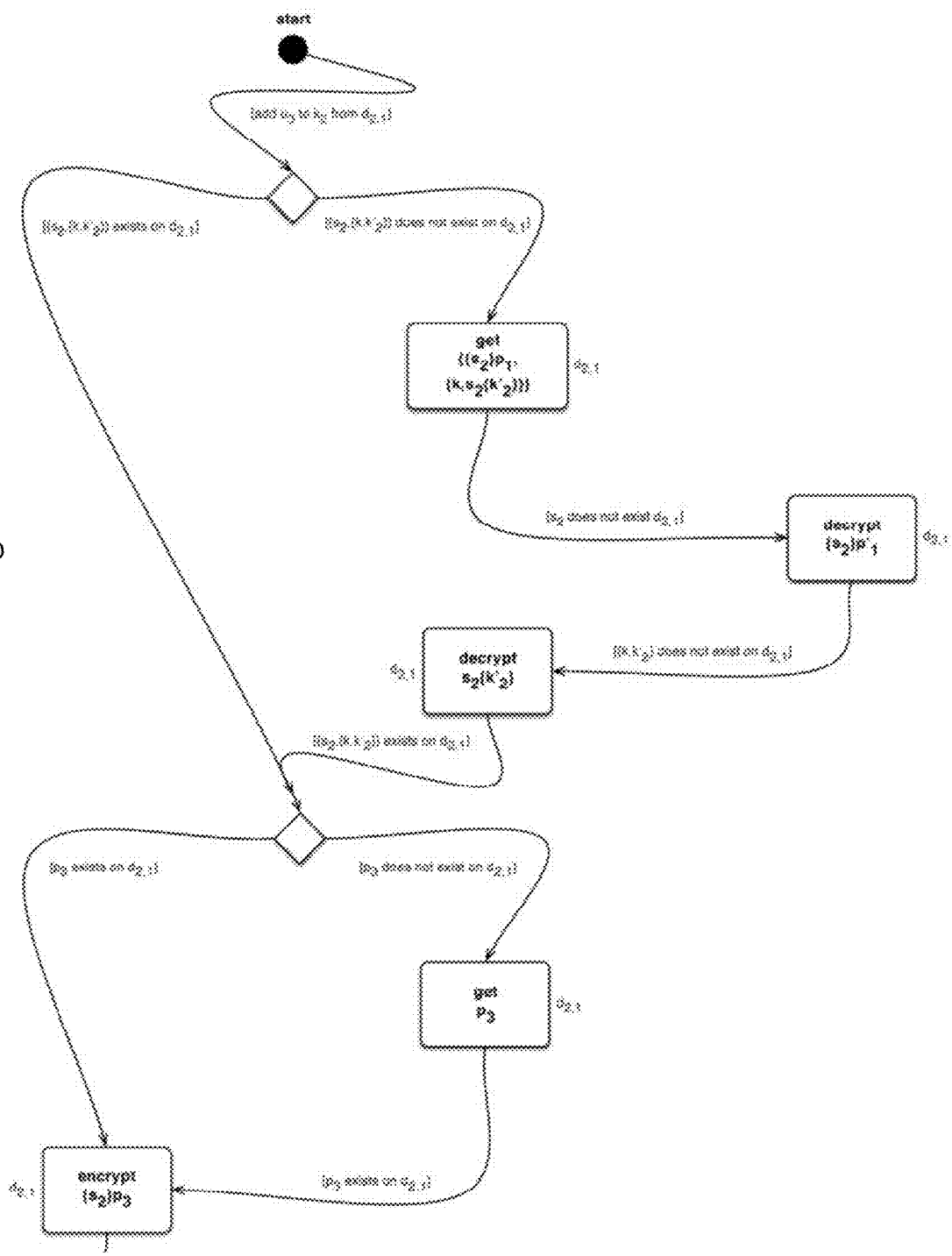
Figure 14D:
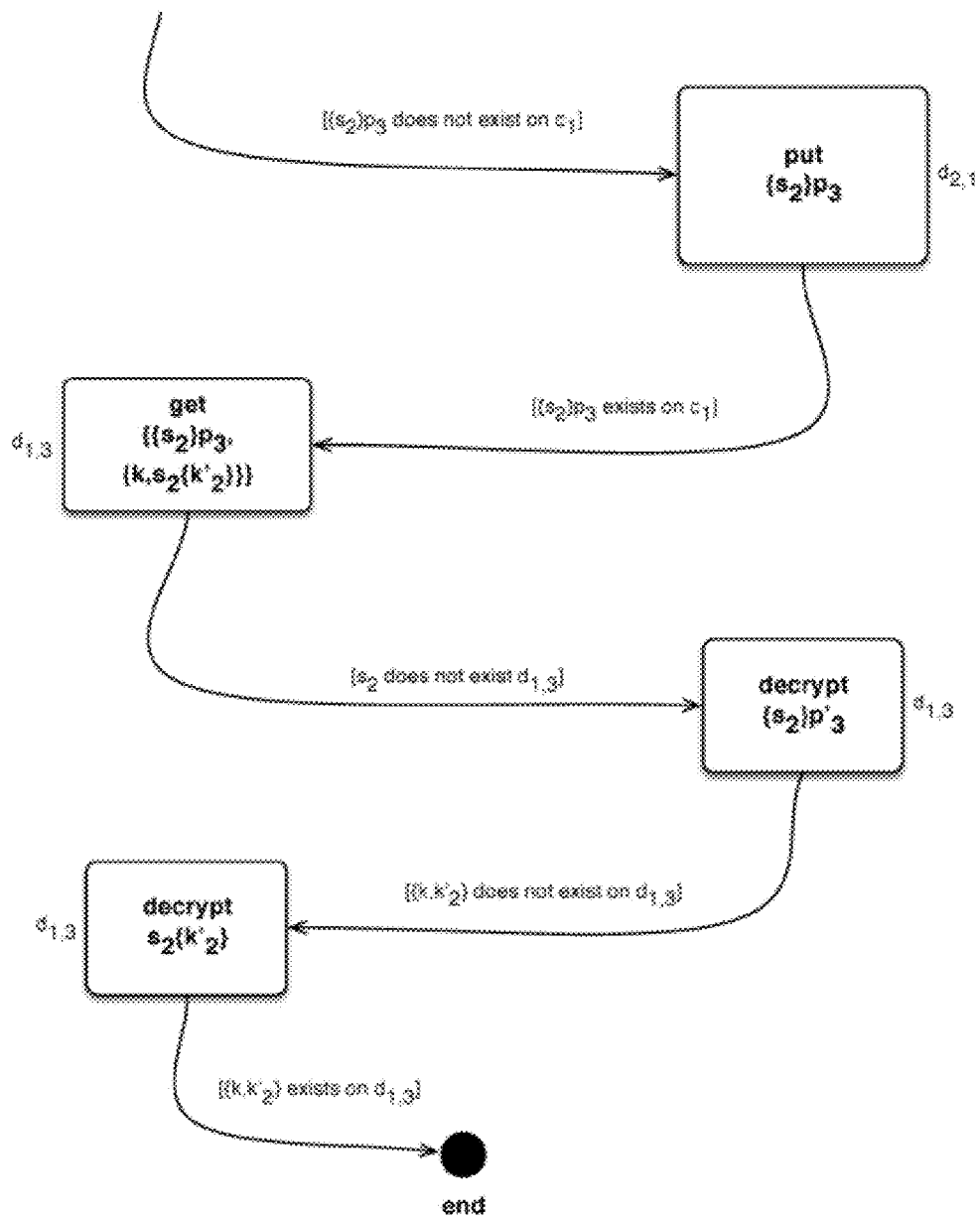

FIG. 14D is a flow diagram for adding user, store and retrieve share keys.

Figure 14E:
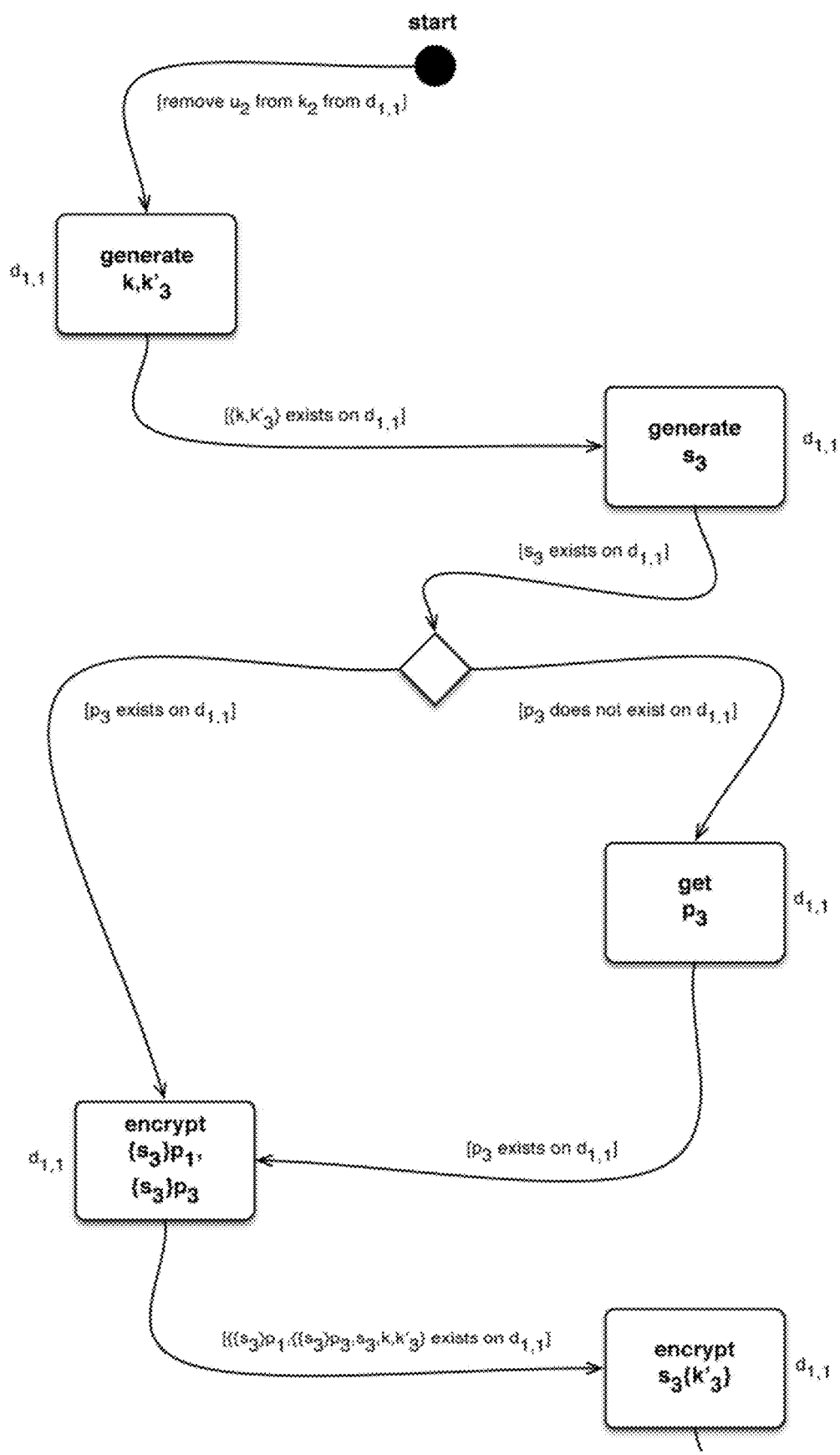
Figure 14E:
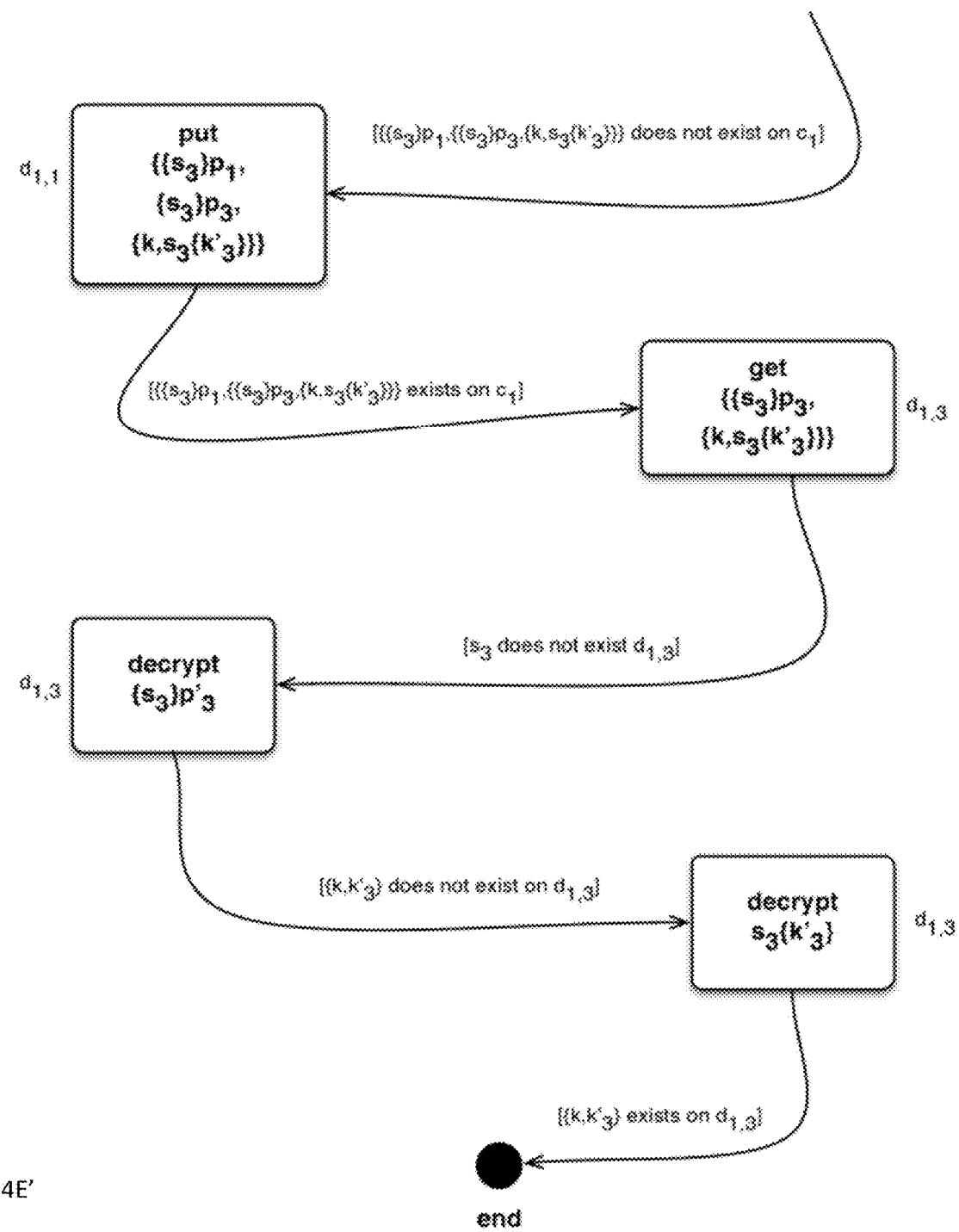

FIG. 14E is a flow diagram for removing user from storage, updating share keys.

Figure 14F:
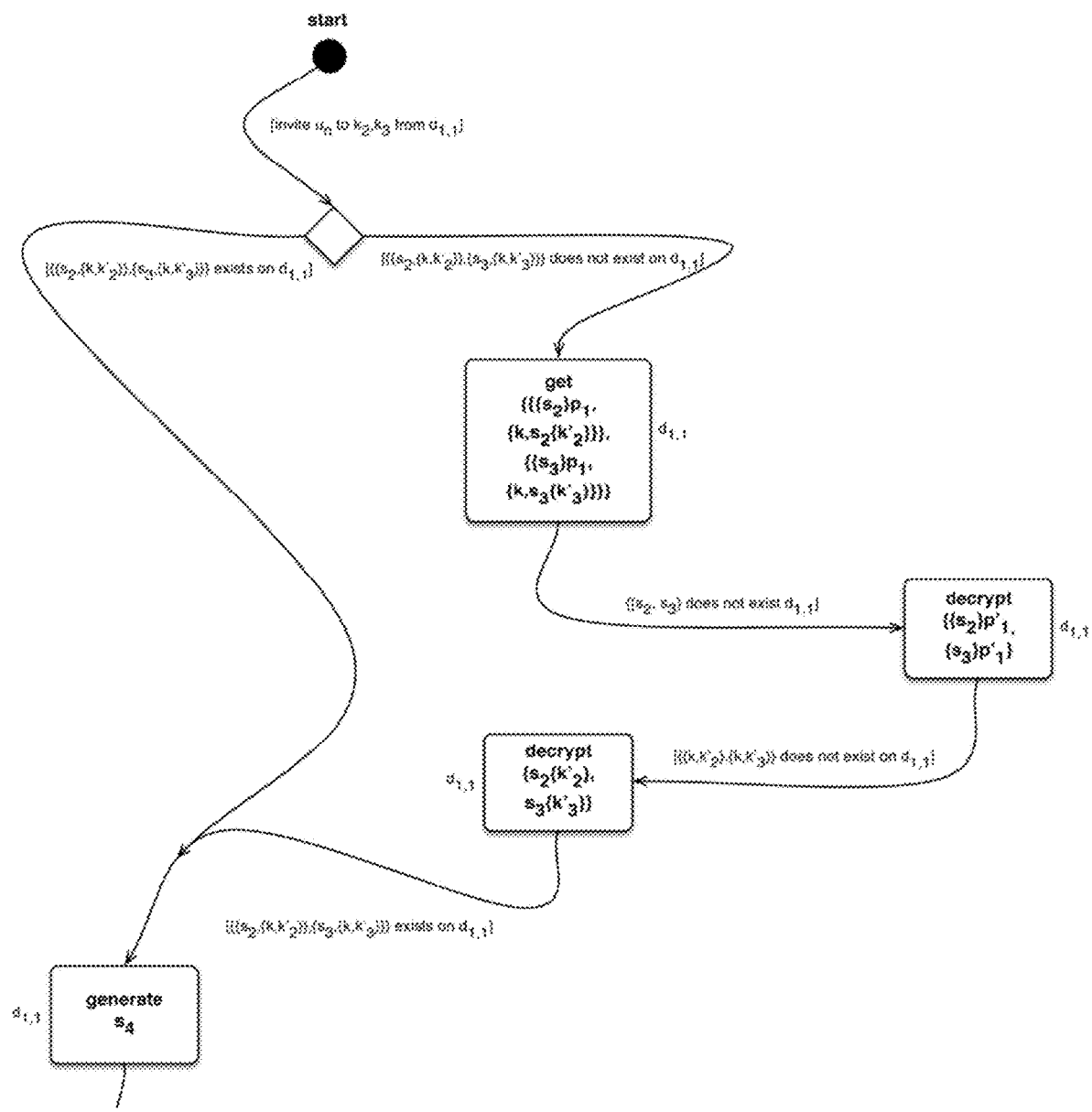
Figure 14F:
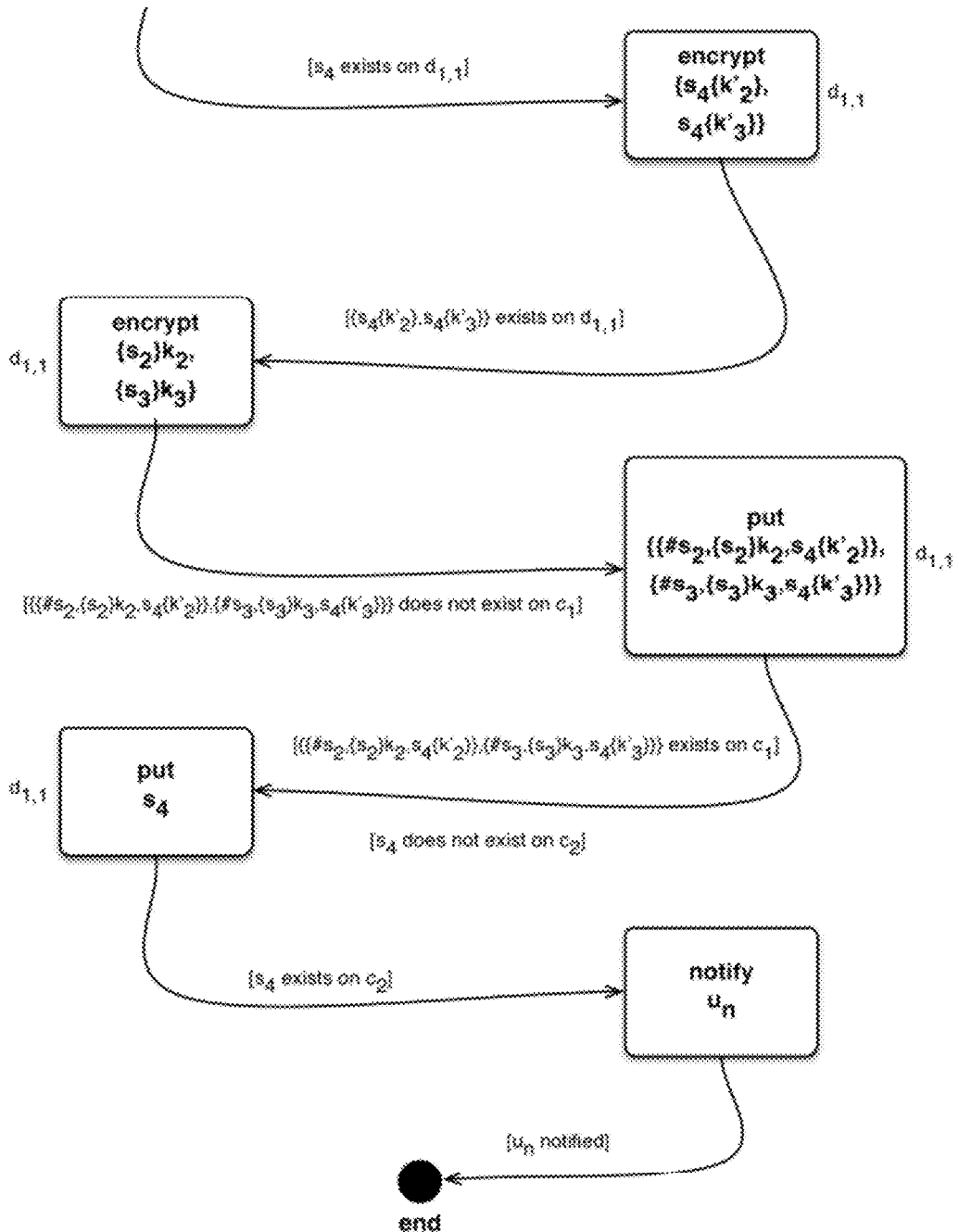

FIG. 14F is a flow diagram for distribution of share keys with invited user.

Figure 14G:
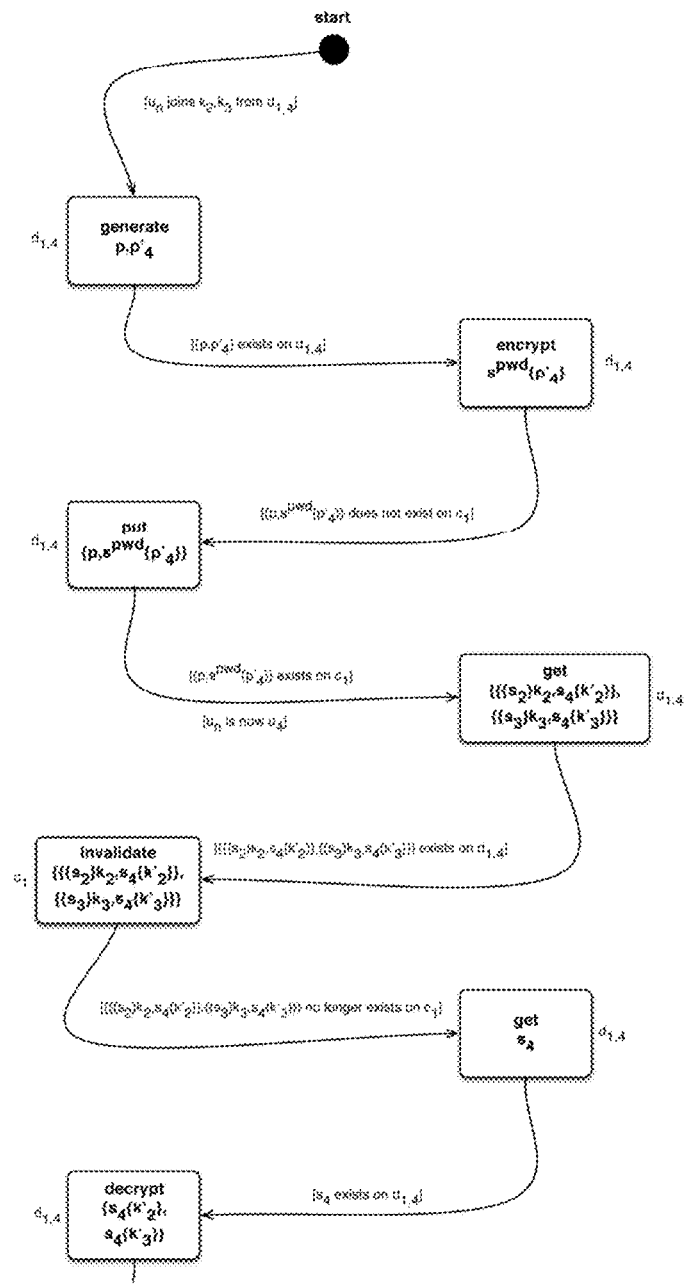
Figure 14G:
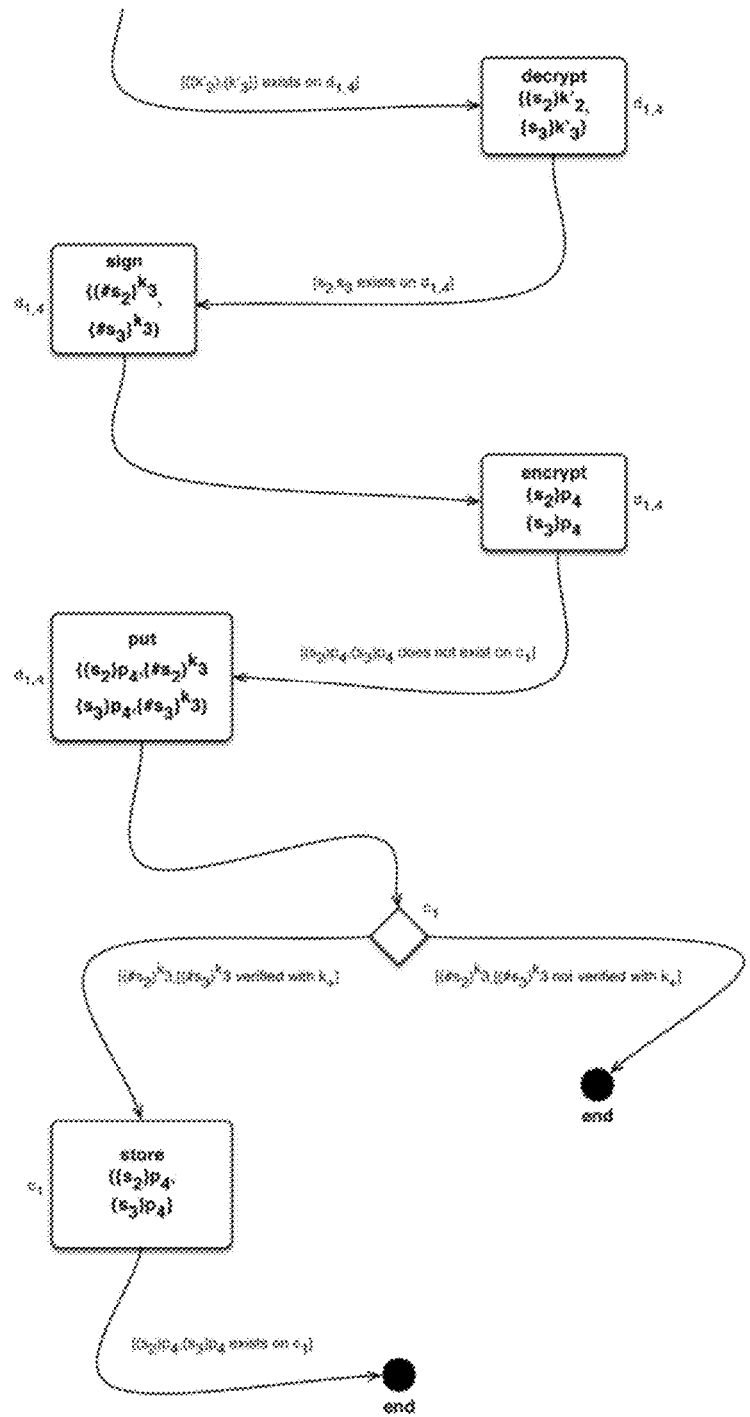

FIG. 14G is a flow diagram for invited user retrieve share keys.

Figure 14H:
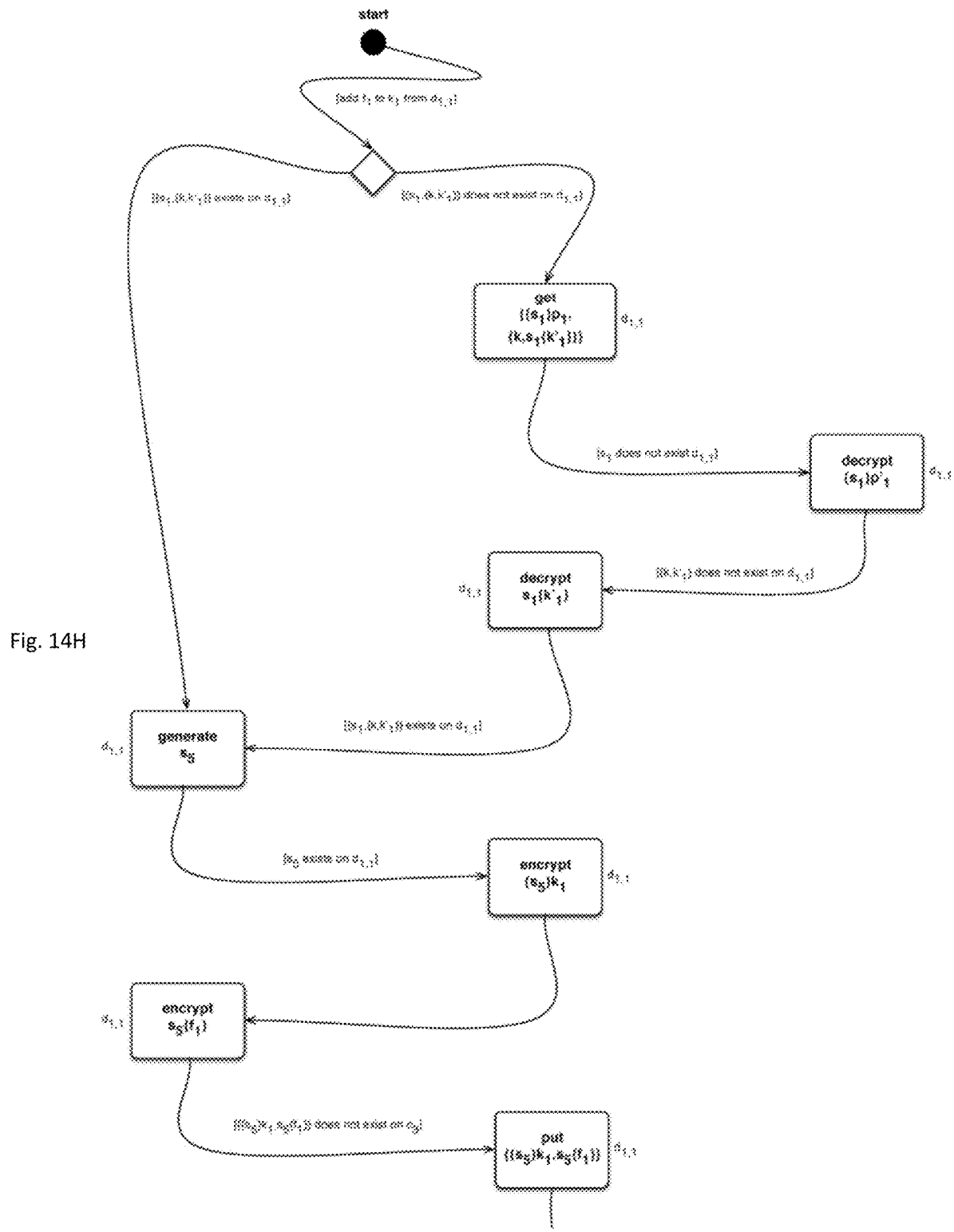
Figure 14H:
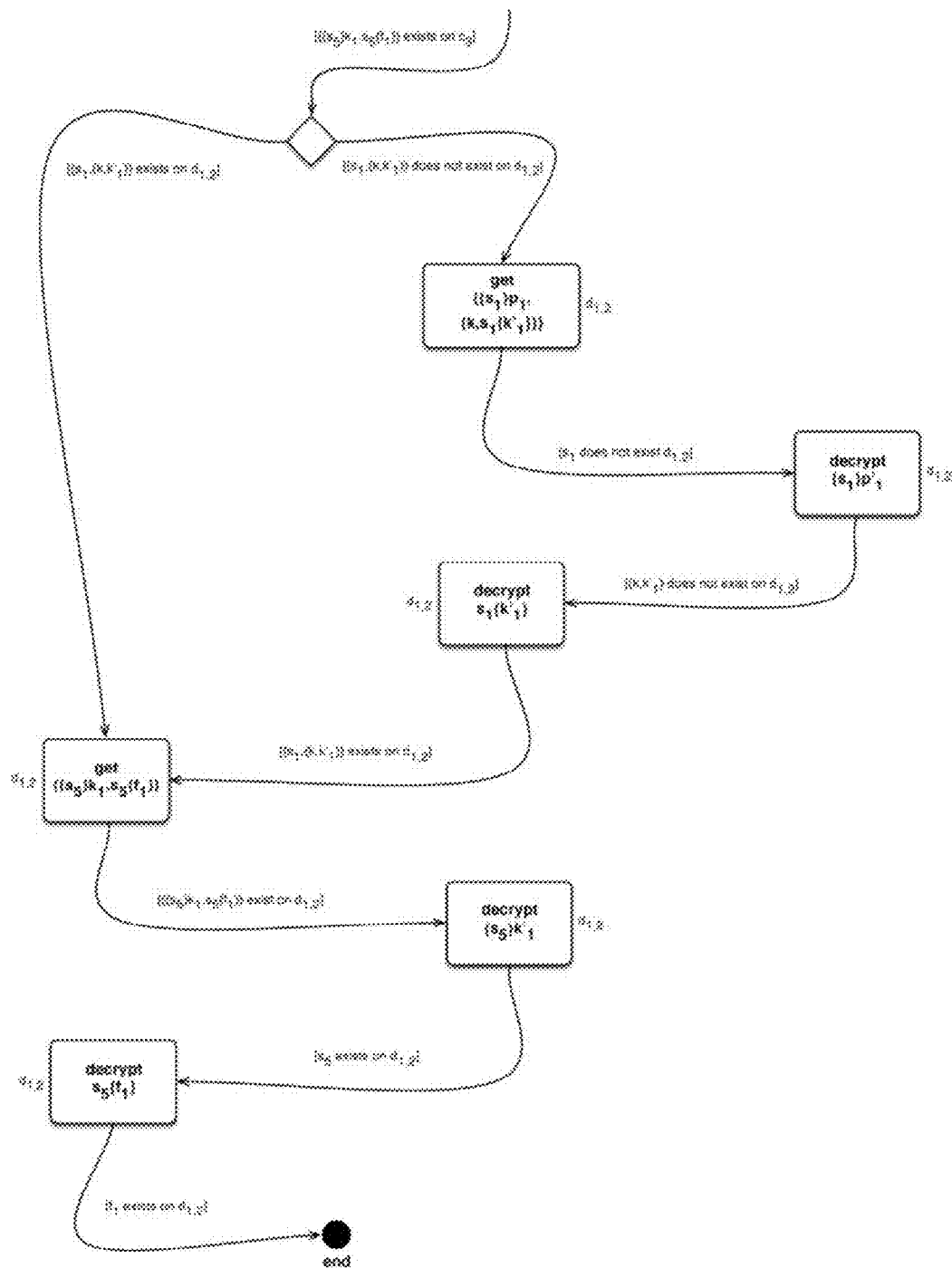

FIG. 14H is a flow diagram for retrieving and decrypting data entity.

Figure 14I:
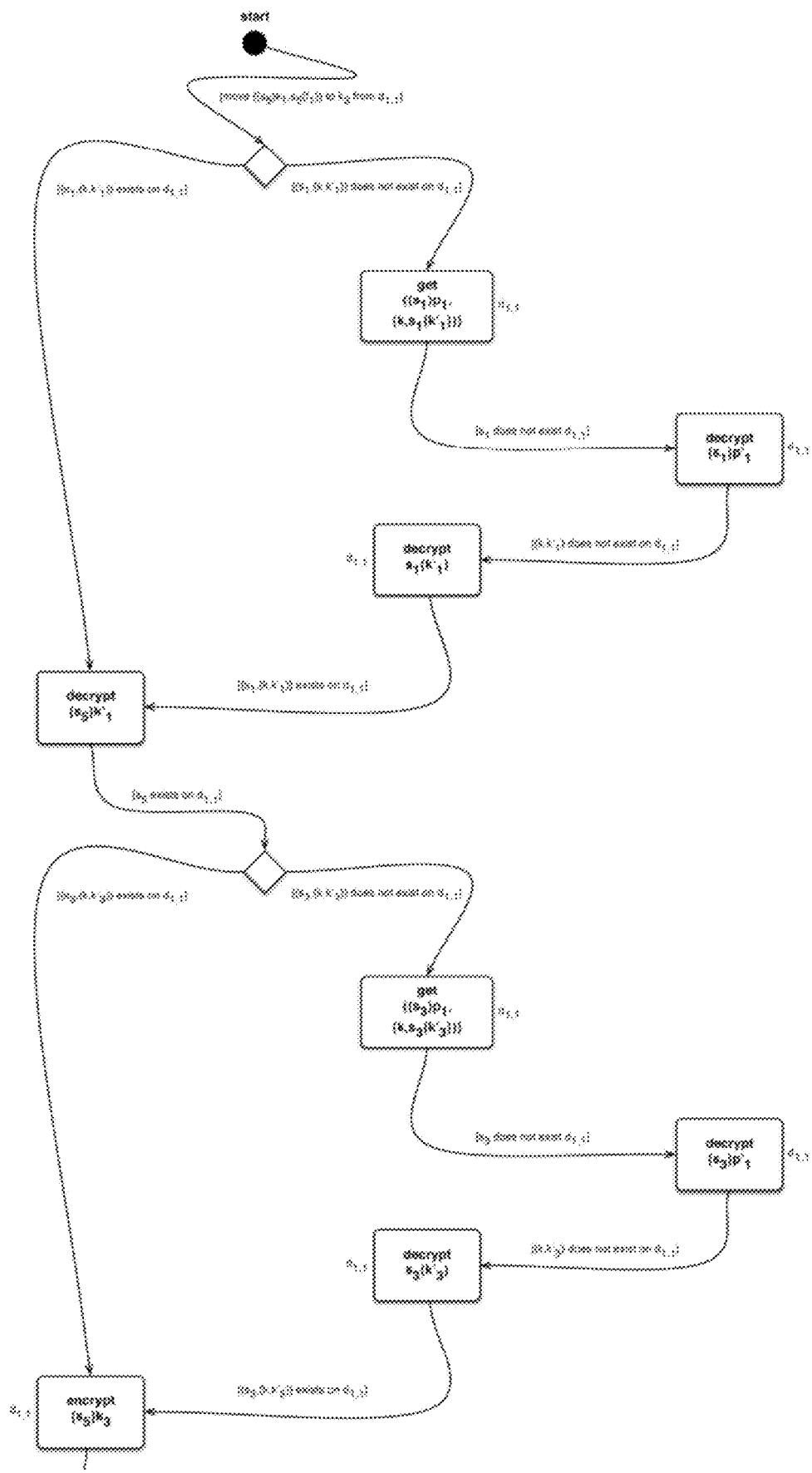
Figure 14L:
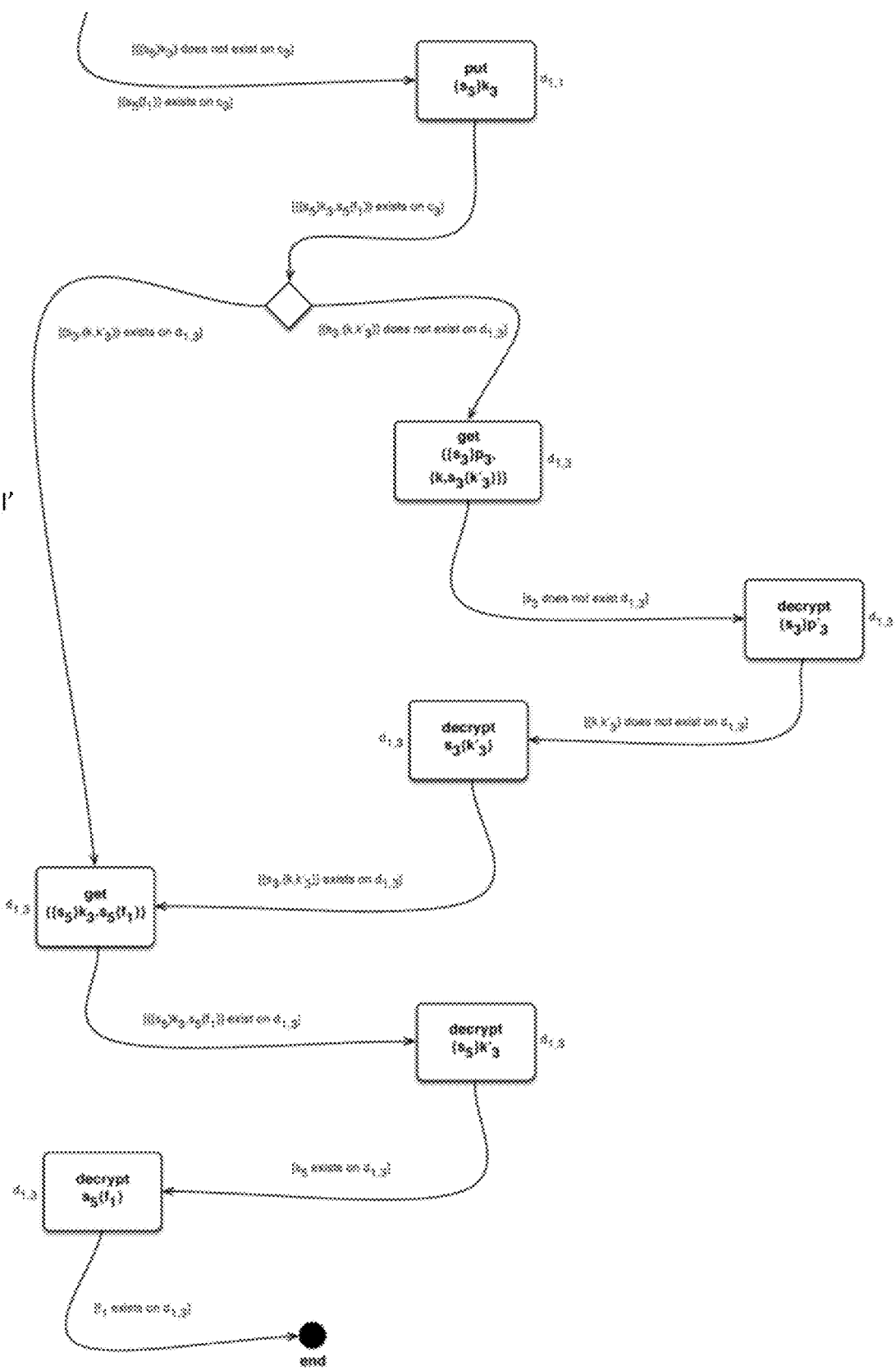

FIG. 14I is a flow diagram for inviting user to share.

Figure 15:
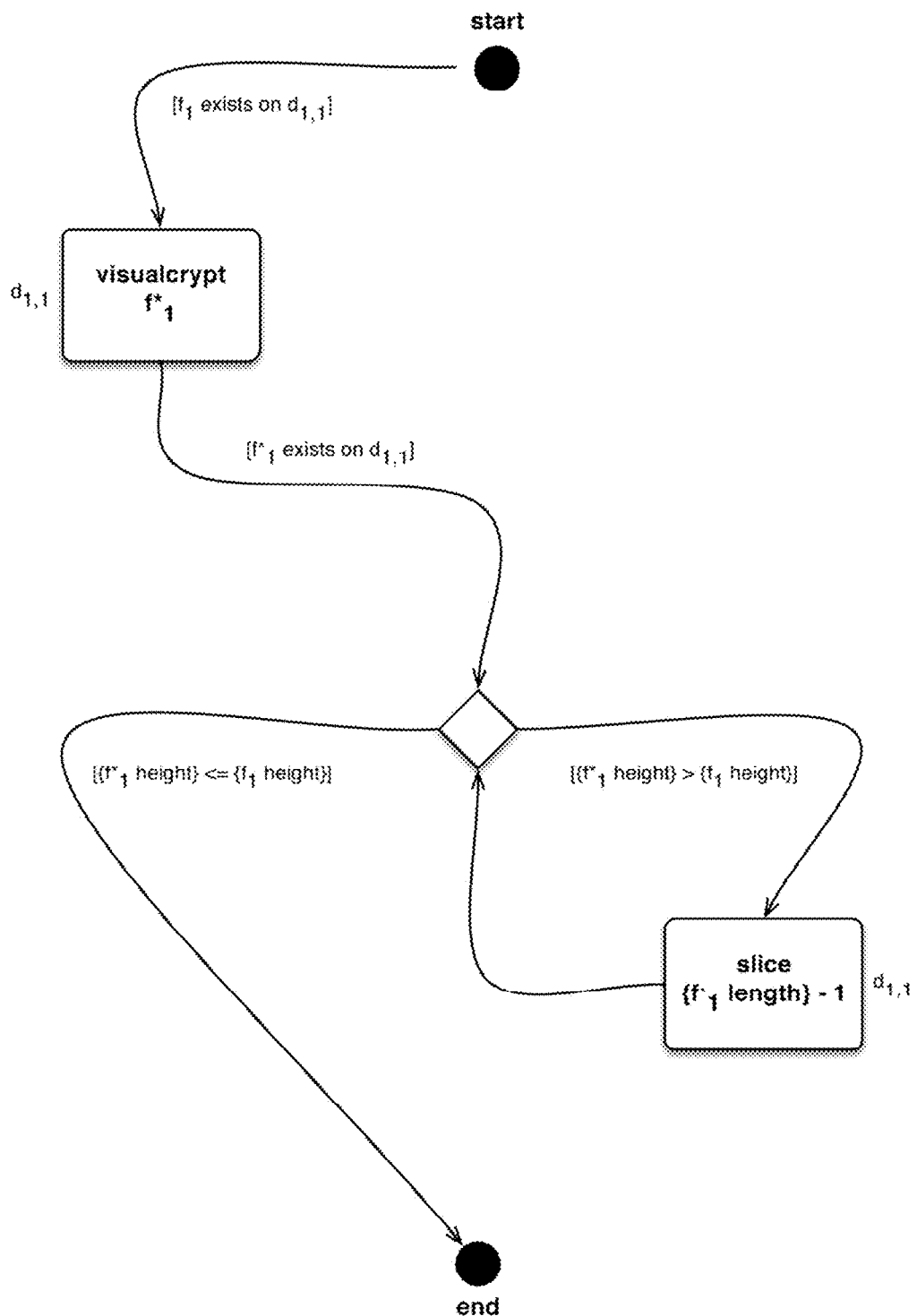

FIG. 15 is a flow diagram of the visualcrypt calculation of the text box size.

Figure 16:
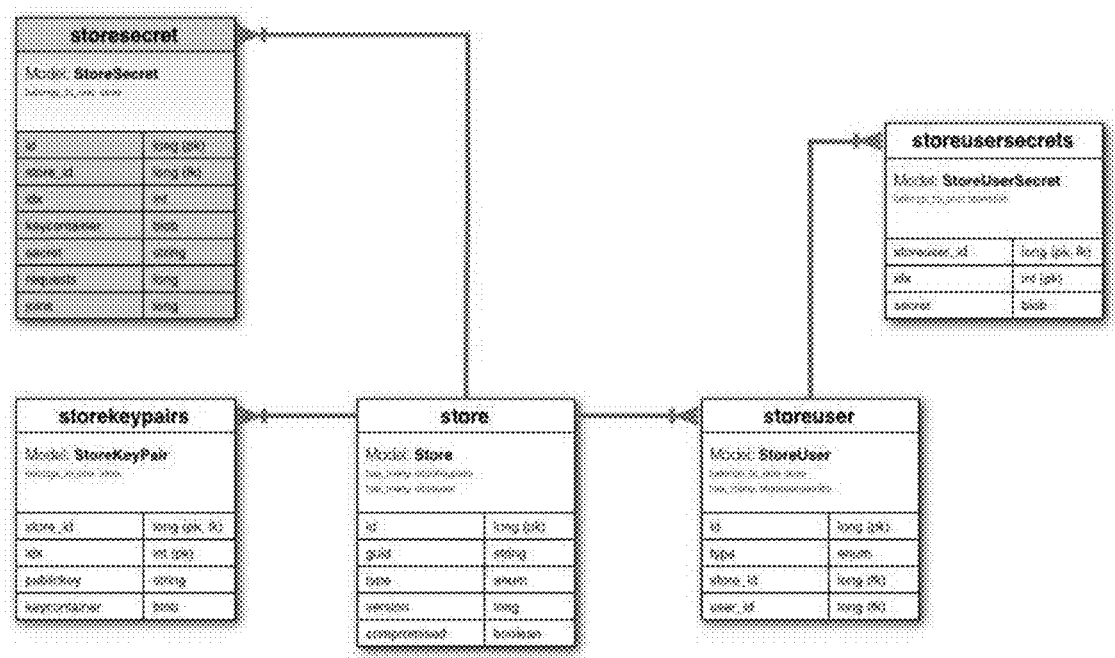

FIG. 16 Data model of Store.

Figure 17:
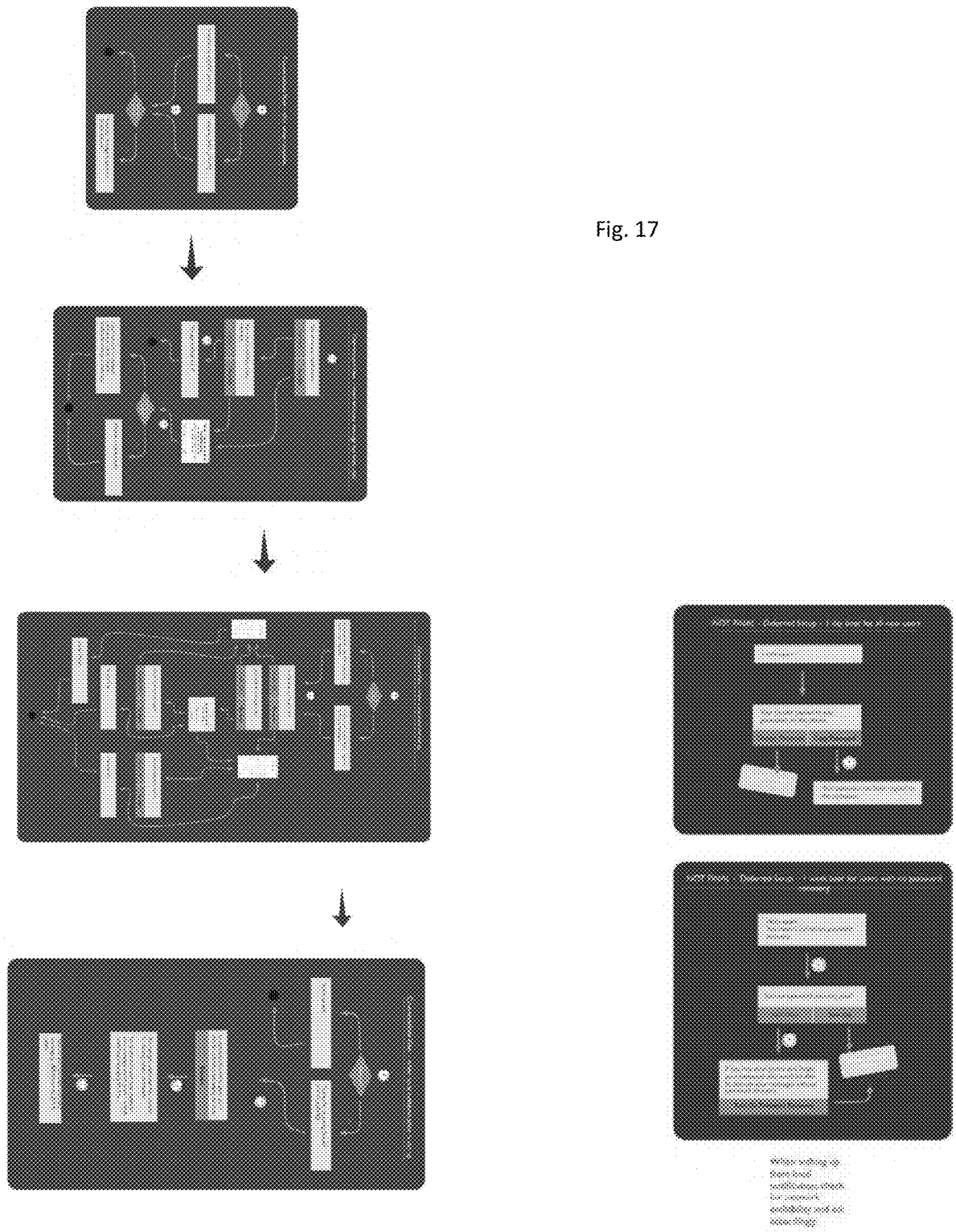
Figure 18A:
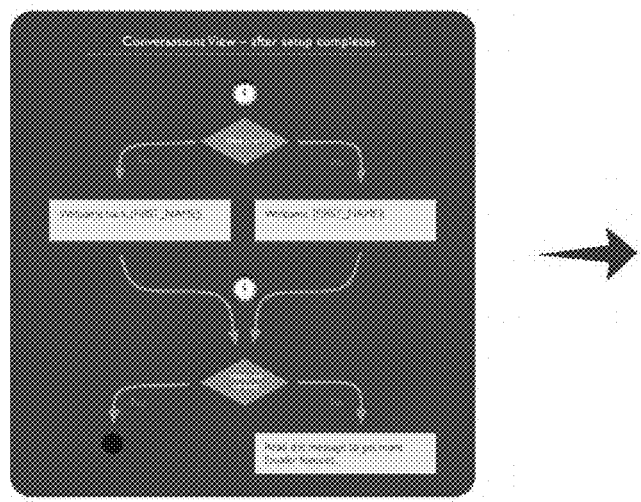
Figure 18B:
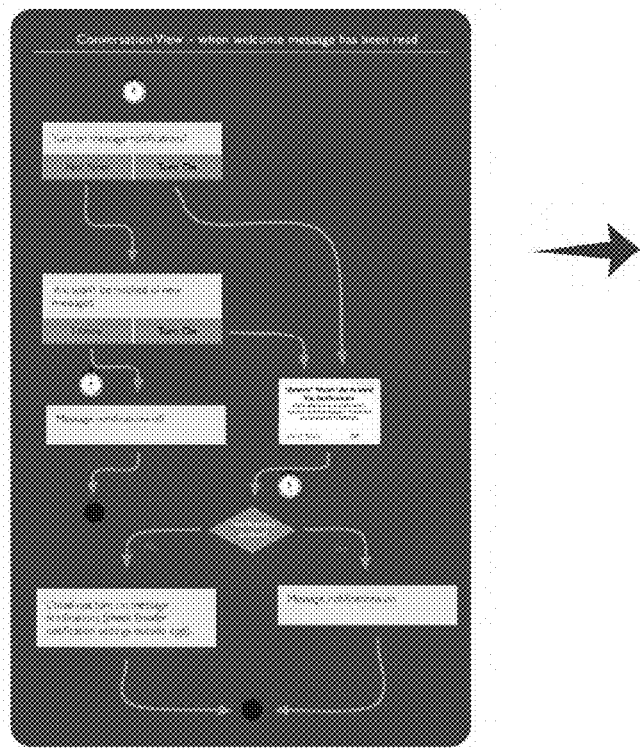
Figure 18C:
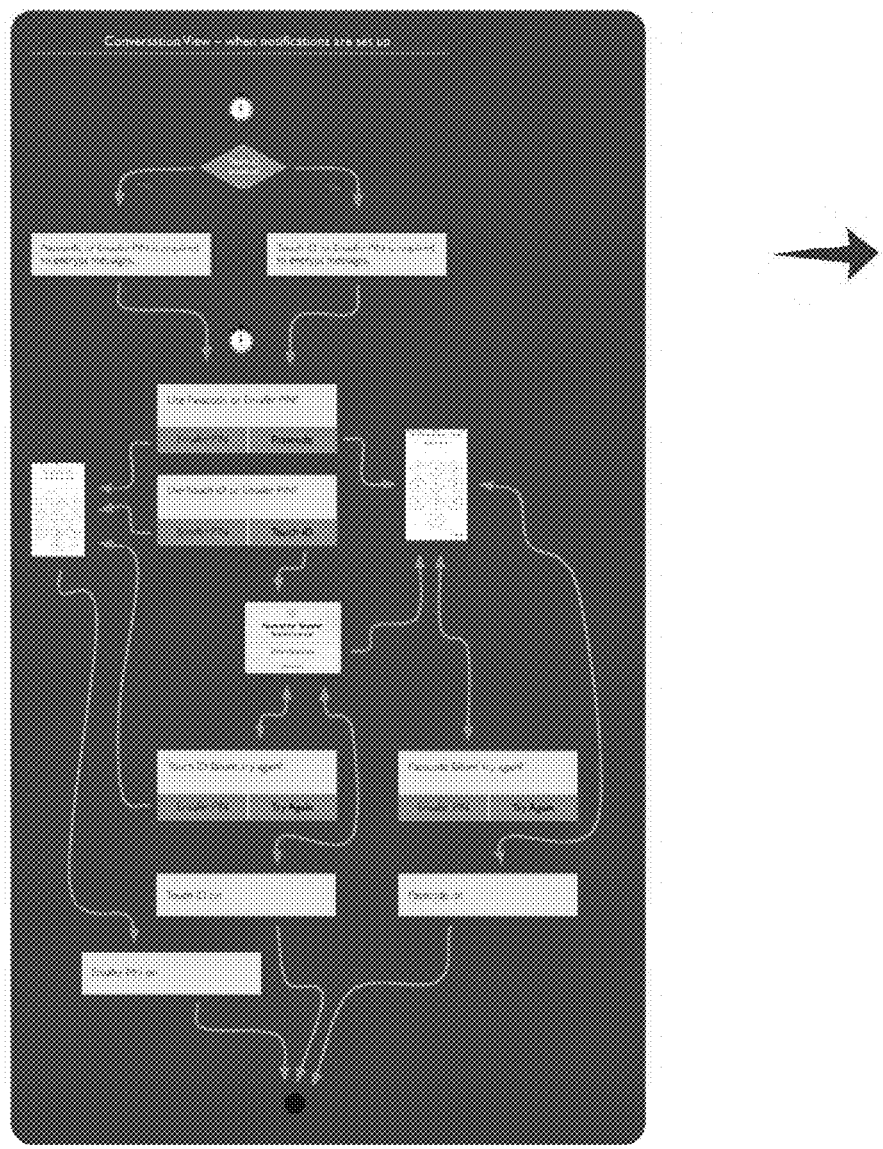
Figure 18D:
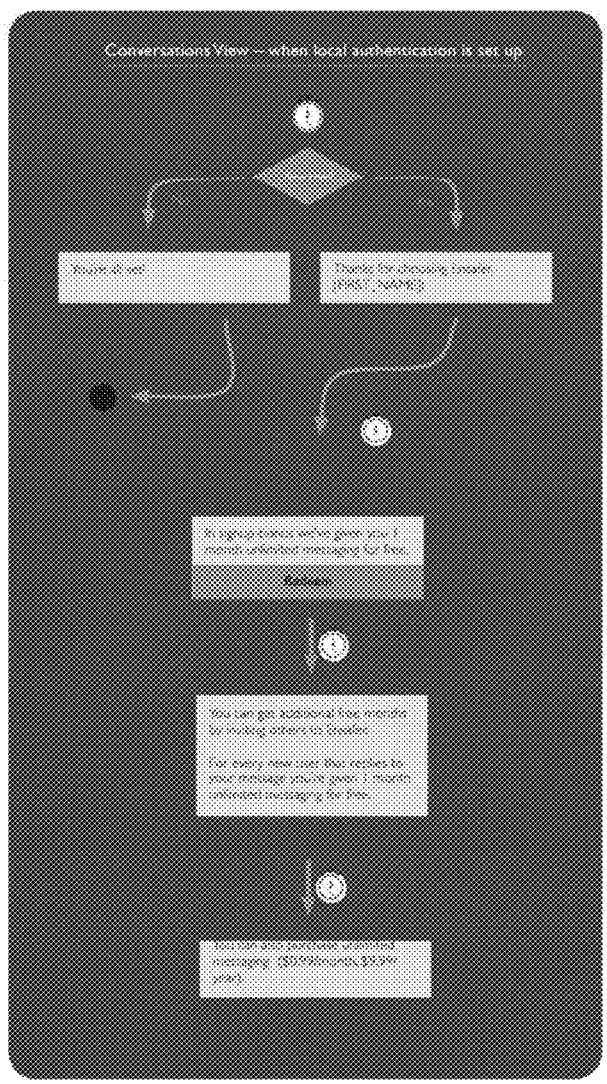
Figure 18E:
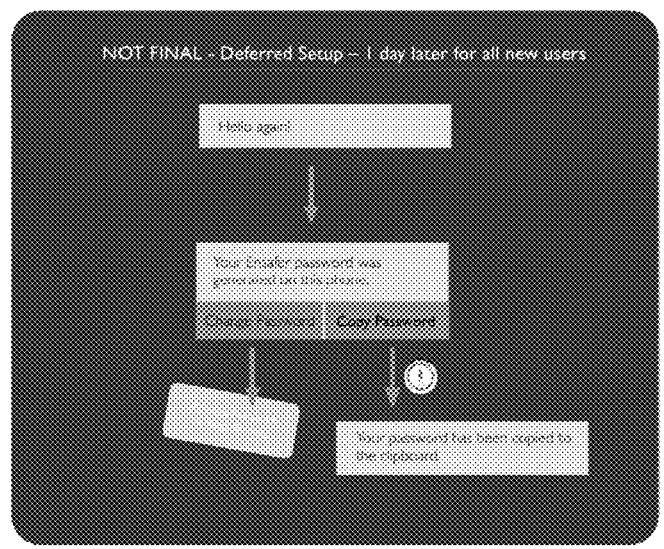
Figure 18E:
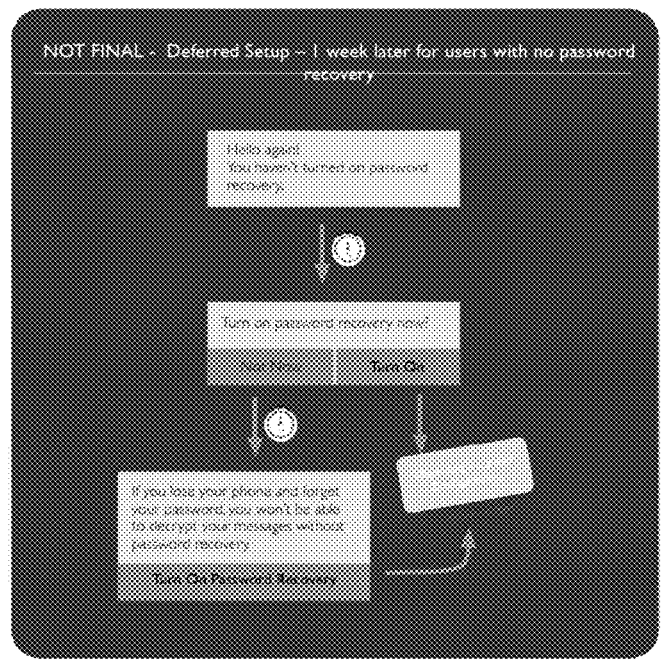

FIG. 17 is a flow diagram sequence showing setting up a phone for exchange.

FIG. 18A-18E shows each section of FIG. 17 in blown up versions.

Figure 19A:
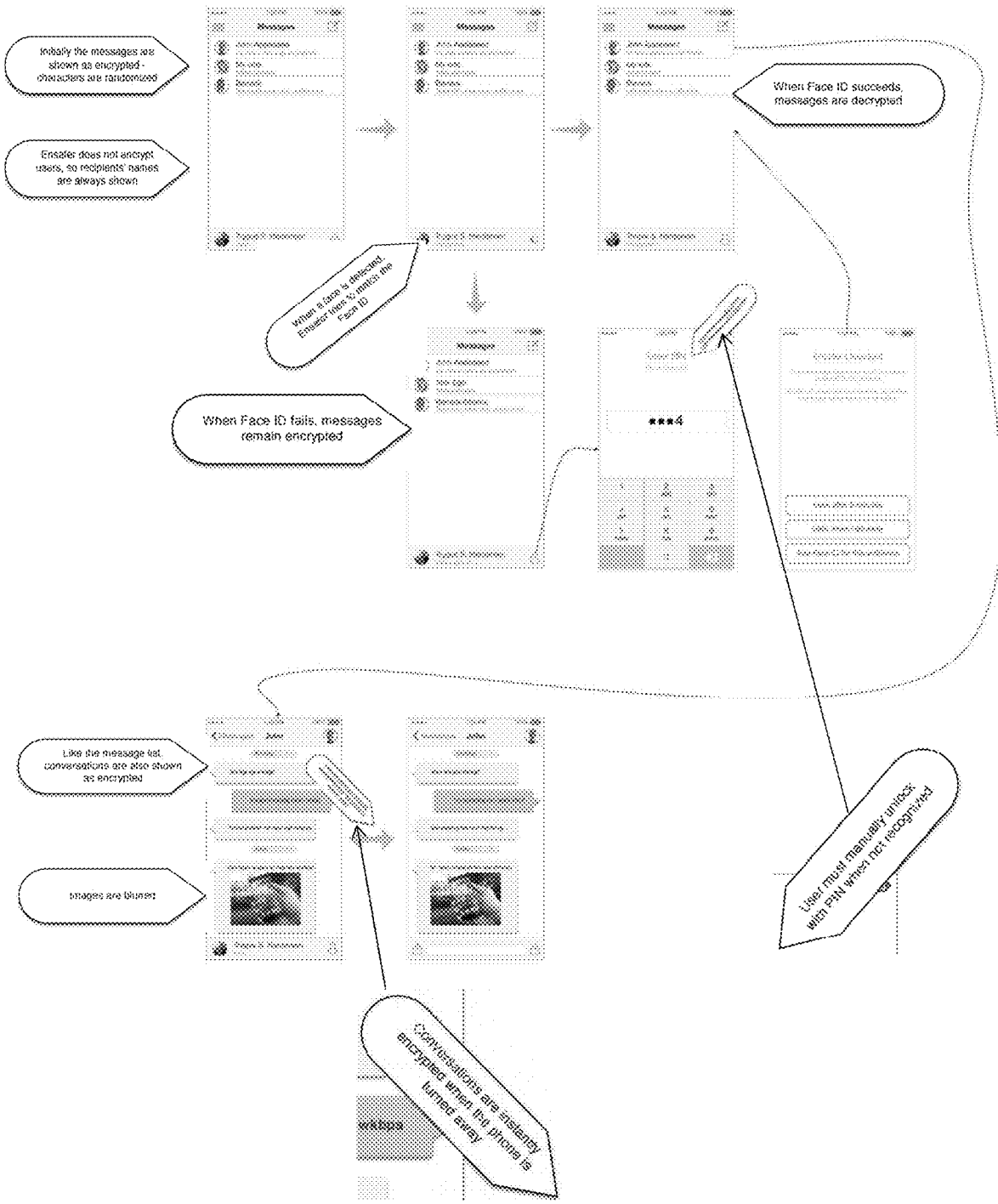
Figure 19B:
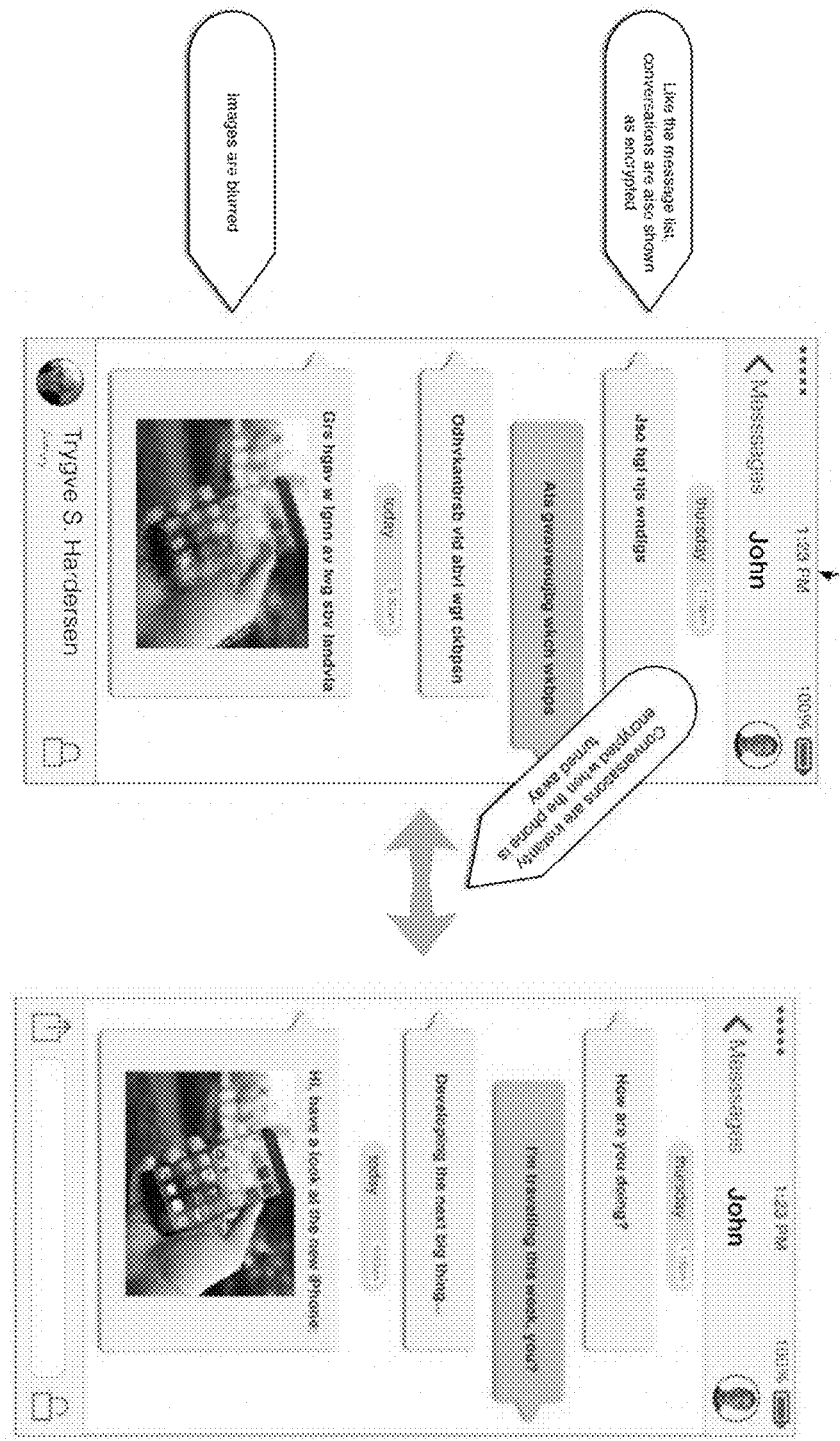

FIG. 19A-19B shows user scenario for face detection blurring feature.

FIG. 20 Data model.

FIG. 21A-21G shows a mobile phone login and password lock sequence, and a second/remote face locking operation.

Figure 22:
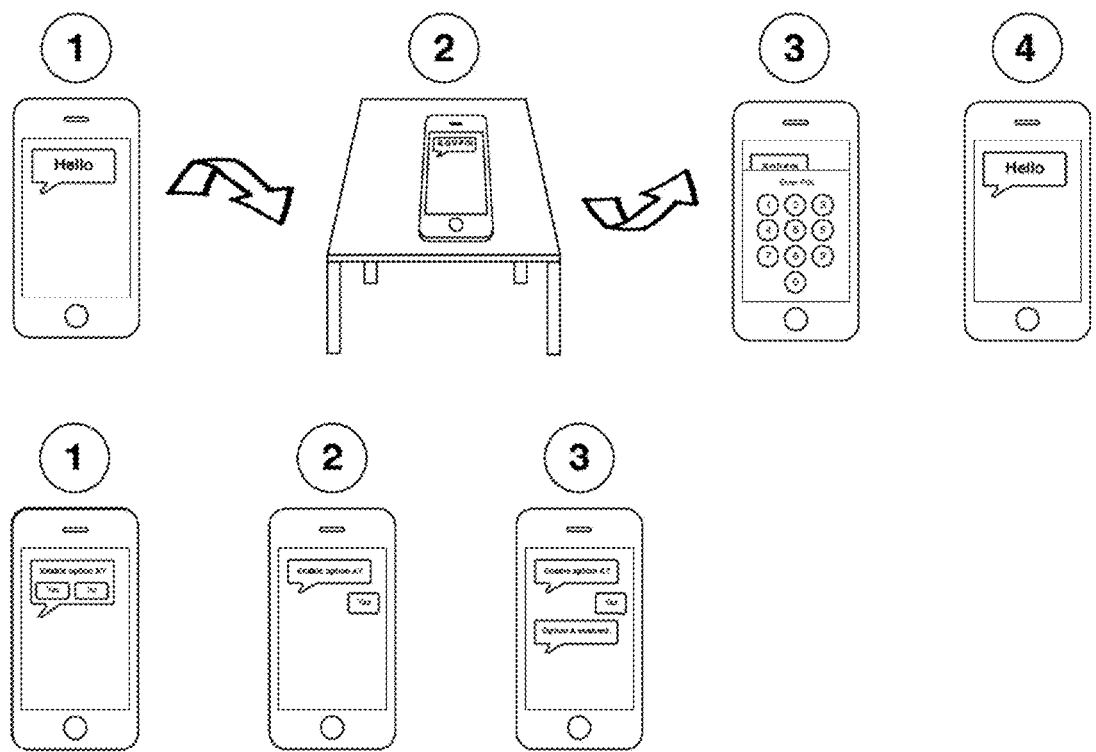

FIG. 22 outlines how the blurring appears when motion detection is enabled.

Figure 23:
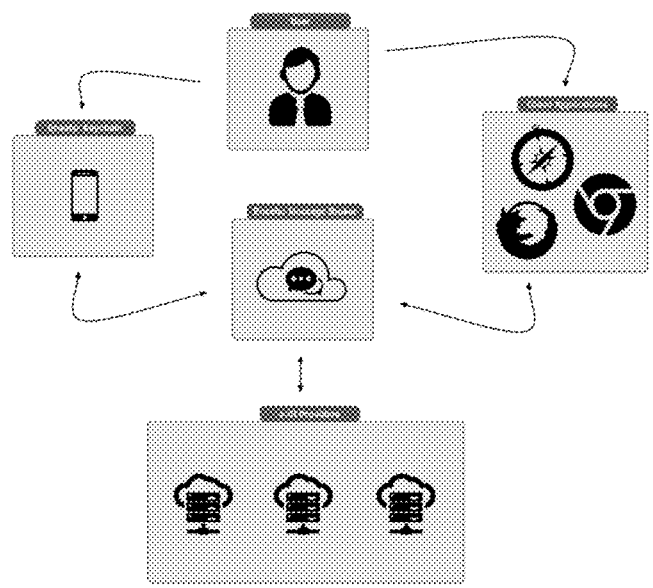

FIG. 23 is an example of a Message Broker architecture.

Figure 24:
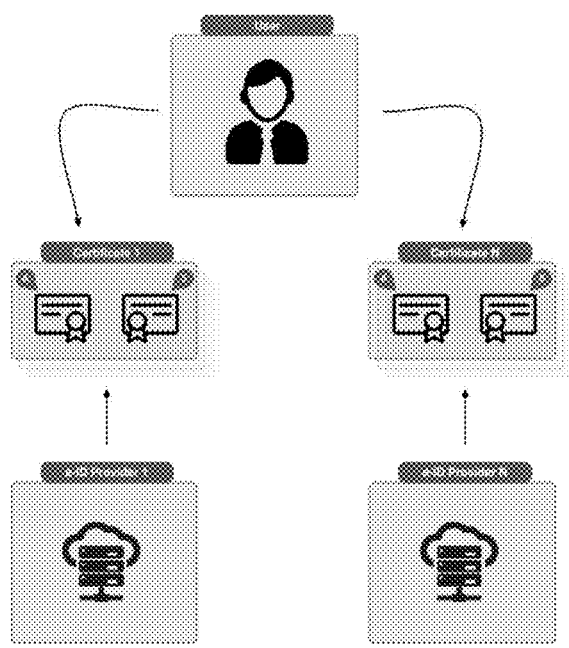

FIG. 24 describes authentication in a message broker environment using a truste e-ID provider.

Figure 25:
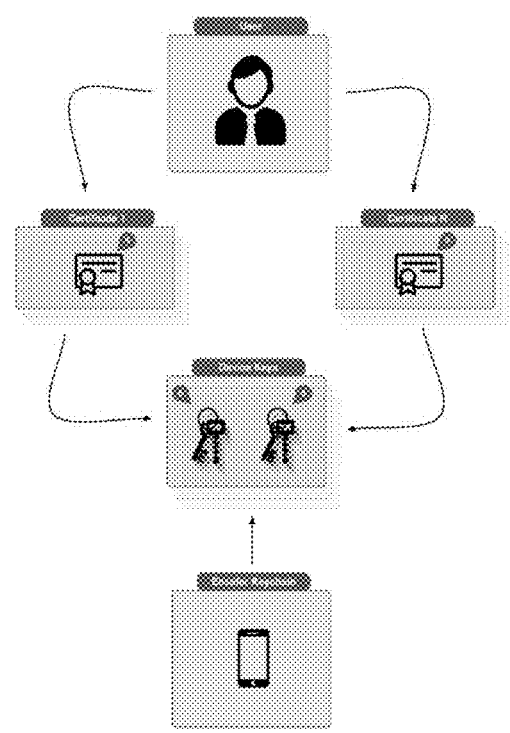

FIG. 25 describes the device keys.

Figure 26:
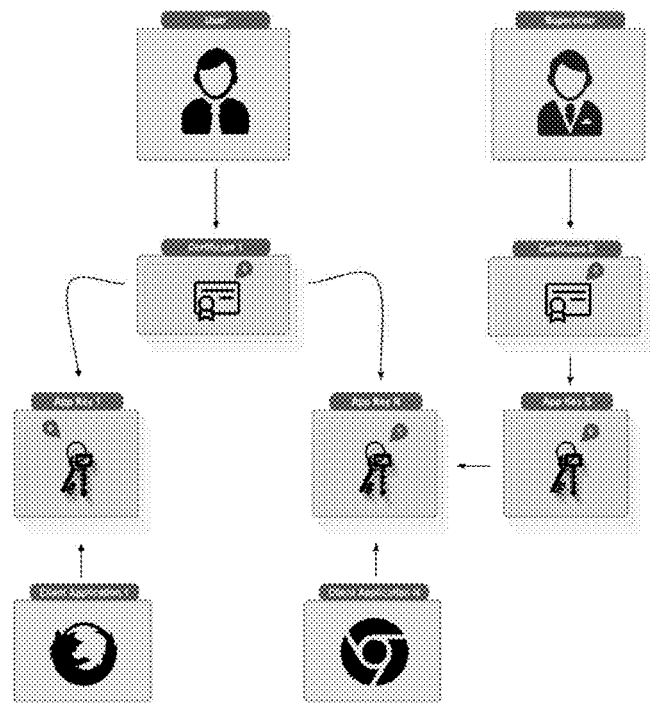

FIG. 26 describes the client application's keys.

Figure 27:
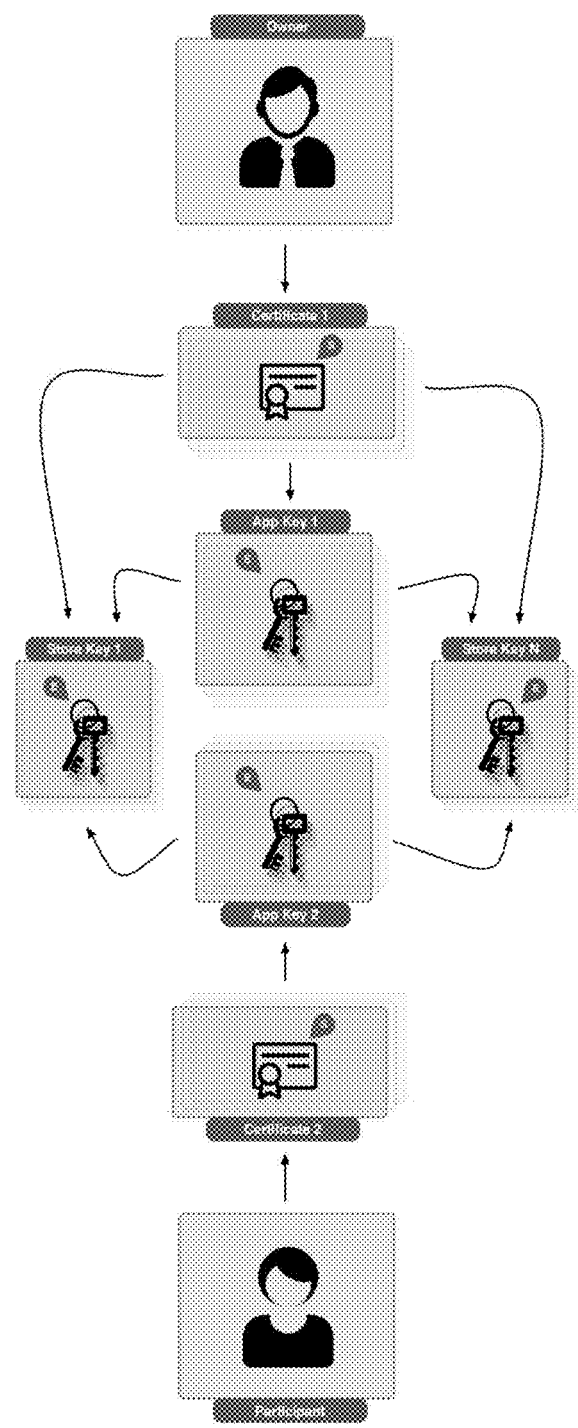

FIG. 27 describes the Store keys.

Figure 28:
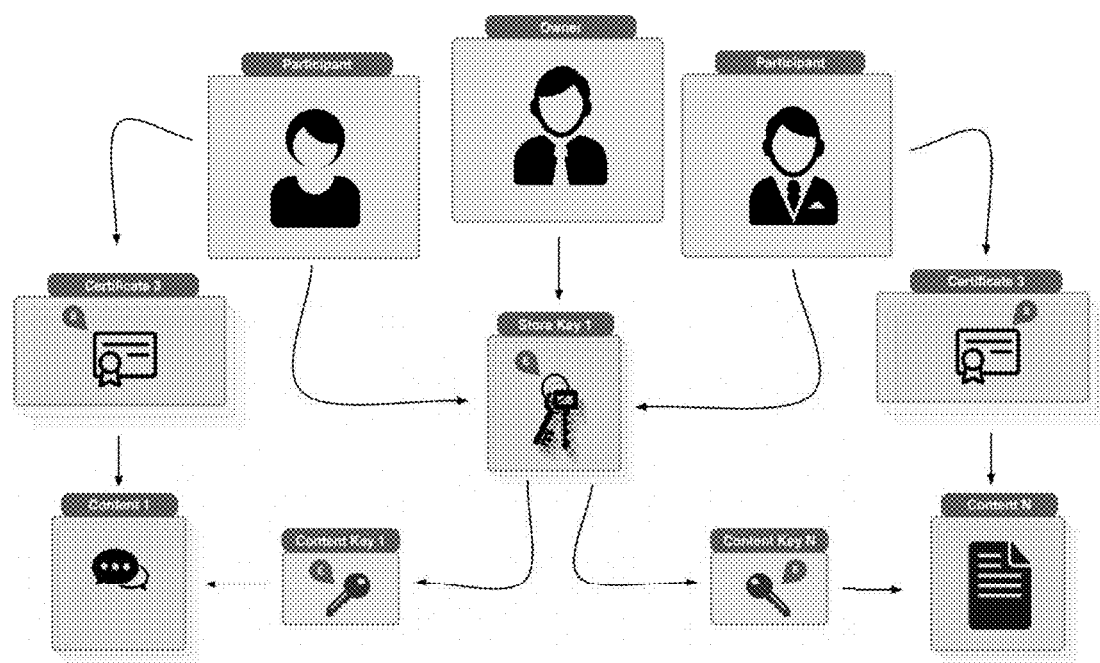

FIG. 28 describes the content keys.

Figure 29:
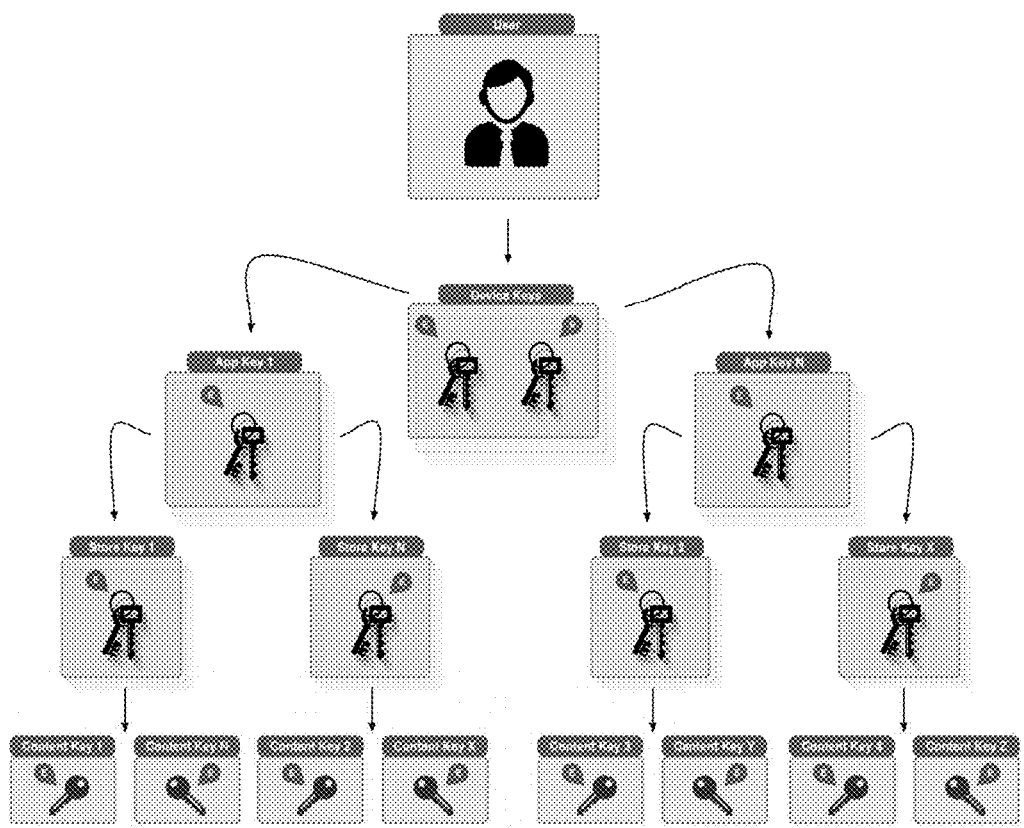

FIG. 29 describes the message broker key hierarchy.

Figure 30A:
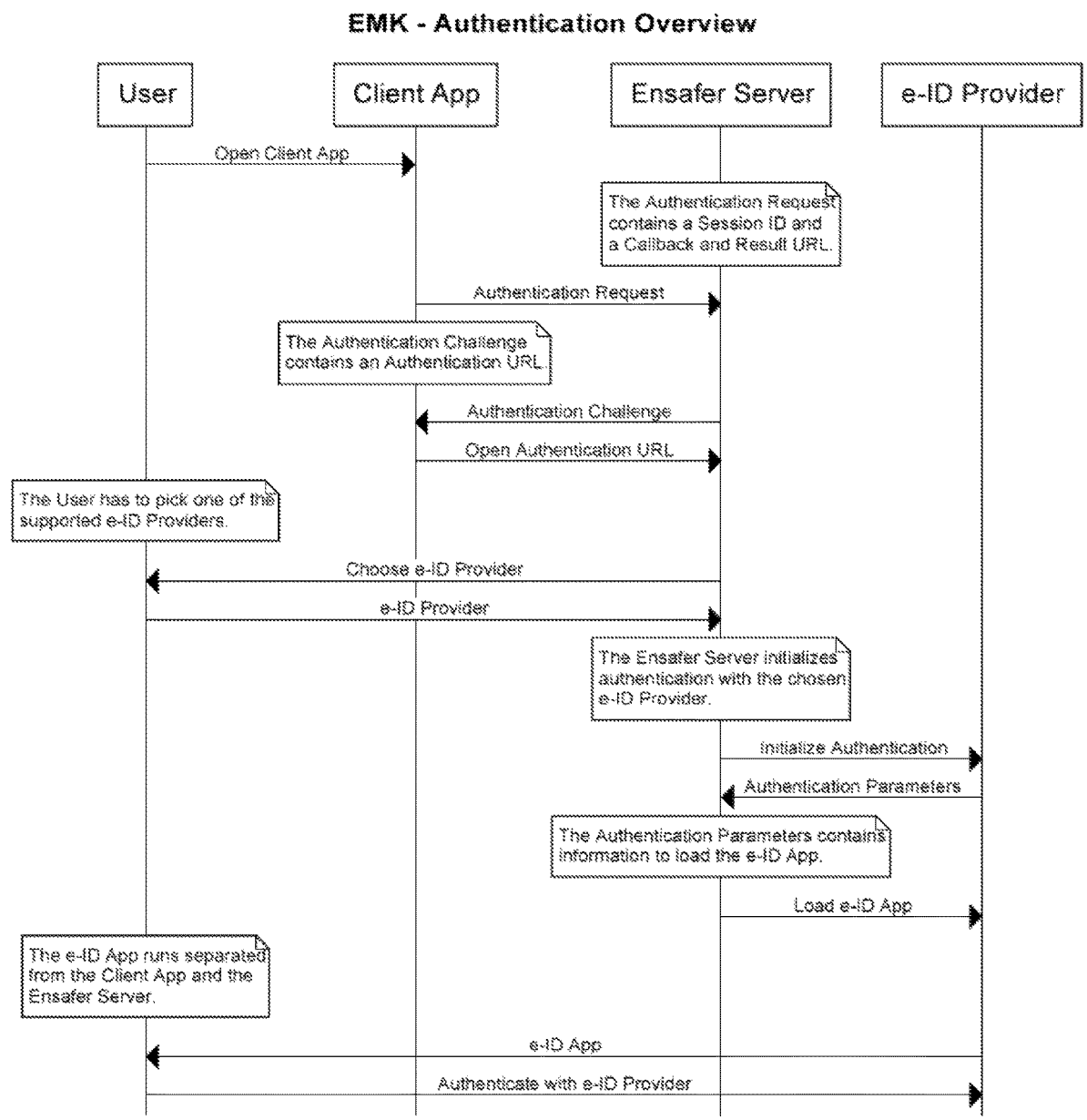
Figure 30B:
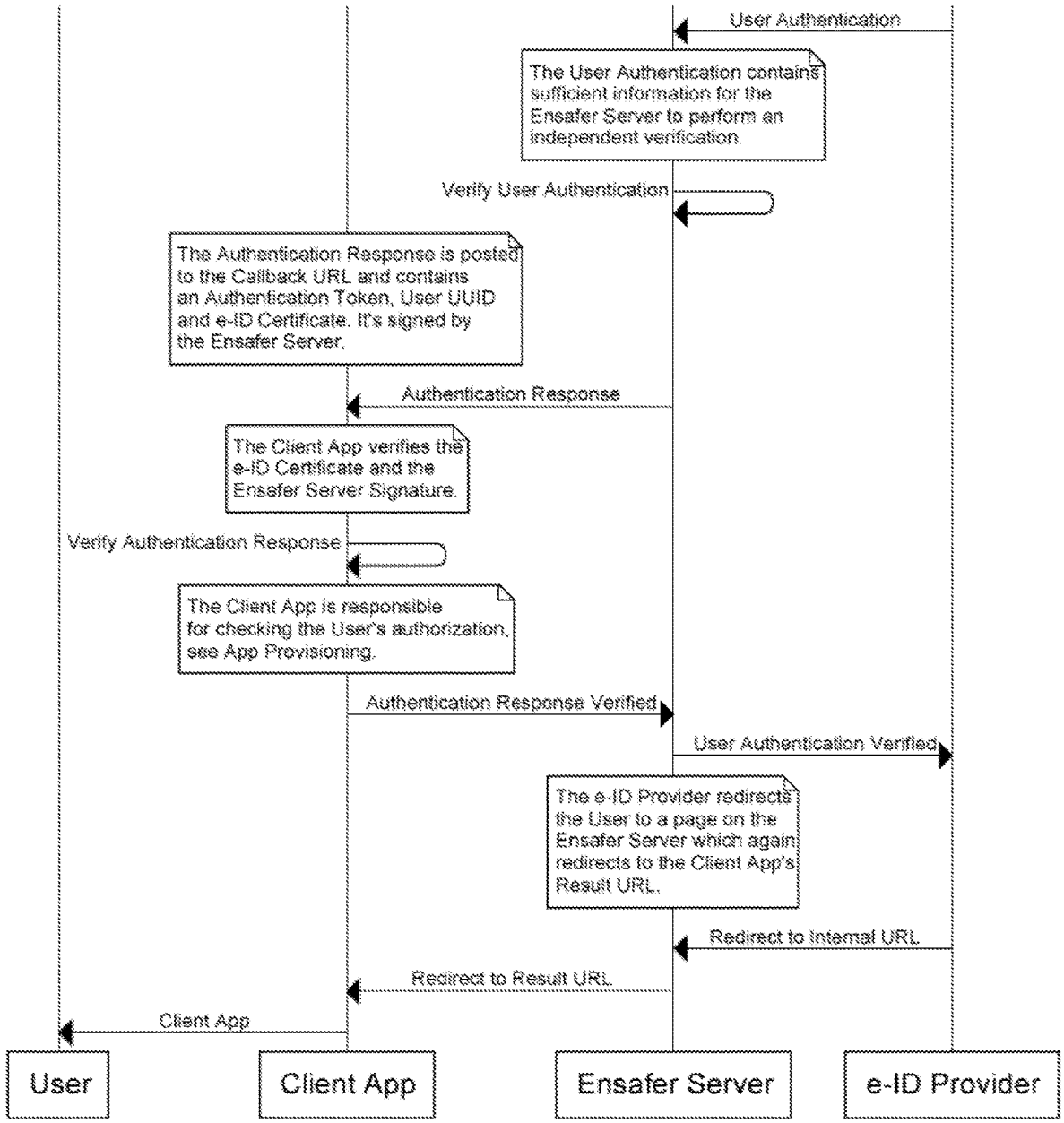

FIG. 30A-30B Describes a flow diagram for message broker Authentication.

Figure 31A:
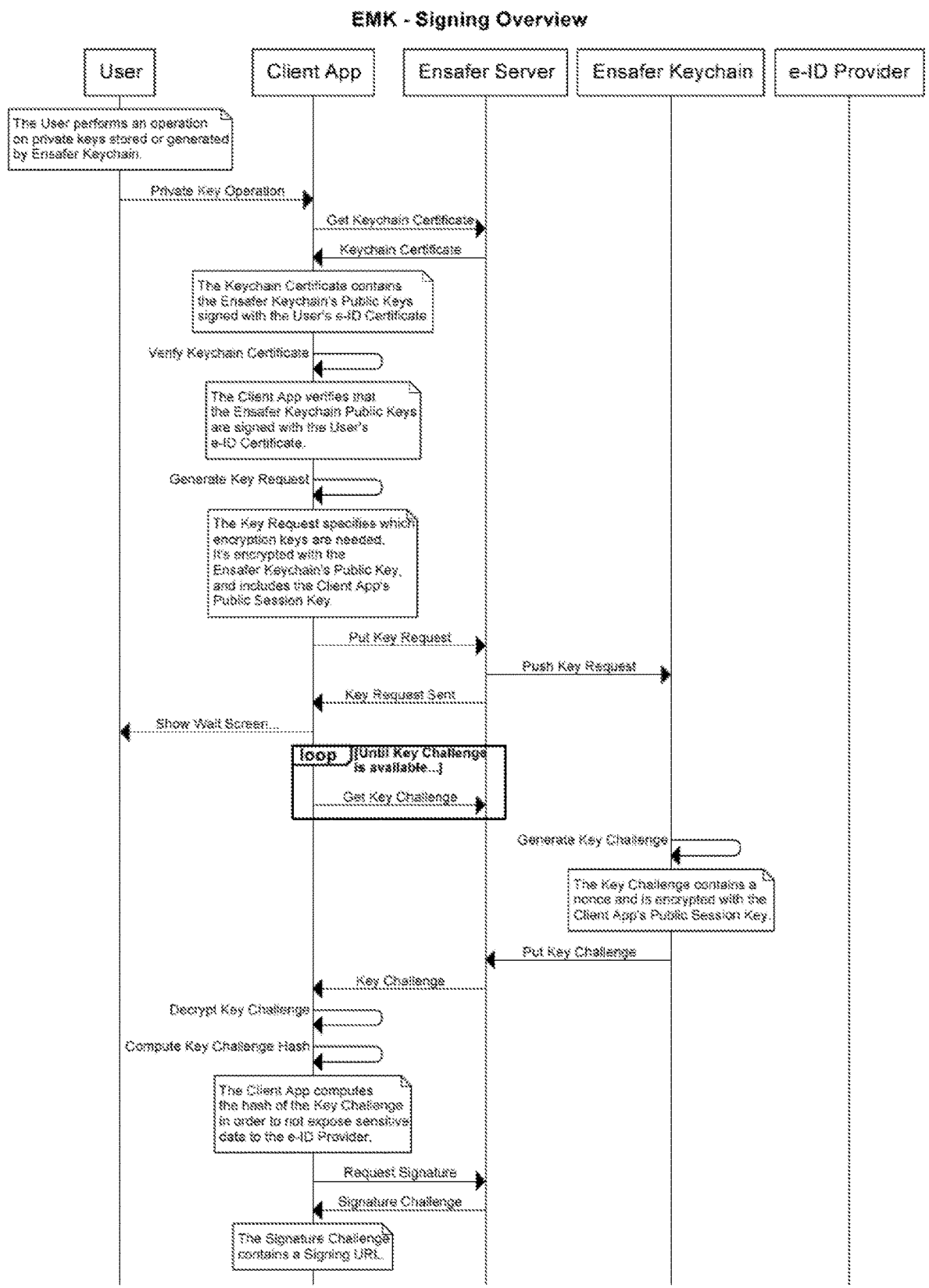
Figure 31B:
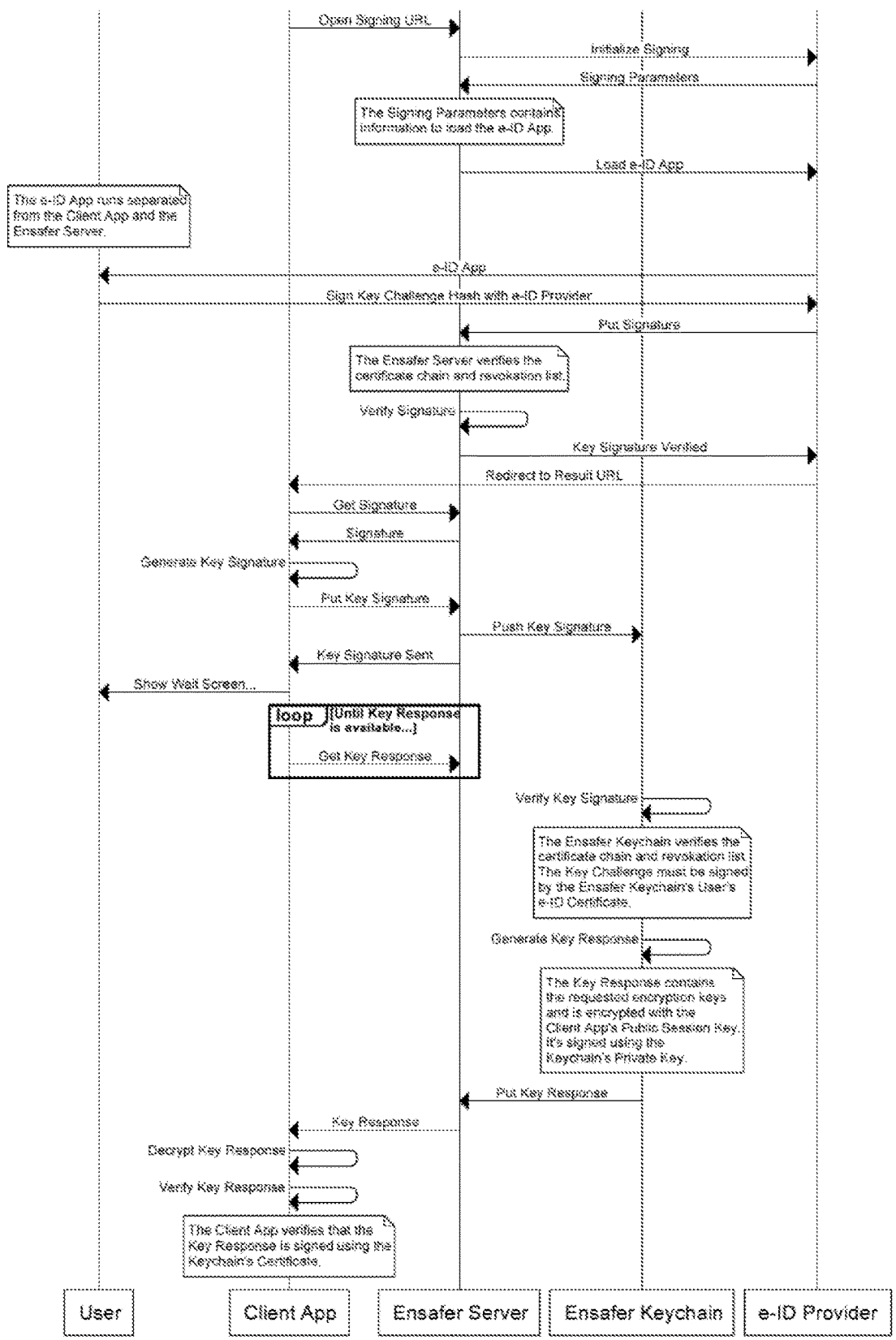

FIG. 31A-31B Describes a overview flow diagram for message broker signing.

It shall be understood that the present invention and its components are merely illustrated as examples of embodiments in the figures and embodiment descriptions herein, and may be designed in many variations and configurations.

The figures and embodiments are not intended to limit the scope of protection of the invention as claimed, but represent merely selected embodiments of the invention.

The invention can be adapted to be used in a number of different configurations, and as the following describe specific embodiments utilizing one of possible applications, or a combination of such applications, it shall be understood that any combination of any number of applications can be adapted to be hosted by the invention.

When the phrase "the invention" is used in this document it shall be understood that the phrase points to the invention comprising a variety of the discussed features, also if not all features are implemented in the specific embodiment in question.

When the phrase "device" is used in this document it shall cover any device that can be used as a host for a network connection between the user and the cloud infrastructure, e.g. PC, tablet, smartphone, custom devices with network connections and others.

When the phrase "user" is used in this document it shall be understood that this comprise both the user (a person) and a device in form of a computer, phone, pda or other communication equipment suitable for communication with a cloud service, used by the user (person) to access the cloud services discussed, as well as any software necessary to operate the device for communication and computation as described in this document. In some embodiments of the invention the person may even be omitted.

When the phrase certificate is used in this document it shall be understood to be the public part of an asymmetric encryption key pair. It might be defined as either a Certificate (X.509) or a Public Key (PKCS#1). It may be signed by a third party, but can be self-signed as well.

When the phrase file is used in this document it shall be understood that this may represent all types of data that is likely to be stored in the cloud storage. This can range from normal file entities as known from computer file system, but can just as well be any kind of data entities, for example mail, short messages in a short message system, large data entities of raw data or any type of digital data.

When the phrase "blurring", "blur" and "blurred" is used in this document it should be understood that this shall mean that text and images are made unrecognizable as if encrypted or scrambled. There is no decryption path for the blurred information, and clear text or picture information cannot be recovered from the blurred information.

When the phrase "Cloud" or "Cloud computing" is used in this document it should be understood that this shall mean internet-based computing in which large groups of remote servers may be networked to allow the centralized data storage, and online access to computer services or resources. Cloud may be classified as public, private or hybrid. Cloud computing, or in simpler shorthand just "the cloud", also focuses on maximizing the effectiveness of the shared resources. Cloud resources are usually not only shared by multiple users but are also dynamically reallocated per demand.

A common approach in cloud storage services is to, either as default or as an option, encrypt user data at-rest using 128 or 256-bit AES encryption. Some does not use encryption to protect user data at-rest at all.

The cloud/cloud providers have access to the encryption/decryption keys of the user data and can in principle decrypt and access these data. It is expected that all cloud storage solutions that provide encryption of user data at-rest and have access to the encryption/decryption keys, have invested a lot of resources in protecting the encryption/decryption keys of the user data. This does not mean that it is impossible for the service provider to access the user data, and sometimes they do to access and decrypt user data in order to provide services.

A few services encrypt user data without storing the encryption/decryption keys at the service provider's servers. To be more precise, the keys are not accessible at the service provider servers. They are either not stored at the servers at all, or they are stored encrypted. If they are stored encrypted, their encryption/decryption keys are not stored at the service provider servers. The consequence is that the service providers do not have access to the encryption/decryption keys of the user data at-rest. A common approach is to store the actual symmetrical, for example AES, encryption keys together with the user data at-rest, but the symmetrical encryption keys are encrypted with the public key of the user in a public-key encryption scheme. Such an approach provides end-to-end encryption of user data synced between different user devices.

Most cloud storage providers protect user data in-transit using SSL/TLS. This provides a secure channel where unencrypted data are transferred between user devices and the cloud storage servers. Recent discoveries of serious flaws in the most commonly used SSL/TSL implementation shows that such an approach might be vulnerable. This does not mean that data in-transit should not be protected by SSL/TLS, but it shows that SSL/TLS is not enough to protect user data. Both at the sending and receiving end of a secure channel the data are unprotected and open for attack.

Figure 1:
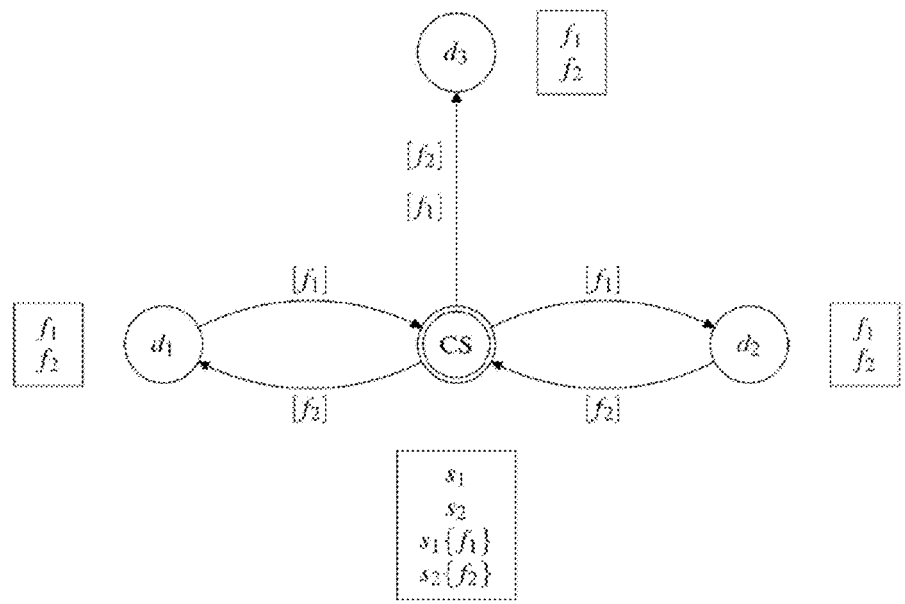
FIG. 1 shows a scenario overview of existing cloud storage solutions.

FIG. 1 illustrates cloud storage services when user data in-transit are protected by a secure channel, user data at-rest are protected by symmetric encryption (e.g. AES), and the encryption/decryption keys are accessible at the cloud storage service servers. In the example a user have three devices d1, d2 and d3, and two files f1 and f2. File f1 originates at device d1 and file f2 originates at device d2. From device d1, file f1 is transferred to the cloud storage (CS) over a secure channel (SSL/TLS). Device d1 receives file f2 from CS over a similar secure channel. From device d2, file f2 is transferred to the cloud storage (CS) over another secure channel, and device d2 receives file f1 from CS over a similar secure channel. The data in-transit can be summarized like this (dx is a device, and fy is a file):

$$dx \rightarrow CS:[fy]$$

$$CS \rightarrow dx:[fy]$$

At CS the two files are stored encrypted with the secret keys s1 and s2. These two keys are also stored at the CS. Device d3 receives both file f1 and f2 over a secure channel.

The following notation is used in this document:

TABLE 1

Notations $c_n$ = CloudService
$u_n$ = User
$d_{i,n}$ = Device for $u_n$
$p_n$ = Certificate for $u_n$
$p'_n$ = Key for $u_n$
$p, p'_n$ = PersonalKeyPair for $u_n$
$s^{pwd}$ = Passphrase
$s^{pwd}\{p'_n\}$ = Key for $u_n$ encrypted with Passphrase
$p, s^{pwd}\{p'n\}$ = PersonalKeyPair for $u_n$ encrypted with Passphrase
$k_n$ = StorePublic or SharePublic*
$k'_n$ = StoreKey or ShareKey*
$k, k'_n$ = StoreKeyPair or ShareKeyPair*

TABLE 1-continued

Notations $s_j$ = StoreSecret, ShareSecret or FileSecret*
$\#s_j$ = StoreSecret, ShareSecret or FileSecret hashed
$k,s_j\{k'_n\}$ = StoreKeyPair or ShareKeyPair encrypted with StoreSecret or ShareSecret
$s_j\{k'_n\}$ = StoreKey or ShareKey encrypted with StoreSecret or ShareSecret
$\{s_j\}p_n$ = StoreSecret or ShareSecret encrypted with Certificate for $u_n$
$\{s_j\}k_n$ = StoreSecret or ShareSecret encrypted with StorePublic or SharePublic
$\{\#s_j\}^{km}$ = StoreSecret or ShareSecret hash signed with StoreKey or ShareKey
$K_+$ = Latest StorePublic or SharePublic for Store
$f_n$ = File
$s_j\{f_n\}$ = File encrypted with FileSecret
$f^*_n$ = File visually encrypted
A→B:{m} = m in transit from A to B
A→B:[m] = m in transit from A to B over a secure channel
m, $m_n$ = data

*$_n$ may be denoted as a single identifier, e.g. 1 or a pair identifier, e.g.: 1,2, i.e. $s_1$ and $s_{1,2}$ respectively.

Most cloud storage services provide a sharing feature. User can share a single file or a directory structure with other users of the service, and sometimes with non-users of the service. The actual implementation details of sharing in the different cloud storage services can be difficult to find. However, for the cloud storage services storing the encryption/decryption keys for user data at rest in their own infrastructure, this is trivial. Since the infrastructure has access to the keys, it can decrypt the user data when accessed by the user the data is shared with. To protect the data from unintended access, the service will perform a proper authentication before this is done.

In another service, the server side cannot decrypt the data-at-rest. The data (or the key) has to be decrypted at a user device, and then be prepared for sharing. This means that shared data are moved from the pool of encrypted user data to a pool of unencrypted user data. Access is typical granted through a secret URL. Then the user shared with does not have to be a registered user of the service. The knowledge of this URL is what is needed to access shared data. The obvious problem with this approach is that user data that is shared is stored unencrypted at-rest at the cloud storage server as long as they are shared.

Identity and key management is a major building block to support sharing of files, both between different users and different devices of a user. Typically cloud storage services offer their own identity management features as part of their service. The user usually has to sign up to the service first by registering e.g. with an email address. When adding a new device the user logs into the service and registers the device. Identity information is exchanged and deployed to the devices of the user by this step. When sharing files with other users, one has to search and select other participants of the service. The consumer market motivates this kind of ad-hoc sharing. In an enterprise setting sophisticated identity management solutions like LDAP or ActiveDirectory are already in place. The present invention also provide an interface to these directory services. This allows for an automated provisioning of identities (both for users and devices) to the clients of the present invention. Sharing between users and groups can thus be simplified and tailored within an enterprise context.

Figure 2:
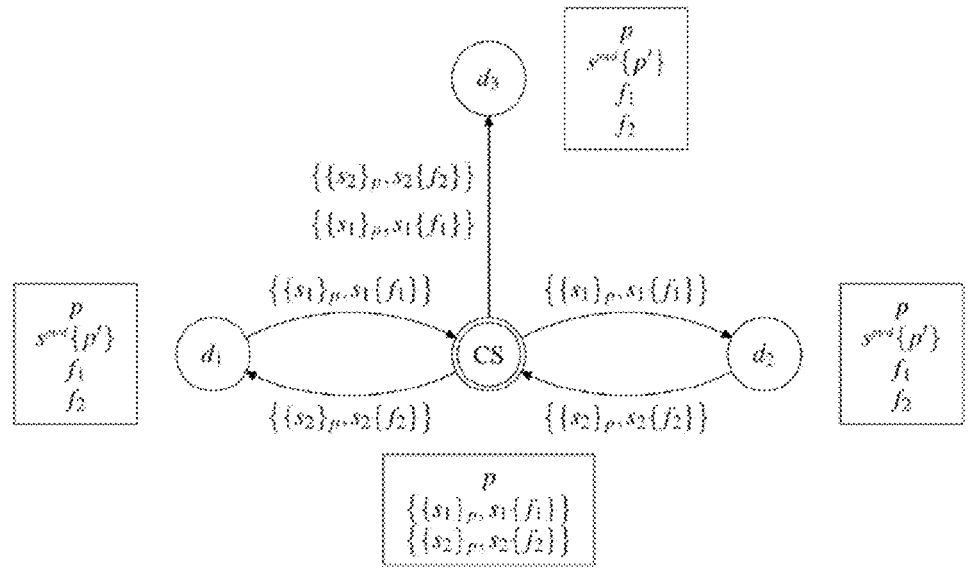
FIG. 2 shows a scenario where a user with three devices d1, d2, and d3 storing two files f1 and f2 in the cloud storage (CS) service.

In the present invention public key encryption is chosen to protect user data and enable secure sharing. Every user has a public/private key pair. The public key is not a secret, and it can be shared with everyone. It may be stored as an X.509 certificate. The private key is secret and only known to the user. The private key is only accessible on the user devices, and the key itself is protected by password-based encryption when not used. It may be stored in a PCKS#12 key container. User data may be encrypted using 256-bit AES encryption. For every file a new fresh and unique encryption/decryption key may be generated. This key is used to encrypt the file. The key itself is then encrypted with the public key of the user and bundled with the encrypted file. All user data are always encrypted on the service provider's servers. User data never exists decrypted outside the client devices. The encryption keys needed to access the data are not even available for the cloud storage service provider. The consequence is that the service provider does not have access to the encryption/decryption keys and cannot decrypt or access any user data at-rest. FIG. 2 illustrates the present invention approach to end-to-end public key based encryption of user data. In the example a user file $f_1$ originates at device $d_1$. Device $d_1$ generates a new fresh secure key $s_1$ that is used to encrypt file $f_1$. This secure key is then encrypted with the public key p of the user. A bundle is then created. It contains the encrypted secret key and the file encrypted with the secret key. The bundle is then transferred to the cloud storage (CS). The secret keys of the files only exist in the bundles encrypted with the public key of user. They are not stored in an accessible form at the CS, and the CS does not have the means for decrypting it. Since the files are encrypted with the secret keys, the files are only accessible together with the private key of the user.

Figure 3:
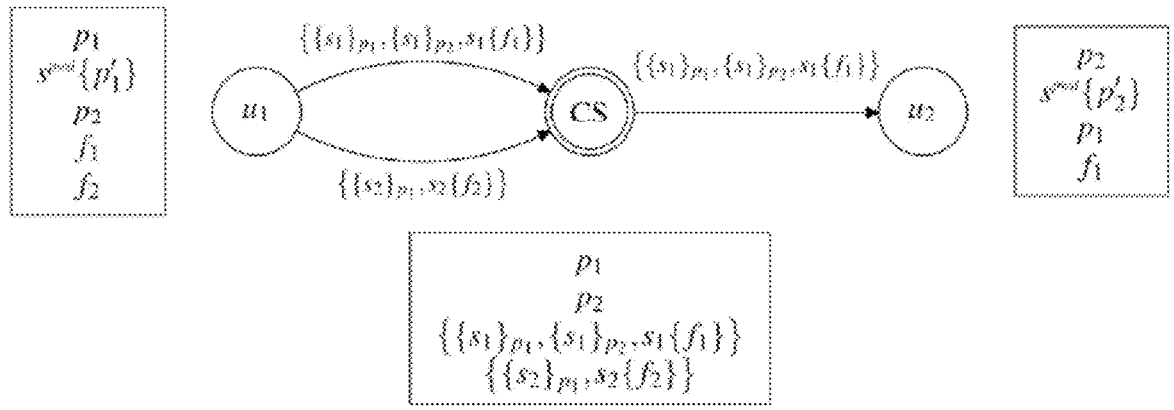
FIG. 3 shows a scenario where user u1 sharing file f1 with user u2.

FIG. 3 is a simplified embodiment of the case, only including the details needed for the example. At each node (the devices and the cloud storage) the box illustrates what is at-rest (stored) at this node, and the arrows illustrate what has been in-transit (transferred) between nodes.

The usage of public-key encryption in the present invention makes secure sharing possible without any security compromises. When a file is shared with another user, a copy of the secret key of the file is created and then encrypted with the public key of the other user. Since the other user now can decrypt this copy of the secret key of the file, the user can also decrypt the file itself. This is illustrated in FIG. 3. A user $u_1$ shares a file $f_1$ with user $u_2$. User $u_1$ has access to the public key $p_2$ of user $u_2$, and creates a copy of the secret key $s_1$ that is encrypted with $p_2$. This encrypted copy of $s_1$ is bundled together with the file and transferred from u1 to $u_2$ through the cloud storage:

$$u_1 \to u2:\{\{s_1\}p_1, \{s_1\}p_2, s_1\{f_1\}\}$$

A new copy of the secret key is, for every user a file is shared with, encrypted with that user's public key and bundled with the encrypted file. This per file management of sharing, or in some embodiments per file revision, is extremely flexible and powerful. At the user level sharing can be done with a collection of files (e.g. a directory). At the implementation level this will be realized by performing decryption, copying and re-encryption of the secret key of each file shared in the collection.

The problem with the sharing approach described above is scaling. The cost (processing time) of public-key encryption/decryption is much higher than symmetric encryption/decryption. If a user shares a large number of files in a single operation, the decryption, copying and re-encryption of the secret key of each file is the bottleneck. Public-key, such as for RSA, encryption and decryption operations on for example 256-bit AES keys can be almost ignored for a single key of a single file, but when this has to be done for a large number of files in a single operation, scaling becomes an issue. It is even worse if a large number of files are shared with a large number of users in a single operation. To handle this, the present invention has come up with the concept of a store and a share. Every user has a store that is represented by a public and private key pair k and k'. Instead of encrypting the secret keys of the user's files with the public key of the user, the secret keys of the files are encrypted with the public key k of the user's store. So, for user u1 with a store represented by the key pair $k_{1,1}$ and $k'_{1,1}$, the file $f_1$ is stored at the cloud storage in the following bundle:

$$\{\{s_1\}k_{1,1}, s_1\{f_1\}\}$$

Figure 4:
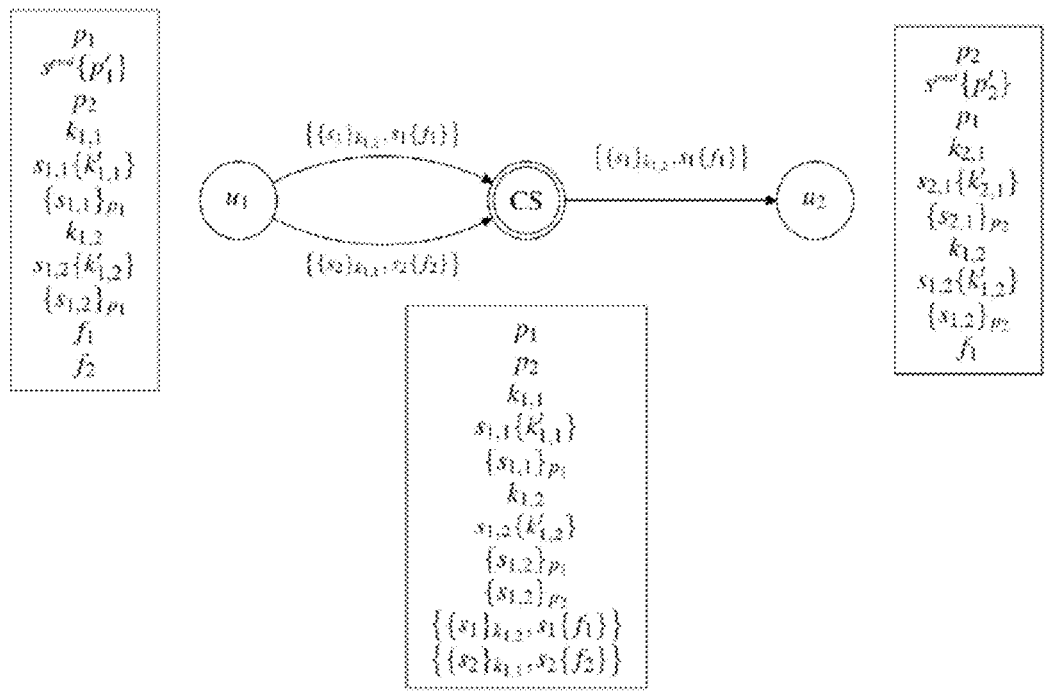
FIG. 4 shows a scenario where User u1 sharing file f1 with user u2 using share (store) k1, 2

The private key of a store is encrypted with a random strong symmetric key, and this random symmetric key is encrypted with the users public key. If the symmetric key of the store of user $u_1$ is $s_{1,1}$, then $s_{1,1}\{k'_{1,1}\}$ and $\{s_{1,1}\}p_1$ will be at-rest at the user devices and the cloud storage. If a user shares one or more files, a new store called a share is created. If user $u_1$ shares file $f_1$ with user $u_2$, a share represented by the key pair $k_{1,2}$ and $k'_{1,2}$ is created. The secret key $s_1$ of the file will now be encrypted with the public key $k_{1,2}$. The private key $k'_{1,2}$ will be encrypted with a new random symmetric key $s_{1,2}$, and this key will be encrypted with the public keys of users $u_1$ and $u_2$, $p_1$ and $p_2$. FIG. 4 updates the embodiment from FIG. 3 with the store and share approach. If compared with the approach illustrated in FIG. 3, it can be seen that the total number of public-key decryption and encryption operations (n) differs a lot for a large number of users (u) and files (f). Without a share, the symmetric key for each file has to be decrypt, and then encrypt the key for each file for each user shared with:

$$n = f + f \times u \qquad (1)$$

With a new share, the secret (random symmetric) key encrypting the secret key of the original store has to be decrypted once, and then re-encrypt (decrypt and encrypt) this secret key for each file in the share:

$$n = 1 + 2f \approx 2f \qquad (2)$$

If u users are added to a share, the secret (random symmetric) key encrypting the secret key of the share has to be decrypted once, and then encrypt this key for each user:

$$n = 1 + u \approx u \qquad (3)$$

If a new share is created with f files and then share these files with u users in a single operation, the number of public-key decryption and encryption operations still increase much slower with increased number of users and files than in the case without using shares:

$$n = 2f + u \qquad (4)$$

If users are removed from a share, a new share is created. The old share is kept but no files in this share are updated. Any updates happen in the new share.

The present invention aims at several application scenarios where two are mentioned here, not excluding any other scenarios where information is shared over a cloud or remote services or the like:

Ad-hoc sharing for consumers, between consumers and businesses and between businesses.

Company internal sharing employing the existing company internal infrastructure, especially directory services (LDAP/Active Directory) and smartcards.

The present invention is designed to support all scenarios by a clean modularization into the present invention client which is encrypting the files locally before storing them in the Cloud storage, and the present invention server, which is in charge of the user and key/management. The present invention server can be run publically available to support ad-hoc sharing but it can be also be deployed and run on the premises of a company. When run in-house the present invention server offers the option to integrate into the directory services of the company. The server employs the directory service to determine user and group information and propagates this information to the present invention clients to automate identity management and the access rights to encrypted cloud storage. No further user specific setup of the present invention client is necessary and key management is therefore completely automated. In this scenario advanced authentication schemes like authentication via smartcards can be employed for the present invention. Mixed scenarios between company internal and ad-hoc sharing are possible by utilizing the features of present invention. The same present invention client can be used for internal sharing within the company and for ad-hoc sharing with external partners.

In present invention, all user data are protected by end-to-end encryption. The consequence is that user data never exists unencrypted outside the user devices. This ensures the privacy of the users. The usage of public-key encryption as used in present invention both protects user data and makes secure sharing possible. Prior art approach for this as discussed above does not scale well for a large number of files and users. However, this is common in typical usage of such solutions; the cooperation between a lot of people in a large cross-institutional project sharing a lot of data. The introduction of stores and shares as presented in the present invention solves this issue without compromising the security and flexibility of the original approach. Key and user management is in large organizations commonly handled by LDAP/Active Directory (or similar). In present invention, the integration of such enterprise solutions with the cloud storage architecture demonstrates an efficient means of key management.

Now the key concept of present invention will be discussed:

The present invention does not require encryption keys to be stored in the cloud, or if they are they will be stored in a manner that ensures that only the originator of the information that is secured by the encryption keys can access and share the keys, thus information is much better protected against intrusion at cloud service providers than prior art encryption at-rest methods.

The present invention also solves the issue of minimizing the need for re-encryption of information that is to be shared when more users are given access to a shared file, and when previous users are excluded from a sharing activity. In current systems this type of activity requires rigid and resource demanding operations, involving encryption and re-encryption of large amount of data.

The present invention encrypts files that are stored locally, at a cloud provider such as Dropbox, or directly in the present invention cloud. The architecture applies to all these scenarios. The present invention can also sign and encrypt email, provide mutual authentication for SSL connections, and manages identities. There are countless applications for the architecture. Without significant negative effects on security or privacy, the present invention can store encryption keys in the cloud, and allow for password recovery. This allows for quick user adaptation and ease-of-use, but is not a requirement, and does not expose sensitive information to the service provider.

The present invention allows sharing of information between individuals, employees of an organization, outside an organization, and even with individuals outside the present invention. Sharing is easy and does not have any scalability issues with regards to amount of information or number of participants in the share. While personal information is strictly private as default, the present invention allows organizations to administer their employees and grant administrative access to information that is owned by the organization.

Figure 5:
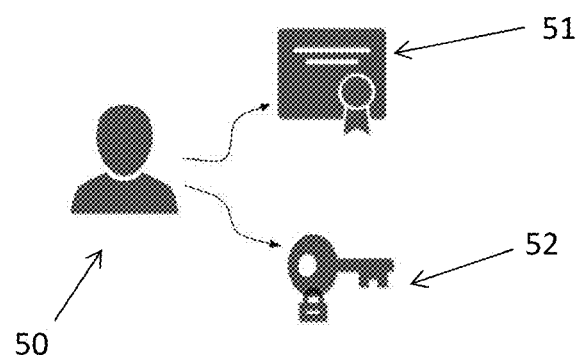
FIG. 5 shows a key concept for PersonalKeyPair.

Every user 50, hereafter called User has a key pair 51, 52, hereafter called PersonalKeyPair, as shown in FIG. 5. PersonalKeyPair 51, 52 consists of a public key 51 that may be in the form of a signed X.509 certificate, hereafter called Certificate, and a private key 52 may be in the form of a PCKS#12 key container, hereafter called Key.

Certificate 51 is always stored unprotected in the cloud at the servers, hereafter called Server, and is accessible by User 50 and all approved and authenticated contacts of User 50. Key 52 is optionally stored at Server, and is only accessible by authenticated User 50. Key 52 is protected with a passphrase only known to User 50, hereafter called Passphrase.

Certificate 51 is used to encrypt information designated for User 50, while Key 52 is used to decrypt information designated for User 50. PersonalKeyPair 51, 52 identifies User 50.

Figure 6:
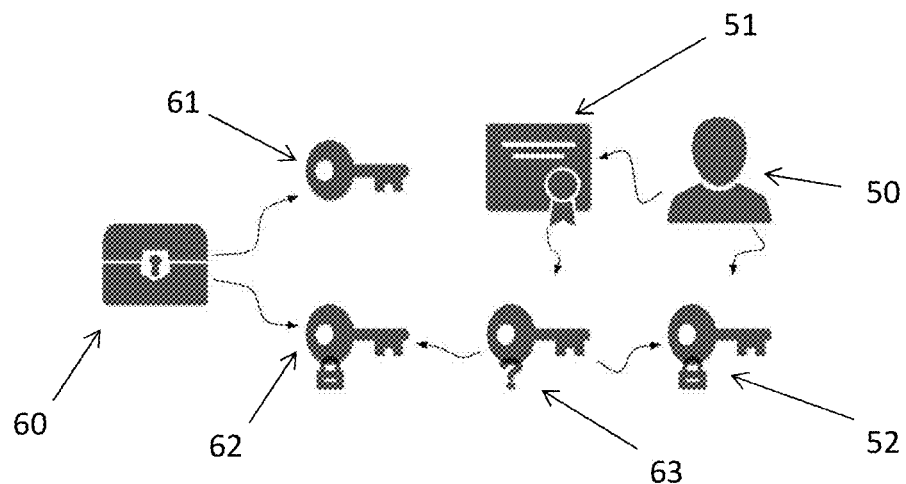
FIG. 6 shows a key concept for StoreKeyPair and StoreSecret protected by users Certificate.

Every User 50 has Store 60 as shown in FIG. 6, hereafter called Store, with an associated key pair 61, 62, hereafter called StoreKeyPair 61, 62. StoreKeyPair 61, 62 consists of a public key 61 which may be in the form of a PCKS#1 key container, hereafter called StorePublic, and a private key 62 which may be in the form of a PCKS#12 key container, hereafter called StoreKey.

StorePublic 61 is always stored unprotected at Server, and is accessible by Users 50 authorized to access Store 60. StoreKey 62 is also stored at Server, and is protected by a random strong symmetric key 63, hereafter called StoreSecret. StoreSecret 63 is generated by Store's owner User 50, and is encrypted with Certificate 51 for Users 50 authorized to access Store 60.

Figure 7:
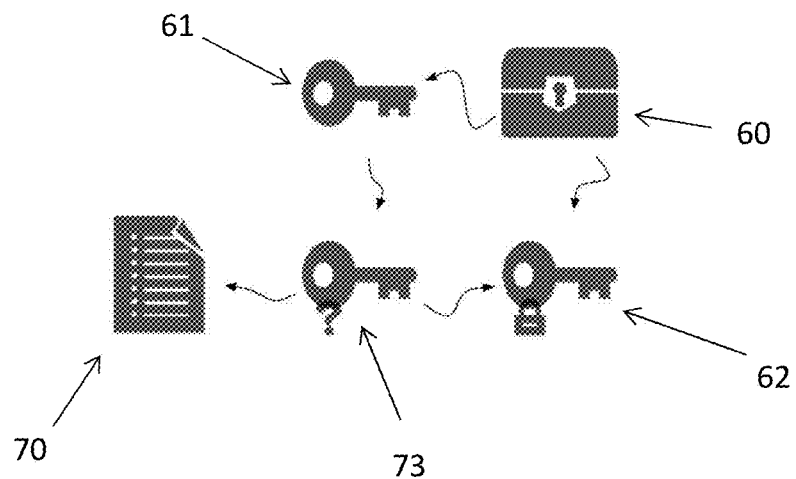
FIG. 7 shows a key concept for File or Directory protected by FileSecret.

Every File or Directory 70, hereafter called File is protected by a random strong symmetric key 73 as shown in FIG. 7, hereafter called FlleSecret. FlleSecret 73 is generated by the File's owner User 50 and may be unique for every revision of File 70. FlleSecret 73 is encrypted with StorePublic 61.

FlleSecret 73 is used to encrypt and decrypt both metadata and contents of File 70.

Figure 8:
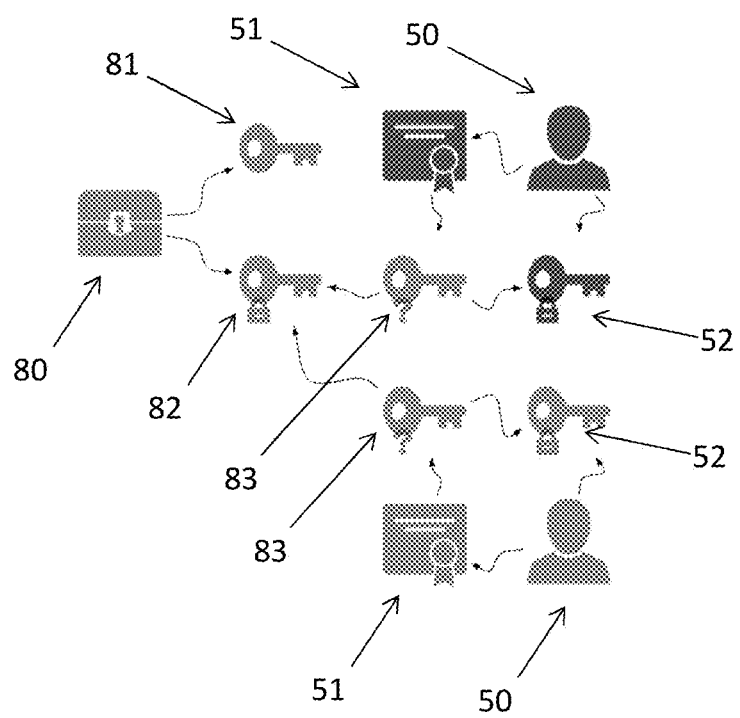
FIG. 8 shows a key concept for ShareSecret encrypted for each User.

When User 50 shares File 70, a new shared Store 80, hereafter called Share as illustrated in FIG. 8, is created with a new key pair 81, 82, hereafter called ShareKeyPair which is comprised by SharePublic 81 and ShareKey 82. Secret 83 for Share 80 protecting ShareKey 82, hereafter called ShareSecret is encrypted with Certificate 51 for each User 50 participating in Share 80. User 50 owning Share 80 must re-encrypt FlleSecret 73 using SharePublic 81 for existing each File 70 in Share 80. The owning User 50 adds participating Users 50. Metadata and contents of Files 70 does not have to be re-encrypted.

Figure 9A:
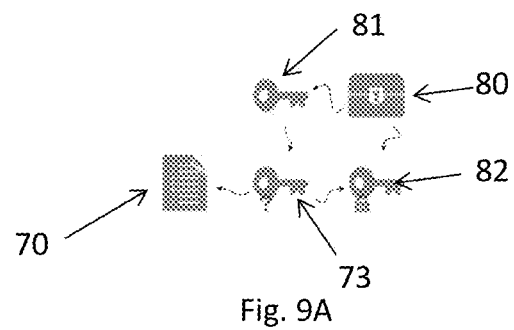
FIG. 9A shows a key concept for ShareFile protected by FileSecret.
Figure 9B:
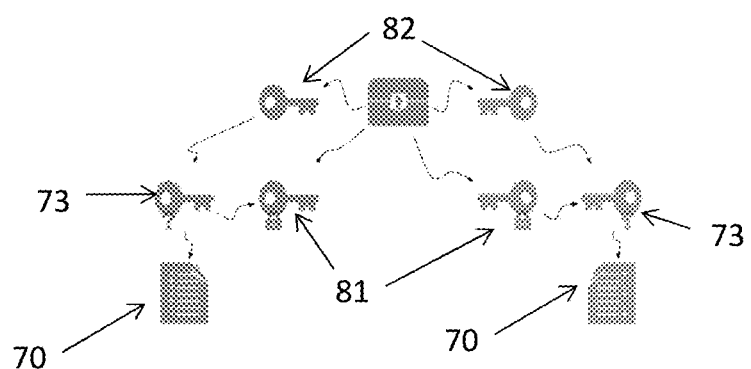
FIG. 9B shows a key concept for Share with multiple ShareKeyPairs.

FlleSecret 73 for every File 70 in Share 80 is encrypted with Public of Share 81, hereafter called SharePublic 81, just like StorePublic 61 for Store. When User 50 is added to existing Share 80, ShareSecret 83 is encrypted with Certificate 51 of added User 50. When User 50 is removed from existing Share 80, a new ShareKeyPair 81, 82 is generated. New ShareKeyPair 81, 82 is then used for subsequent operations on File 70 in Share 80. Files 70 already shared with removed User 50 are not required to be re-encrypted, though they can if desired. Share may have multiple ShareKeyPairs 81, 82 as shown in FIG. 9B. A Share/Store key table is maintained for the content of the Share/Store 60, 80.

Figure 10:
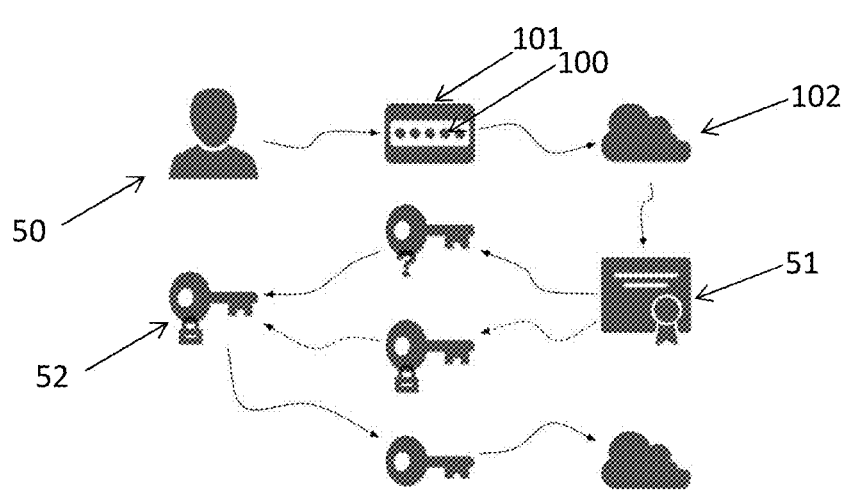
FIG. 10 shows a key concept for authentication.

User 50 is authenticated by a combination of Password 100 and PersonalKeyPair 51, 52, and is illustrated in FIG. 10. During registration User 50 stores the strong hash 101 of a secret password, hereafter called Password, at Server 102. When authenticating, User 50 sends Password 101 to Server 102. Server 102 replies with a random session ID, hereafter called SessionID, encrypted with Certificate 51. User 50 includes SessionID decrypted with Key 52 on each subsequent request to Server 102. If User 50 has stored Key 52 encrypted with Passphrase at Server 102 this is returned after successful authentication. User has to decrypt Key 52 with Passphrase.

To change Password authenticated User sends updated Password 110 to Server 102 as shown in FIG. 11A. If Key 52 is also stored at Server and protected by Passphrase identical Password decrypted, Key 52 has to be replaced with one protected by updated Passphrase. This is different from Key Replacement (see below). Server may or may not enforce a password policy.

User can optionally enable recovery of Key 52 even if password is forgotten as shown in FIGS. 11B and 11C. This is achieved by sending a secret question 120, hereafter called Question, and the strong hash of the answer 121, hereafter called Answer to Question 120 to Server 102 along with Key 52 protected by unencrypted Answer, hereafter called RecoveryKey 122, as Passphrase.

To access RecoveryKey 122, User 50 sends Answer 121 to Server 102, which sends a random security code 130, hereafter called Code to User's email 131. With Code 130 and Answer 121 the user can access RecoveryKey 122, and replace existing Password 100 and Key 52 protected with Passphrase.

If PersonalKeyPair 51, 52 has been compromised, it must be replaced by User 50 in a key replacement process. Like key recovery process discussed for FIGS. 11B and 11C above, key replacement is protected by Code 130 sent from Server 102 to reduce chance of a malicious agent hijacking User 50. User has to generate new PersonalKeyPair 51, 52, StoreKeyPair 61, 62 and ShareKeyPairs 81, 82 for every Share 80 administered by User 50. Server 102 will remove User 50 from any participating Shares 80, and notify the Share administrator that ShareKeyPairs 81, 82 has been compromised. All Files 70 have to be re-encrypted with new FlleSecret 73.

In one embodiment an Admin 150 can administer User 50 as illustrated in FIG. 13. Admin 150 generates PersonalKeyPair 51, 52 for User 50, as well as RecoveryKey 122 only accessible to Admin 150. User 50 with PersonalKeyPairs 51, 52 generated by Admin 150 can not replace PersonalKeyPair 51, 52—Admin 150 does this on User's behalf. User 50 can change Password and Passphrase for Key 52 independently of RecoveryKey 122.

Now the key models are further discussed in relation to FIG. 14A-14I:

The flow charts have been expanded to cover more than one page for clarity, and where figure is annotated with FIG. 14n' it is meant that the top of the figure is directly linked with the line leading down to the bottom of previous FIG. 14n, where n=B-I.

In FIG. 14A is shown an embodiment where a user generates a personal key pair, the notation as described above. The first time a user starts to use the services of the invention no keys exist. The user generates own asymmetric PersonalKeyPair $(p, p'_1)$ on a first device $d_{1,1}$ consisting of a certificate p and a Key p'. The Key p' is then encrypted wth a personal Passphrase $S^{pwd}$, $S^{pwd}\{p'\}$. The unencrypted Certificate and the passphrase protected Key $\{p,s^{psw}\{p'\}\}$ is then stored on the cloud service $c_1$. The user can from a second device $d_{2,1}$ retrieve the keys by fetching the stored $\{p,s^{pwd}\{p'\}\}$ from the cloud $c_1$. Then extract Certificate p directly and by decrypting $s^{pwd}\{p'\}$ using the Passphrase only known to the user extract the Key p'. Now the PersonalKeyPair (p, p'$_1$) exist on the second device $d_{2,1}$. Information encrypted with Certificate and stored in the cloud $c_1$ may be retrieved and decrypted by the Key p' by the user using either devices $d_{1,1}$, $d_{2,1}$.

In FIGS. 14B and 14B' it is visualized an embodiment, after having shared the PersonalKeyPair as explained above, of how to generate on a first device $d_{1,1}$, store in the cloud $c_1$ and retrieve to a second device $d_{2,1}$ a StoreKeyPair (k, k'$_1$). Prior to establishing a store the store owner must generate an asymmetric StoreKeyPair (k, k'$_1$) on a first device $d_{1,1}$. Then a symmetric StoreSecret $s_1$ is generated on the first device $d_{1,1}$. StoreSecret $s_1$ is encrypted with Certificate $p_1$. Key k'$_1$ is then encrypted with $s_1$, and $\{\{s_1\}p_1, \{k,s_1\{k'_1\}\}\}$ is then put on cloud $c_1$. User can now from a second device $d_2$, retrieve $\{\{s_1\}p_1, \{k,s_1\{k'_1\}\}\}$ as stored in the cloud and using the Key p'$_1$ to decrypt $s_1$ in operation $\{s_1\}p'_1$, and further use the retrieved $s_1$ to decrypt the StoreKey k'$_1$ in operation $s_1\{k'_1\}$. Now the StoreKeyPair (k, k'$_1$) exists on the user's second device. Files can now be exchanged between the devices via store $k_1$ as will be discussed later.

FIGS. 14C and 14C' visualizes an embodiment of the invention how to generate on a first device $d_{1,1}$ of a first user $u_1$, store in the cloud $c_1$ and retrieve to a first device $d_{1,2}$ of the second user $u_2$, a ShareKeyPair (k, k'$_2$) and a ShareSecret $S_2$. When the owner/user $u_1$ generates the Share $k_2$ the first time a ShareKeyPair k,$k_2$ must be generated on the first device $d_{1,1}$ of the first user $u_1$. Next a ShareSecret $s_2$ is generated on the same device $d_{1,1}$. Sharing with a second user $u_2$ for the first time, the first user $u_1$ must retrieve the second users Certificate $p_2$. This is retrieved from standard Certificate providers or other.

When Certificate of the second user $u_2$ is retrieved and now exists on the device of the first user $d_{1,1}$, the ShareSecret $s_2$ is enrypted with the Certificate of both the first and second user $\{s_2\}p_1, \{\{s_2\}p_2\}$. Then the ShareKey $s_2$ is used to encrypt the ShareSecret k'$_2$ in the operation $s_2\{k'_2\}$. Now the information $\{\{s_2\}p_1, \{\{s_2\}p_2, \{k,s_2\{k'_2\}\}\}$ is put on the cloud $c_1$ which can now be retrieved by the device of the second user $d_{1,2}$. Since $s_2$ is not yet existing on the device $d_{1,2}$ of the second user $u_2$ this can be extracted by decrypting using the key p'$_2$ in the operation $\{s_2\}p'_2$.

The share key k'$_2$ is retrieved on the device of the second user $d_{1,2}$ using the retrieved $s_2$ to decrypt in the operation $s_2\{k'_2\}$. Now the ShareKayPair$\{k,k'_2\}$ has successfully been retrieved by and exists on the device $d_{1,2}$ of the second user $u_2$.

The next embodiment of the invention to be discussed is how to add a further user $u_3$ to the Share $k_2$ of the first and second user $u_1$, $u_2$ as described above. FIGS. 14D and 14D' visualizes the process steps to achieve this. The flow diagram is further expanded in that it discusses the case where the third user $u_3$ is added from a second device of the first user $d_{2,1}$. The first step is to ensure that ShareSecret $s_2$ and ShareKeyPair k, k'$_2$ is present at the second device of the first user $d_{2,1}$. If not already existing on the second device $d_{2,1}$ of the first user $u_1$, $\{\{s_2\}p_1, \{k, s_2\{k'_2\}\}\}$ is retrieved from the cloud $c_1$, and ShareKey $s_2$ is decrypted by the first users Key p'$_1$, and then the ShareKey k'$_2$ is decrypted using the retrieved ShareKey $s_2$. Now $\{s_2,\{k,k'_2\}\}$ exists on $d_2$. If not the Certificate of the further user $p_3$ exists on the second devce of the first user $d_{2,1}$, this Certificate is retrieved from appropriate Certificate provider. Now the ShareSecret $s_2$ is encrypted with the further users Certificate $p_3$ in the operation $\{s_2\}p_3$ and upload this to the cloud $c_1$. Now the further user $u_3$ can get the encrypted ShareSecret $\{s_2\}p_3$, the Share-Public k and the ShareKey k'$_2$ which is encrypted with the ShareSecret $s_2$, described combined in the expression $\{\{s_2\}p_3, \{k,s_2\{k'_2\}\}\}$, from the cloud $c_1$. Since $s_2$ is not existing on the further users device $d_{1,3}$, this is deduced by decrypting using the further user's Key p'$_3$ in the operation $\{s_2\}p'_3$. Then the further user u3 will decrypt the ShareKey k'$_2$ using the retrieved ShareSecret $s_2$ in the operation $s_2\{k'_2\}$. Now the ShareKeyPair $\{k,k'_2\}$ exists on the device of the further user $d_{1,3}$.

The next embodiment of the invention to be discussed is a scenario described in FIGS. 14E and 14E' where the situation as discussed combined above where three users $u_1$, $u_2$, and $u_3$ shares the keys to a Share $k_2$, and where now the second user $u_2$ shall be removed from the share $k_2$ by the first user $u_1$ operating from the first device $d_{1,1}$ of the first user $u_1$. A new ShareKeyPair (k, k'$_3$) is generated for the share, and a new ShareSecret $s_3$ is also generated on the first device $d_{1,1}$ of the first user $u_1$. The share shall be shared between the first user $u_1$ and the further user $u_3$, but not the second user $u_2$, and the first user $u_1$ retrieves the Certificate $p_3$ of the further user $u_3$ from a Certificate provider. When Certificate of the further user $u_3$ is retrieved and now exists on the device of the first user $d_{1,1}$, the new ShareSecret $s_3$ is encrypted with the Certificate of both the first and further user $\{s_3\}p_1, \{s_3\}p_3$. Then the ShareKey $s_3$ is used to encrypt the ShareSecret k'$_3$ in the operation $s_3\{k'_3\}$. Now the information $\{\{s_3\}p_1, \{\{s_3\}p_3, \{k, s_3\{k'_3\}\}\}$ is put on the cloud $c_1$ which can now be retrieved by the device $d_{1,3}$ of the further user $u_3$. Since $s_3$ is not yet existing on the device $d_{1,3}$ of the further user $u_3$ this can be extracted by decrypting using the Key p'$_3$ of the further user $u_3$ in the operation $\{s_3\}p'_3$. The share key k'$_3$ is retrieved on the device $d_{1,3}$ of the further user $u_3$ using the retrieved $s_3$ to decrypt in the operation $s_3\{k'_3\}$. Now the ShareKeyPair$\{k,k'_3\}$ has successfully been retrieved by and exists on the device $d_{1,3}$ of the further user $u_3$. Different policies may be implemented by the Share and cloud operators, whether to let previously valid ShareKey-Pairs persist for historical shared data in the cloud storage, or if data should be re-encrypted with new key material after the removal of a user. The present invention only discusses the scenario where historical key material persists for historical stored data, but all new material is used in combination with the new key material. This choice does not exclude any other policies in regard to this matter.

The next embodiment of the invention to be discussed is how to share the share discussed above with the first $u_1$ and further user $u_3$, the further user in the following called the third user $u_3$, with a not yet identified invited user called the fourth user $u_4$ (in the figure the unidentified user is denoted $u_n$ until the fourth user has generated own UserKeyPair, but in this section the user is named from the beginning to heighten the readability of the scenario) from the first first device $d_{1,1}$ of the first user $u_1$. The embodiment is visualized in FIGS. 14F and 14F'. The scenario is such that the share now have a historical ShareKeyPair $\{k,k'_2\}$, and a new ShareKeyPair $\{k,k'_3\}$ with associated ShareSecrets $s_2$ and $s_3$. If these do not exist on the first first device $d_{1,1}$ of the first user $u_1$ then $\{\{\{s_2\}p_1,\{k,s_2\{k'_2\}\}\},\{\{s_3\}p1,\{k,s_3\{k'_3\}\}\}\}$ is retrieved from the cloud $c_1$. $s_2$ and $s_3$ is decrypted using the Key p'$_1$ of the first user $u_1$ in operation $\{\{s_2\}p'_1,\{s_3\}p'_1\}$, and further decrypt $\{s_2\{k'_2\},s_3\{k'_3\}\}$ and thus $[\{\{s_2,\{k,k'_2\}\},\{s_3,\{k,k'_3\}\}\}]$ exists on $d_{1,1}$. Now a new ShareSecret $s_4$ is generated on the first device of the first user whereupon this new ShareSecret $s_4$ is used to encrypt the ShareKeys $k'_2$ and $k'_3$. Now $\{s_4\{k'_2\},s_4\{k'_3\}\}$ exists on $d_{1,1}$. Next operation is to encrypt StoreSecret $s_2$ and StoreSecret $s_3$ with SharePublic $k_2$ and SharePublic $k_3$ respectively. The key material $\{\{\#s_2, \{s_2\}k_2,s_4\{k'_2\}\}, \{\#s_3, \{s_3\}k_3, s_4\{k'_3\}\}\}$ where $\#s_2$ and $\#s_3$ is a hashed value of $s_2$ and $s_3$ respectively is thereby uploaded to $c_1$. New ShareSecret $s_4$ is eitherstored on a separate cloud store $c_2$, or equivalent, not accessible by the first cloud $c_1$. One alternative is to store $s_4$ physically on a separate storage, such as on a USB or the like. The fourth user $u_4$ will then be notified of the invitation to share at one point in time.

In FIGS. 14G and 14G' it is now discussed the embodiment of the invention where the invited user joins the share. The fourth user $u_4$ first device $d_{1,4}$ generates the PersonalKeyPair p, $p'_4$, and encrypts the Key $p'_4$ with a Passphrase $s^{pwd}$. $\{p, s^{pwd}\{p'_4\}\}$ does not exist on c1, and is uploaded to c1. Then the following key material is downloaded to the first device $d_{1,4}$ of the forth user $u_4$: $\{\{\{s_2\}k_2, s_4\{k'_2\}\}, \{\{s_3\}k_3, s_4\{k'_3\}\}\}$. The same key material may then be deleted on c1, or may be associated with a counter that decrement each time an invited user fetch the key material, and then deleted after a preset, by administrator or owner or other, number of downloads. The fourth user may then get $s_4$ from the second cloud $c_2$ or from the separate storage facilitated by the first user as described above. Having $s_4$ now the fourth user can decrypt $\{s_4\{k'_2\},s_4\{k'_3\}\}$. The fourth user $u_4$ now use ShareKey $k'_3$ to hash signed the ShareSecrets denoted as $\{\{\#s_2\}^{k3},\{\#s_3\}^{k3}\}$. Share secrets $s_2$, $s_3$ are then encrypted using Certificate $p_4$ of the fourth user $.u_4$. Now $\{\{s_2\}p_4, \{\#s_2\}^{k3}, \{s_3\}p_4, \{\#s_3\}^{k3}\}$ can be uploaded to the cloud $c_1$. The cloud c1 will now try to verify $\{\#s_2\}^{k3},\{\#s_3\}^{k3}$ with the latest stored SharePublic $K_+$. If verified $\{s_2\}p_4,\{s_3\}p_4$ is stored on the cloud $c_1$ and $U_4$ joins the share. If another ShareKeyPair $K_4$ has been added in-between the cloud $c_1$ will not be able to verify the signature and $U_4$ will not join the Share.

Now an embodiment of the invention as discussed in the above where a user will share a file between two devices over the cloud as pictured in the flow diagram in FIGS. 14H and 14H'. First the user will add a file $f_1$ to a store k from a first device $d_{1,1}$. If the StoreKeyPair k, $k'_1$ and StoreSecret s1 don't exists on the device $d_{1,1}$, it has to be retrieved by downloading $\{\{s_1\}p_1, \{k, s_1\{k'_1\}\}\}$. As discussed previously $s_1$ is achieved by decrypting using first user $u_1$ Key $p'_1$, and then decrypting the StoreKey $k'_1$ using the StoreSecret $s_1$. Now a FileSecret $s_5$ is generated, and file key $s_5$ is then encrypted with StorePublic $k_1$. File residing on the first device $d_{1,1}$, is then encrypted with file key $s_5$. A cloud service $c_3$ is used for storing the now encrypted file with associated key material as denoted by $\{\{s_5\}k_1,s_5\{f_1\}\}$. For the user to get the file to the second device $d_{1,2}$, if not key material already existing on the device $d_{1,2}$, the device $d_{1,2}$ must download $\{\{s_1\}p_1,\{k,s_1\{k'_1\}\}\}$ and as discussed above retrieve $s_1$, k and $k'_1$. Now $\{s_1,\{k,k'_1\}\}$ exists on $d_{1,2}$. The second device can now download the encrypted file $f_1$ and key material from the cloud $c_3$, such that $\{\{s_5\}k_1,s_5\{f_1\}\}$ now exist on $d_{1,2}$. Using StoreKey $k'_1$ to decrypt $s_5$ in $\{s_5\}k'_1$ enables the user to decrypt the file $f_1$ using the retrieved file key $s_5$ in $s_5\{f_1\}$, and thus file $f_1$ is retrieved on the second device. Although the cloud service or file storage has been named $c_3$, it is no limitation in the invention to where the file is stored, It could just as well have been stored in $c_1$ which is also the cloud service where the key material is stored.

Now an embodiment of the invention as discussed in the above where a first user will share the file $f_1$ with a second user $u_3$ over the cloud as pictured in the flow diagram in FIGS. 14I and 14I'. The task is therefore initiated by to moving $\{\{s_5\}k_1,s_5\{f_1\}\}$ to Share $k_3$ shared between the first user $u_1$ and the second user $u_3$ from $d_{1,1}$. If the StoreKeyPair k, $k'_1$ and StoreSecret s1 don't exists on the device $d_{1,1}$, it has to be retrieved by downloading $\{\{s_1\}p_1, \{k, s_1\{k'_1\}\}\}$. As discussed previously $s_1$ is achieved by decrypting using first user $u_1$ Key $p'_1$, and then decrypting the StoreKey $k'_1$ using the StoreSecret $s_1$.

The next step is to ensure that ShareSecret $s_3$ and ShareKeyPair k, $k'_3$ is present at the first device of the first user $d_{1,1}$. If not already existing on the first device $d_{1,1}$ of the first user $u_1$, $\{\{s_3\}p_1, \{k, s_3\{k'_3\}\}\}$ is retrieved from the cloud, and ShareKey $s_3$ is decrypted by the first users Key $p'_1$, and then the ShareKey $k'_3$ is decrypted using the retrieved ShareKey $s_3$. Now $\{s_3,\{k,k'_3\}\}$ exists on $d_{1,1}$. $S_5$ is then encrypted with $k_3$ and put $\{\{s_5\}k_3\}$ to the cloud $c_3$, where also $\{s_5\{f_1\}\}$ exists. Cloud $c_3$ is used as an example cloud service, but could be any a discussed above. Now the second user can start the process of getting the file and key material. First, if $\{s_3,\{k,k'_3\}\}$ does not exist on the device $d_{1,3}$ of the second user, $\{\{s_3\}p_3, \{k, s_3\{k'_3\}\}\}$ is downloaded from the cloud c3, and since $s_3$ is not existing on the second users device $d_{1,3}$, this is deduced by decrypting using the further user's Key $p'_3$ in the operation $\{s_3\}p'_3$. Then the second user u3 will decrypt the ShareKey $k'_3$ using the retrieved ShareSecret $s_3$ in the operation $s_3\{k'_3\}$. Now both Share Secret $S_3$ $_{and}$ the ShareKeyPair $\{k,k'_3\}$ exists on the device of the second user $d_{1,3}$. Now the key and file material $\{\{s_5\}k_3,s_5\{f_1\}\}$ is downloaded from the cloud, and exist on second users device $d_{1,3}$. FileSecret $s_5$ is decrypted using ShareKey $k'_3$ in the operation $\{s_5\}k'_3$. The file $f_1$ can now be encrypted using FileSecret $s_5$, and thus $f_1$ exists on the second user device $d_{1,3}$.

Sending an encrypted file stored in the cloud thereby is transferred to a second user device without the need for re-encryption of the file itself, but by adding the step of encrypting the store secret with the second user's Certificate, and thereby creating a secure operation for transferring and decryption of ShareSecret $s_3$ and ShareKeyPair $k,k'_3$, new users can be included in the cloud storage and get access to the encrypted files in a much more efficient manner compared to traditional methods where file is encrypted with any users Certificates.

In a scenario where a new file is included in the share it is only necessary for the user transferring the file into the share in the cloud to encrypt the file with the FileSecret, and encrypt the FileSecret with the SharePublic, Distribution of the file is controlled by Controlling the access to the ShareSecret, and for each user intended to get access to the share, the first user/owner must encrypt the ShareKey with the Certificate of each user, and encrypt ShareKeyPair with the ShareSecret. All accepted users can thereby get access to the ShareSecret by decrypting using their own private Key. Once ShareSecret is deduced, it is possible for the user to get the ShareKey that was encrypted with the ShareSecret. ShareKey can be used to decrypt the FileSecret, and the FileSecret used in turn to decrypt the file.

To enable flexible handling of the above discussed information and file store and share each entity in the system is allocated a data model that may be as shown in FIG. 16. Other models may be used.

In order for user to be able to share message with an unregistered user a new entity storesecret may be added to the data model described in FIG. 16. The storesecret operation may comprise parameters such as:
- id—auto-incremented unique private key
- store_id—foreign key to store
- idx—soft link to storekeypair idx
- keycontainer—store's private key encrypted with secret, required at creation, may be nulled after first read
- secret—secret hashed first by client then by server
- requests—counter, incremented every time the store secret is attempted fetched from the server
- joins—counter, incremented every time the store secret is attempted joined by a client For the owner 50 to be allowed to invite unregistered user to a store 60 in an addSecrets operation a valid session with the server and store ownership may be facilitated. It may also be required that all secrets are available at the same store, and the process may comprise the use of following parameters:
- sessionId—current session id
- storeGuid—identifies the store
- secret—store secret hashed
- secrets—one or more secrets to add to the store
- storeGuid—identifies the store, optional, but must match storeGuid above
- keyIndex—the index of the store's keys this store secret refers to
- keyContainer—the PKCS#12 private key for the store encrypted with secret The server may store the hashed secret hashed using the same algorithm as for normal password, only with a fixed salt. The store secret may be persisted with a request and join count of 0.

Then for the invited user to get stored secrets form the serve in a getSecret operation, it may require a valid session and secret that matches one or more store secrets with a request count of 0. If one of the matched store secrets have a request count larger than 0, a special error code may be returned.

The process may comprise the use of following parameters
- sessionId—current session id
- secret—store secret hashed The server may hash the hashed secrets and returns matches from the database. All matches may have their request counter incremented and key container nulled.

An array of store secrets may be returned to the invited user. If one or more of the secrets have already been requested, its key container may be null in the response.

The invited users is allowed to join a store in a joinStore operation.

The operation requires a valid session and storeGuid in addition to a secret that matches one or more store secrets with a join count of 0. If one of the matched store secrets have a join count larger than 0, a special error code may be returned. The operation may also require the signature to be verified with the store's latest public key to verify that the store hasn't changed since the joiner was invited.

The process may comprise the use of following parameters
- sessionId—current session id
- storeGuid—identifies the store
- secret—store secret hashed
- signature—store secret signed with store's latest private key
- user—store user with storeuserkeys The server may hash the hashed secret and joins the store in the database. The joined store secret may always have its join counter incremented, even if the store is already joined.

The outcome of the joinStore process may be a store with the user added, or null if the store has already been joined.

In one embodiment of the invention the store and share discussed above is used for exchanging messages such as in mail or short messages to other users. One example for setting up a phone for such exchange is shown in the overview flow diagram in FIG. 17 and further outlined in the blown up FIGS. 18A-E. The flow diagram in 18A.

Another aspect of the invention comprise an embodiment used to implement a technique for blurring the visual representation of the message dialogue on a user's display, as outlined in FIGS. 19A and 19B, if the display is either turned away from the user, and/or an unknown viewer comes into the aperture of a display camera monitoring the presence of the user, and/or the display is put at rest, for example by laying the phone down on a table as described in FIG. 22. The face recognition feature example can be further explained by that when the phone is in a blurred state, it will constantly use the display side camera to identify if there are faces in close vicinity of the phone. The distance parameters for acceptable user distance can be preset, and will differ from device to device. Once a face is detected the application will try to recognize the face from the previously stored approved user(s). If face is recognized as a qualified face, the text on the screen is shown in a clear text manner where text and images is shown unblurred. If recognition fails, it is possible to unlock by using password input. If correct pin is entered the image is shown unblurred.

Another feature with the face recognition is that it may be set up to use the blurring function the same instance that the phone is turned away from the user.

Figure 21A:
Figure 21B:
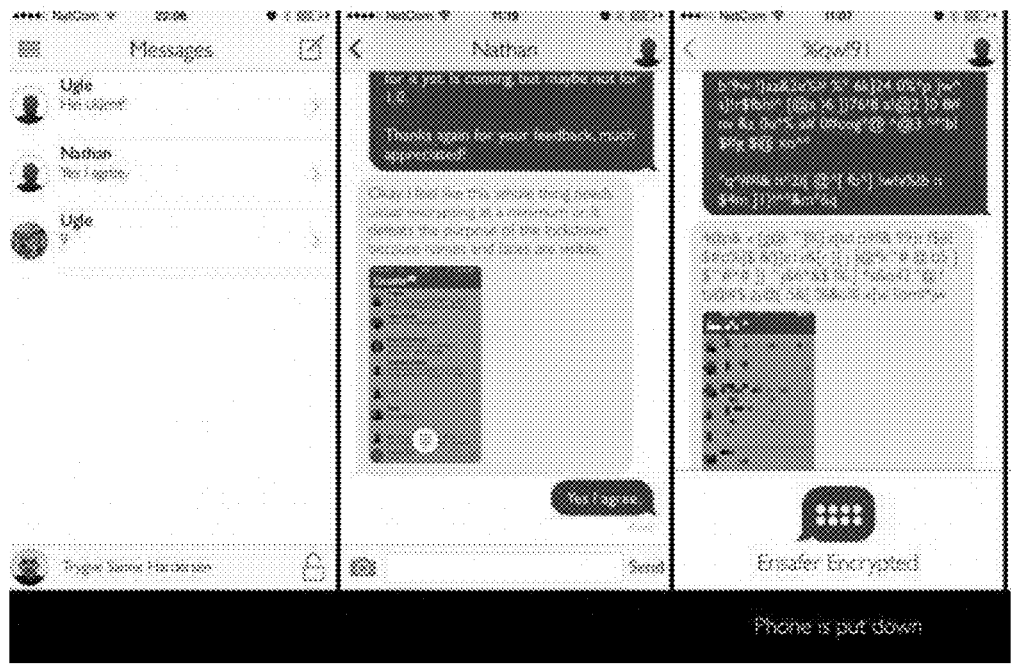
Figure 21C:
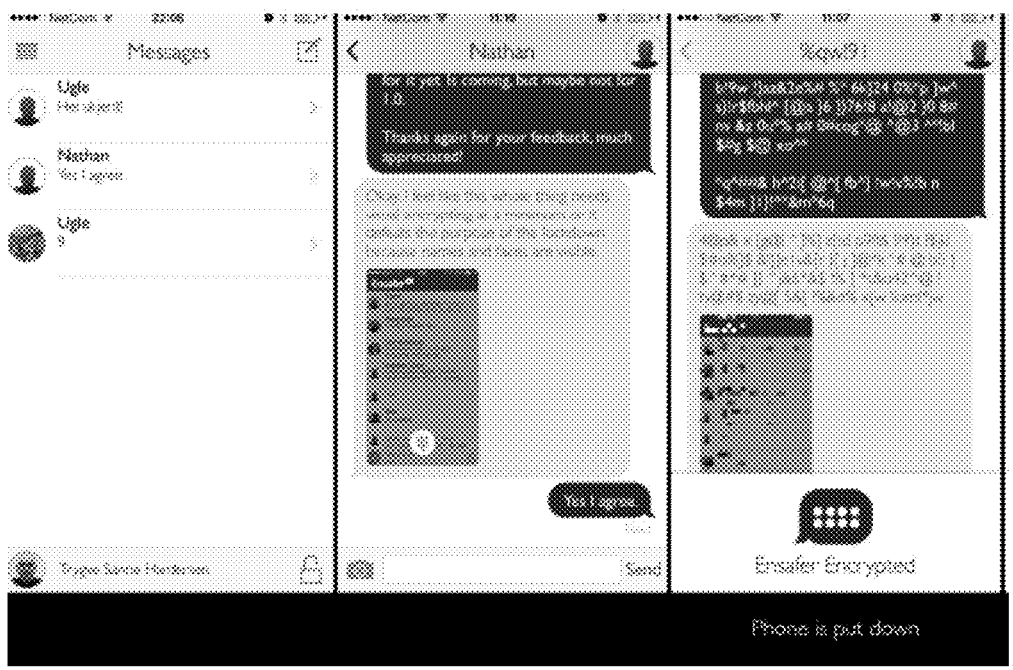
Figure 21G:
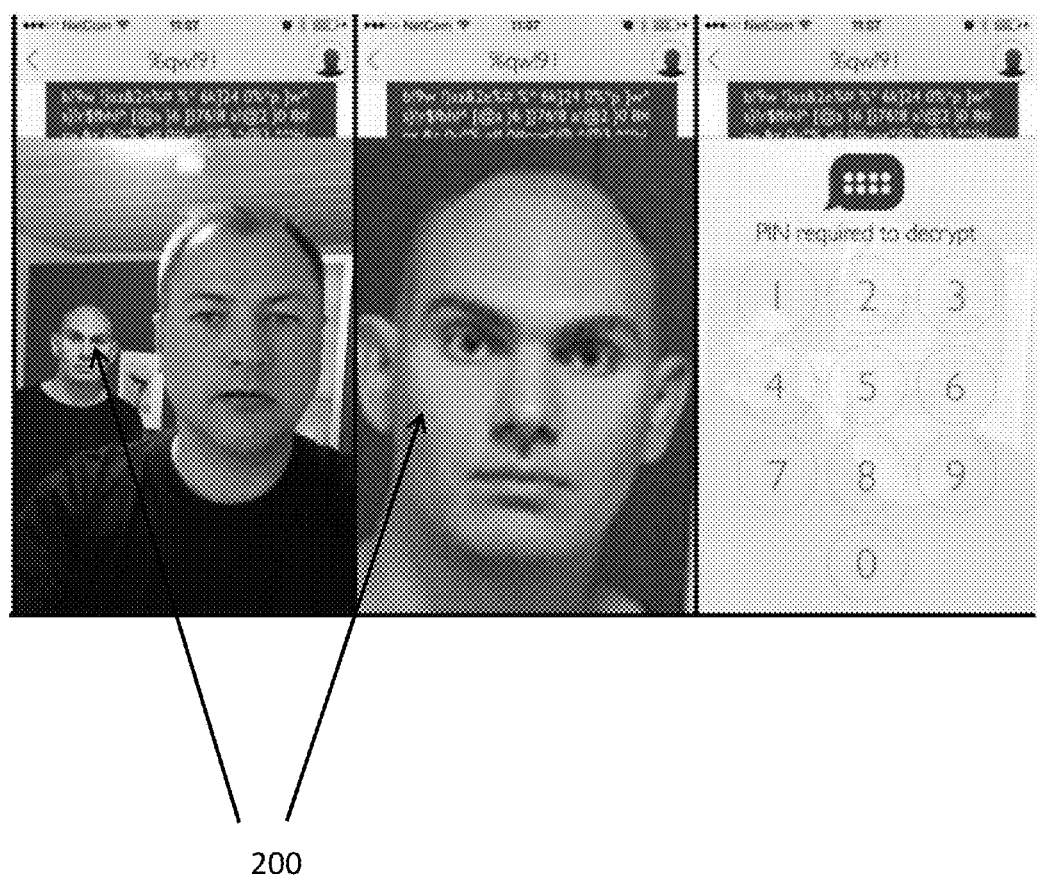

Another embodiment of the invention utilizing the face recognition feature is described in FIG. 21G, and deals with remote faces, or second faces in view. The feature will constantly monitor the landscape in front of the phone, and if a face is detected close to the user, it will recognize this as an unrecognized user and blur the text and images. The feature may also be trained to recognize more than one face, and only blur if an unknown face comes into view. One scenario may be described if a video presentation or conference is displaying confidential material for a group of preapproved people. If one listener representing an unapproved person sneaks in on the group and tries to watch the camera and face recognition feature monitors and detects the invalid person, and immediately the image is blurred.

Figure 20A:
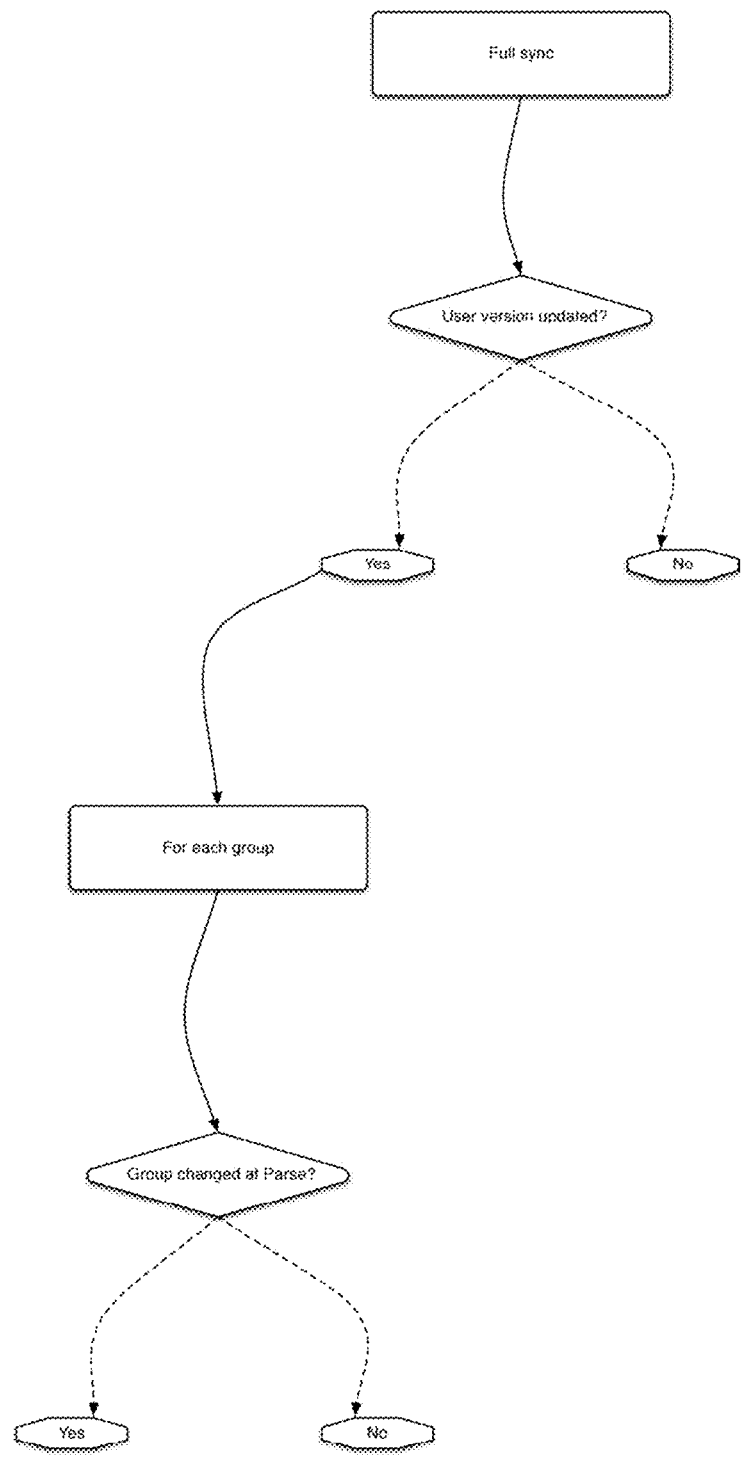
Figure 20B:
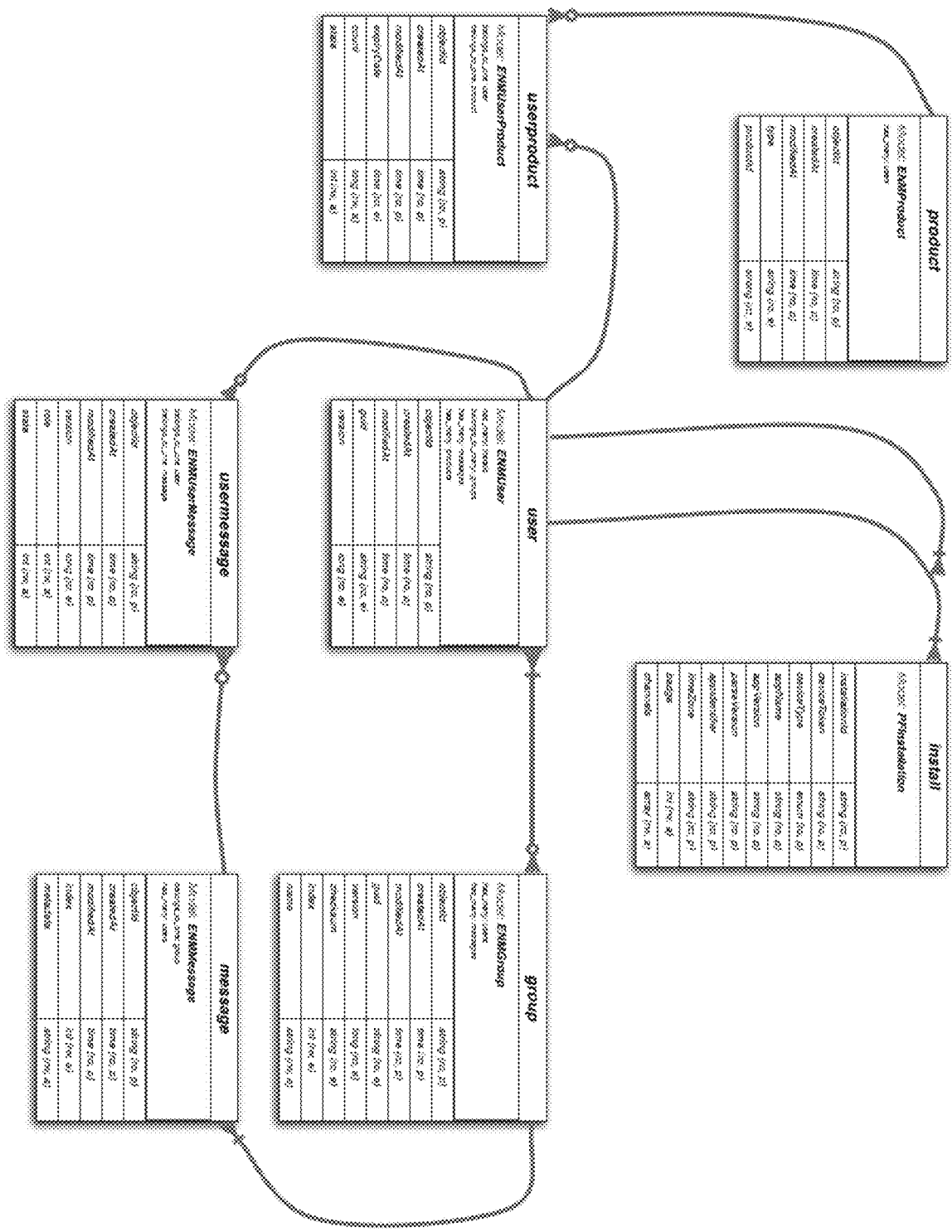

In FIG. 20A shows a flow where a device is synchronized against the cloud service and will identify if any changes have occurred since last synchronization. FIG. 20B shows a possible data model supporting some of the requirements of a parsing feature as defined in FIG. 20A. Other models may be implemented as also discussed in relation to data model in FIG. 16.

In FIG. 21A-F an embodiment of the invention is exemplified by an implementation for a smartphone. The figures show a mobile phone login and password lock sequence, and a second/remote face locking operation. For text the blurring will be of the same size as the clear text starting point. For images the blurred image keeps some feature of the image making it unrecognizable but for a person who have viewed the picture able to identify the original by remembering.

FIG. 21A show one possible implementation of the login sequence of a mobile application for exchange of information formatted to fit into a message exchange service. The user logs in with email address, user name and password. For the cloud service this is sufficient to identify user.

When user is successfully logged into the service, a dialog can be selected. In the example given in 21B (21C is the same figure without color code) the present dialogue with Nathan is selected. The service is offered in a color scheme that denotes that all information is encrypted once entered into the cloud. Red color may advantageously be used. The phone application utilizes the movement detector of the phone to identify when the phone is put down on for example a table in an "at rest" mode. Once an "at rest" mode is detected the information in the text holders on the phone is made unreadable in a blurring operation.

Blurring is a one way encryption of the information that leaves the text unreadable, and the pictures unrecognizable. The algorithm cannot be reversed to unencrypt the information. The blurring of text further comprises a feature to compensate for size differences in the used character type set as shown in flow diagram in FIG. 15. The blurring function is called "visualcrypt f*$_1$" in the flow diagram. This means that if the added size of the blur-encrypted clear text is larger than the size of the clear text, the blurred text is sliced to compensate for this, and the result is that the text will fit in the same size text frame. Size compensation may comprise adding characters at the end of the blurred text (not shown in the flow diagram), removing some character at the end of the blurred text, or changing the size of the blurred text (not shown in the flow diagram). The result is that the text boxes/frames can be kept at the same size, and the shifting between the two modes will not be the source of changing the overall size parameters of the screen view. The text holders will not be seen as toggling between two sizes when moving from one mode to the other.

The blurring feature further may comprise a pre-calculation feature. This means that every time the device is operated and in clear mode, the device use free processor time to calculate blurred text of the visual clear text. That means that when blurring feature kicks in, for example when the phone is put at rest in a table, the text is already prepared for blurred vision and can be instantly changed. If the user uses the navigation bar to scroll up or down in the message thread, the processor time may be used to calculate the blurred image of the visual text as well as the next view of the clear text in the current moving direction of the scroll operation.

The blurred image of the clear text may be reused for the same text portion, but the algorithm is such that two identical phrased text parts will never appear with the same blurred text. One or more random numbers, seeds, are used in the algorithm used to blurr, to make sure that same text phrase never result in the same blurred text sequence.

It is further a feature of the blurring function that the blurred text will keep the character number of each clear text word intact. Space always keep its appearance, and will not be changed. That means that the graphical outline of the blurred text will have some resemblance of the graphical impression of the clear text, and a person who have read the message will be able to remember more easily what the text was, whilst a person who have not seen the clear text will not be able to understand any meaning of the blurred text.

The blurring feature also is implemented on images used in the information exchange. A different mechanism is used for blurring of the images, than when used on the text elements described above. In one embodiment of the image blurring task, the color scheme of the image is reused in a manner that enables recognition of object outline even though no details of the clear image are recognizable. A person familiar with the clear image will be able to identify the picture as such but no details, whilst a person that has not seen the image before will have difficulties in guessing what detailed information the image represents. One example of this can be seen in FIGS. 19B and 21C.

Transition table and initiating activity may comprise:
Clear—Blurred
Lay down
Face gone
Unknown face
Blurred—Clear
Bio
Movement+PIN
Face Now a new method for sharing information is described comprising using the above described mechanism of encryption, storing and sharing information in the cloud related to security challenges in the cloud storage industry, specifically sharing large amount of data between different devices or sharing data with many users or both. The method is accompanied by FIGS. 23 to 31 describing how to use a trusted e-id provider.

The figures describe one alternative implementation with the product application Ensafer™. It shall be understood that the techniques described is independent of which product application implements the method, and may be provided using other application products.

There are 5 stakeholders in Ensafer™ Message Broker (EMB) as described in FIG. 23:
User—A person that uses one or more Client Applications.
Client Application—An (web) application that uses EMB to provide strong end-to-end encryption.
Ensafer™ Keychain—A mobile application that runs on the User's smartphone to store and generate encryption keys.
Ensafer™ Message Broker—A service that coordinates message flow between the Client Applications, Ensafer Keychain and e-ID Providers.
e-ID Provider—A service that provides strong authentication and digital signatures for the user.

Users authenticate with EMB using a trusted e-ID Provider is shown in FIG. 24:

The e-ID Provider issues Certificates to the User. Typically there's one Certificate for authentication (A) and another for signing (S) for every e-ID Provider. The Certificates typically have an expiry date, so there can be multiple sets of historic Certificates for every User for every e-ID Provider. All these Certificates play a role in EMB.

To authenticate with EMB the User must possess a valid Certificate for authentication. This means the Certificate must:
1. be issued by a trusted Certificate Authority (CA)
2. not be expired
3. not be revoked
4. be applicable for authentication Historic (expired or revoked) authentication Certificates cannot be used to authenticate with EMB, but they are stored to provide historic evidence of past authentication and to provision new Certificates.

To Sign with EMB the User must possess a valid Certificate for signing. This means the Certificate must:
1. be issued by a trusted Certificate Authority (CA)
2. not be expired
3. not be revoked
4. be applicable for signing Historic (expired or revoked) signing Certificates cannot be used to create new signatures with EMB, but they are used to verify historic signatures and to provision new Certificates.

In FIG. 25 it is described that every Ensafer™ Keychain device has at least two key pairs called the Device Keys. There's one key pair for encryption and another for signing. The Device Keys are the User's master keys for encrypting information across Client Applications.

The Device's public signing keys are signed with the User's e-ID Certificates, and the Device's public encryption keys are signed with the Device's corresponding signing key. The Device's public signing keys must be signed with every e-ID Certificate the User possesses.

Device Keys may expire after 2 years. After expiry the User has to generate and sign new Device Keys. Client Application Keys are re-encrypted when Device Keys are renewed.

A User can only have one active Ensafer™ Keychain device, but it's possible to have multiple active backup devices.

In FIG. 26 it is described that for every Client Application a User has a key pair called the Client Application's Key or just App Key. This key pair is the User's master key for encrypting information within a Client Application.

The Client Application's public key is signed with the User's e-ID Certificate. This allows the establishment of trust between the sender and recipient(s) of encrypted information. Any valid e-ID signing Certificate can be used to sign an App Key, and the App Key does not have to be signed for every e-ID Certificate the User possesses.

Access to a Client Application's private key can be granted to a Supervisor by the Owner. This is typically used to allow administrators access to data after an employee has quit the job.

The App Keys expire after N days. After expiry the user have to sign new App Keys. The old are key to allow decryption of historic data, but are not used for encryption after expiry.

In FIG. 27 it is described that Store Keys are used to efficiently share large quantities of encryption keys with many participants. They are signed by the User who creates them. Recipients are granted access through their signed App Key.

In FIG. 28 it is described that Content Keys are symmetric encryption keys used to actually encrypt content like messages or files. Access to Content Keys are provided through the Store Keys, allowing efficient sharing of content.

Content Keys are themselves not signed, but the content they refer to is signed. Content Keys are the only keys ever exposed to Client Applications.

In FIG. 29 it is described that together the keys in EMB form a hierarchical structure. On top is the User which owns all keys through the Device Keys. Access to the Device Keys are protected by the Ensafer™ Keychain and the e-ID Provider. Users have to sign a challenge from the Ensafer™ Keychain using their e-ID Provider in order to use the Device Keys. Device Private Keys are never stored outside the Ensafer™ Keychain.

Device Keys are used to protect App Keys, which again are used to protect Store Keys, which again are used to protect Content Keys.

Only Content Keys are ever exposed to Client Applications.

FIG. 30 A-B describes the detailed flow of information in one alternative embodiment for Ensafer™ between the user, the client app, the Ensafer™ server and the e-ID provider in an message broker authentication process.

FIG. 31A-B describes the detailed flow of information in one alternative embodiment for Ensafer™ between the user, the client app, the Ensafer™ server, the Ensafer™ Keychain and the e-ID provider in an message broker Key signing.

The invention claimed is:

1. A method for protecting and sharing digital data between users in a network comprising:
   generating, at a user device of a plurality of user devices, a Personal Key Pair comprising a first public key and a first private key, each of the plurality of user devices being connected to a server via a network, wherein the server is configured to store and provide access to first public keys of each of the plurality of user devices;
   accessing, by the user device via the server, a respective Store and a corresponding StoreKeyPair comprising a StorePublic and a StoreKey, the StorePublic being a second public key and the StoreKey being a second private key, wherein the StorePublic of the user device is stored at the server and is available to each user device of the plurality of user devices authorized to access the respective Store, and wherein each Store belongs to a user, and the user shares the keys via the server;
   generating, by the user device, a StoreSecret, the StoreSecret being a random strong symmetric key;
   encrypting, by the user device, the StoreKey with the StoreSecret, wherein the user device is further configured to encrypt the StoreSecret with the first public key of a corresponding user being authorized to access the respective Store; and
   storing, by the user device, the encrypted StoreKey at the server.

2. The method according to claim 1, further comprising:
   creating, by the user device, a File for sharing;
   creating, by the user device, a FileSecret, the FileSecret being a random strong symmetric key;
   encrypting, by the user device, content, and optionally metadata, of the File using the FileSecret; and
   encrypting, by the user device, the FileSecret using the StorePublic.

3. The method according to claim 2, further comprising:
   sharing, by the user device, the File;
   creating, by the user device, a Share in the server and a corresponding ShareKeyPair comprising a SharePublic and a ShareKey, the SharePublic being a third public key and the ShareKey being a third private key;
   generating, by the user device, a ShareSecret, the ShareSecret being a random strong symmetric key;
   encrypting, by the user device, the ShareKey with the ShareSecret;
   encrypting, by the user device, the FileSecret using the SharePublic for each File comprised in the Share before adding participating respective user devices of the plurality of user devices participating in the Share; and
   encrypting, by the user device, the ShareSecret with the first public key of each of the participating respective user devices.

4. The method according to claim 3, further comprising:
   creating, by the user device, a new ShareKeyPair for the Share for subsequent sharing of the File when one or more of the participating respective user devices are no longer intended to participate in the Share, wherein a Share/Store key table for the content in the respective Store or the Share is maintained at the server.

5. The method according to claim 1, further comprising:
sending, by the user device, a Password to the server, the Password being a strong hash of a secret password stored in the server during registration, wherein the server is configured to authenticate the user device in response to receiving the Password;
receiving, at the user device, a SessionID from the server, the SessionID being a random session ID and encrypted with the first public key; and
decrypting, by the user device, the SessionID using the first private key, and wherein each subsequent message to the server includes the decrypted SessionID.

6. The method according to claim 1, wherein the second public key of each StoreKeyPair is stored in a first key container.

7. The method according to claim 1, wherein the second private key of each StoreKeyPair is stored in a second key container.

8. The method according to claim 7, further comprising password protecting the second private key of each StoreKeyPair before storing the second private key of each StoreKeyPair in the second key container.

9. The method according to claim 1, wherein the first private key is stored in the server, wherein the first private key is protected on the user device with a passphrase that is sent to the user device when authenticated.

10. A system for protecting and sharing digital data between users in a network, comprising:
a communication network,
one or more user devices,
a network connected server,
computing resources in each of the one or more user devices for encryption and decryption of user data and encryption key parts,
computing resources in the network connected server for encryption and decryption of the user data and the encryption key parts,
a key management services,
an identity management services, and
user data to be protected, stored and shared in the network connected server, wherein the each of the one or more user devices is configured to:
generate, a Personal Key Pair comprising a first public key and a first private key, each of the one or more user devices being connected to the network connected server, wherein the network connected server is configured to store and provide access to first public keys of each of the one or more user devices;
access, via the network connected server, a respective Store and a corresponding StoreKeyPair comprising a StorePublic and a StoreKey, the StorePublic being a second public key and the StoreKey being a second private key, wherein the StorePublic of the one or more user devices is stored at the network connected server and is available to each of the one or more user devices authorized to access the respective Store, and wherein each Store belongs to a user, and the user shares the keys via the server;
generate a StoreSecret, the StoreSecret being a random strong symmetric key;
encrypt the StoreKey with the StoreSecret, wherein the one or more user devices are further configured to encrypt the StoreSecret with the first public key of a corresponding user being authorized to access the respective Store; and
store the encrypted StoreKey at the network connected server.

11. The system according to claim 10, wherein the communication network comprises a cloud network and services.

* * * * *